United States Patent
Narita et al.

(10) Patent No.: US 9,983,962 B2
(45) Date of Patent: May 29, 2018

(54) STORAGE SYSTEM AND DATA MANAGEMENT METHOD OF JOURNALING AND STORING REMOTE COPIES

(71) Applicant: Hitachi, Ltd., Tokyo (JP)

(72) Inventors: Kensuke Narita, Tokyo (JP); Toru Suzuki, Tokyo (JP); Naoko Ikegaya, Tokyo (JP); Azusa Jin, Tokyo (JP); Hideo Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 14/770,594

(22) PCT Filed: May 8, 2013

(86) PCT No.: PCT/JP2013/062962
§ 371 (c)(1),
(2) Date: Aug. 26, 2015

(87) PCT Pub. No.: WO2014/181406
PCT Pub. Date: Nov. 13, 2014

(65) Prior Publication Data
US 2016/0004616 A1    Jan. 7, 2016

(51) Int. Cl.
*G06F 11/20* (2006.01)
*G06F 12/00* (2006.01)
(Continued)

(52) U.S. Cl.
CPC .......... *G06F 11/2094* (2013.01); *G06F 3/065* (2013.01); *G06F 3/067* (2013.01);
(Continued)

(58) Field of Classification Search
CPC .............. G06F 11/2056; G06F 11/2058; G06F 11/2064; G06F 11/2066; G06F 11/2069;
(Continued)

(56) References Cited

U.S. PATENT DOCUMENTS 7,149,859 B2 * 12/2006 Fujibayashi .......... G06F 3/0607
711/162
7,200,727 B2 * 4/2007 Kasako ................. G06F 3/0607
711/154
(Continued)

FOREIGN PATENT DOCUMENTS

CN    101174197 A1    5/2008
EP      1918818 A2    5/2008
(Continued)

OTHER PUBLICATIONS

International Search Report of PCT/JP2013/062962.

*Primary Examiner* — Joseph O Schell
(74) *Attorney, Agent, or Firm* — Mattingly & Malur, PC

(57) ABSTRACT

Fault-tolerance is improved by duplicating data and update information of that data. A storage system has a first storage apparatus that is connected to a host computer, and includes a plurality of first data volumes and a first journal volume, a second storage apparatus that is connected to the host computer and the first storage apparatus, and includes a plurality of second data volumes for storing duplicated data of each of the plurality of first data volumes, and a second journal volume for storing the duplicated data of the first journal volume, a third storage apparatus that is connected to the first storage apparatus, and includes a plurality of third data volumes that configure a remote copy pair with the plurality of first data volumes by using the journal data received from the first storage apparatus, and a fourth storage apparatus that is connected to the third storage apparatus.

14 Claims, 62 Drawing Sheets

(51) Int. Cl.
  *G06F 11/16* (2006.01)
  *G06F 11/14* (2006.01)
  *G06F 3/06* (2006.01)

(52) U.S. Cl.
  CPC .......... *G06F 3/0619* (2013.01); *G06F 3/0689* (2013.01); *G06F 11/1471* (2013.01); *G06F 11/16* (2013.01); *G06F 11/2058* (2013.01); *G06F 11/2071* (2013.01); *G06F 12/00* (2013.01); *G06F 3/064* (2013.01); *G06F 3/0646* (2013.01); *G06F 2201/855* (2013.01)

(58) Field of Classification Search
  CPC ............ G06F 11/2082; G06F 11/2094; G06F 11/2097; G06F 2201/855; G06F 3/067; G06F 3/065; G06F 3/064; G06F 3/0646
  See application file for complete search history.

(56) References Cited

U.S. PATENT DOCUMENTS

| | | | |
|---|---|---|---|
| 7,395,265 B2* | 7/2008 | Suzuki | G06F 11/2058 707/610 |
| 2007/0050575 A1* | 3/2007 | Uratani | G06F 3/0605 711/162 |
| 2008/0104346 A1 | 5/2008 | Watanabe et al. | |
| 2008/0104347 A1 | 5/2008 | Iwamura et al. | |
| 2008/0104443 A1* | 5/2008 | Akutsu | G06F 11/2058 714/6.12 |
| 2011/0264876 A1* | 10/2011 | Kaiya | G06F 3/0617 711/162 |
| 2012/0109919 A1 | 5/2012 | Park et al. | |
| 2012/0192006 A1* | 7/2012 | Qi | G06F 11/0757 714/6.22 |
| 2014/0304698 A1* | 10/2014 | Chigurapati | G06F 8/65 717/171 |

FOREIGN PATENT DOCUMENTS

| | | |
|---|---|---|
| JP | 2008-134986 A | 6/2008 |
| JP | 2008-134988 A | 6/2008 |
| JP | 2012-532376 A | 12/2012 |
| KR | 10-2011-0002708 | 10/2011 |
| WO | 2011/002169 A2 | 1/2011 |

* cited by examiner

STORAGE SYSTEM AND DATA MANAGEMENT METHOD OF JOURNALING AND STORING REMOTE COPIES

TECHNICAL FIELD

The present invention relates to a storage system and a data management method, and can be suitably applied to a storage system and a data management method for managing data with a plurality of storage apparatuses.

BACKGROUND ART

Generally speaking, an information system comprises a storage apparatus equipped, for example, with multiple HDDs (hard disk drives) as storage devices, and a storage system including one or more such storage apparatuses is accessed from a plurality of higher-level devices (for example, host computers) via a Storage Area Network (SAN). A storage apparatus provides reliability, which exceeds the reliability of an independent HDD, by adopting a method of realizing the enhancement of reliability according to the RAID (Redundant Array of Independent (or Inexpensive) Disks) technology. Nevertheless, when a natural disaster such as a massive earthquake, tsunami or typhoon occurs, there is a possibility that the storage apparatus itself cannot be recovered. In the foregoing case, the availability (server continuity) of the information system cannot be satisfied only with the reliability of the foregoing RAID. For example, since there will be a significant impact on the economic activities if financial institutions discontinue their services, demanded is a technology for creating a backup in a remote location in preparation for disasters or the like.

As a high-availability technique to deal with this kind of situation, PTL 1 discloses a configuration of performing a remote copy between a local site including a first storage apparatus and a second storage apparatus, and a remote site including a third storage apparatus and a fourth storage apparatus. The host computer sends a read/write request to the first storage apparatus. The second storage apparatus is a backup of the first storage apparatus and, when a failure occurs in the first storage apparatus, business affairs are continued by the second storage apparatus performing a failover.

Here, when a configuration is adopted where the same identifier is assigned to two storage apparatuses; for example, a storage apparatus A and a storage apparatus B, and the storage apparatus A provides a virtual volume A corresponding to the physical volume A to a host computer, and the storage apparatus B provides a virtual volume B, which corresponds to the physical volume B and has the same identifier as the virtual volume A, to a host computer, a host computer comprising a general alternate path function will recognize the physical volumes in the respective storage apparatuses as one virtual volume.

In this configuration, the host computer can access (read from/write into) both storage apparatuses. Consequently, the access load can be balanced between the two storage apparatuses while maintaining the redundancy.

In order to realize this function, it is necessary to synchronize the data between the two physical volumes. Thus, in write processing, since writing will be complete after data is written into two physical volumes, much time is required for the response. Thus, in business affairs that lay importance on response performance, the distance between the physical volumes needs to be a relatively short distance. Thus, in the occurrence of a widespread disaster, there is a possibility that the two storage apparatuses may both become unavailable. Thus, in order to increase the service continuity, it is necessary to have a backup in a long-distance data center based on remote copy.

CITATION LIST

Patent Literature

[PTL 1] JP-A-2008-134986

SUMMARY OF INVENTION

Technical Problem

As described above, the storage apparatuses are made redundant in order to improve the service continuity. Nevertheless, with the technology of PTL 1, resources of the redundant storage apparatuses could not be utilized effectively.

In other words, with the technology of PTL 1, the first storage apparatus is used during normal operation, and the second storage apparatus is used during a failure in the first storage apparatus. In PTL 1, the configuration is such that the host computer only accesses the first storage apparatus, a sequential number is assigned to a write request sent to the first storage apparatus, and that sequential number is notified to the second storage apparatus. Accordingly, PTL 1 fails to disclose that, in an environment of the host computer recognizing the volume A and the volume B as the same volume and sending a write request, the sequence of the sequential numbers of journals is guaranteed across two storage apparatuses regardless of whether the write request is sent to the first storage apparatus or the second storage apparatus.

Moreover, with the technology of PTL 1, the first storage apparatus is accessed from the host computer during normal operation. When a journal has been created in a journal group including a plurality of volumes of the first storage apparatus; that is, when a sequence of sequential numbers has been assigned to the write process of writing into a plurality of volumes, when a failure occurs in one volume, a failure cannot be performed for each volume, and a failover needs to performed by the second storage apparatus in journal group units. Thus, the host computer can only access one of the storage apparatuses, and there is a problem in that the resources of the first storage apparatus and the second storage apparatus cannot be utilized effectively.

The present invention was devised in view of the foregoing points, and proposes a computer system and a data management method that enable the effective utilization of the storage apparatuses as a result of improving the fault-tolerance by forming a remote copy in duplicated storage apparatuses, the duplicated storage apparatuses respectively storing data and the update information of the data used in the remote copy, and the host computer being able to access either of the storage apparatuses during normal operation.

Solution to Problem

In order to resolve the foregoing problem, the present invention provides a storage system comprising a first storage apparatus that is connected to a host computer, and includes a plurality of first data volumes for storing data, and a first journal volume for storing journal data including data to be written into the plurality of first data volumes and an update number indicating an order in which the data was written, a second storage apparatus that is connected to the host computer and the first storage apparatus, and includes a plurality of second data volumes for storing duplicated data of each of the plurality of first data volumes, and a second journal volume for storing the duplicated data of the first journal volume, a third storage apparatus that is connected to the first storage apparatus, and includes a plurality of third data volumes that configure a remote copy pair with the plurality of first data volumes by using the journal data received from the first storage apparatus, and a fourth storage apparatus that is connected to the third storage apparatus, and includes a plurality of fourth data volumes for storing duplicated data of each of the plurality of third data volume, wherein the first storage apparatus assigns a virtual volume identifier to each of the plurality of first data volumes and provides a plurality of virtual volumes to the host computer, the second storage apparatus assigns the same virtual volume identifier to one of the plurality of second data volumes storing one duplicated data of the plurality of first data volumes and provides a virtual volume to the host computer, and when a failure occurs in any one of the plurality of first data volumes of the first storage apparatus or in any one of the plurality of second data volumes of the second storage apparatus, the update information is subject to duplicate management in a continuous manner in the first journal volume of the first storage apparatus and the second journal volume of the second storage apparatus.

Advantageous Effects of Invention

According to the present invention, the effective utilization of the storage apparatuses is realized as a result of improving the fault-tolerance by forming a remote copy in duplicated storage apparatuses, the duplicated storage apparatuses respectively storing data and the update information of the data used in the remote copy, and the host computer being able to access either of the storage apparatuses during normal operation.

DESCRIPTION OF EMBODIMENTS

An embodiment of the present invention is now explained in detail with reference to the drawings.

(1) First Embodiment (1-1) Outline of this Embodiment

Figure 1:
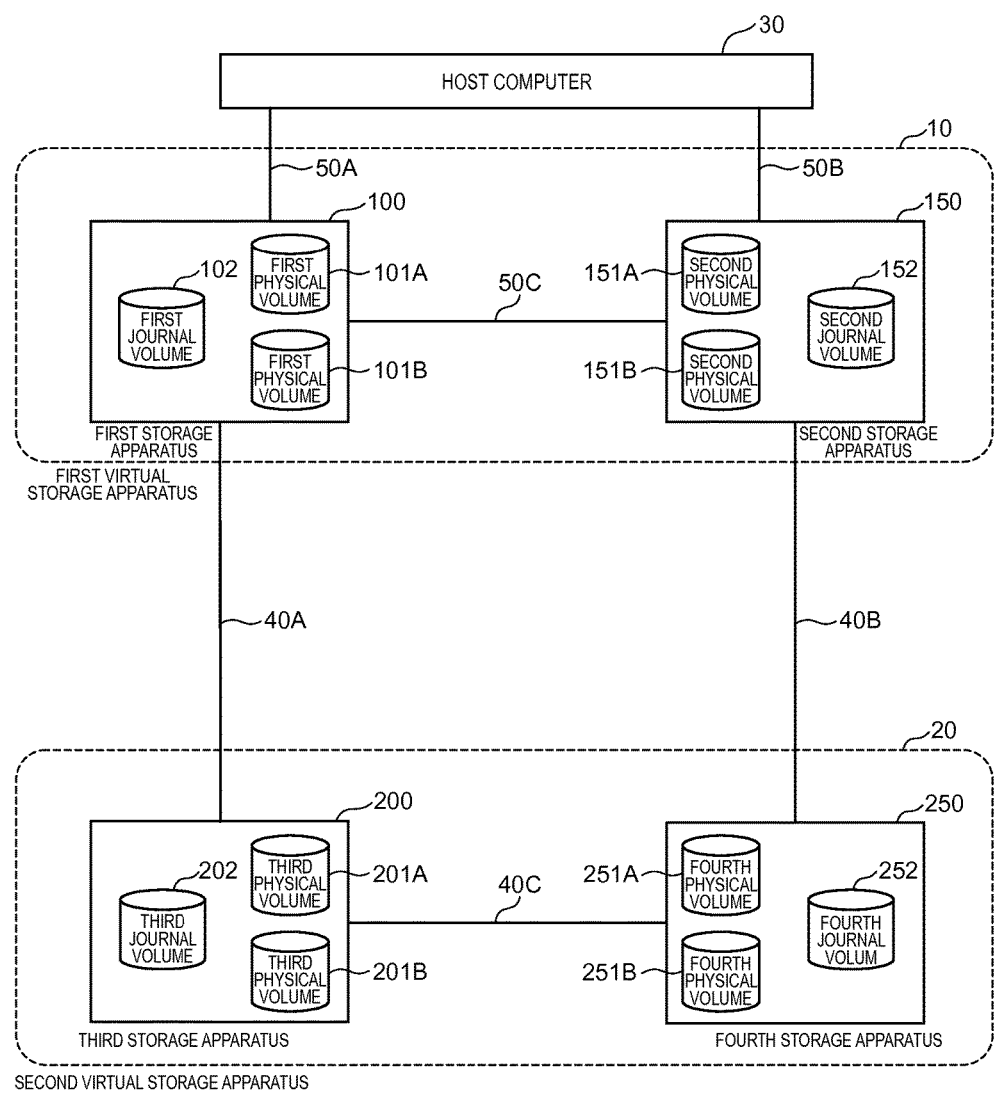
FIG. 1 is a conceptual diagram explaining the outline according to the first embodiment of the present invention.

Foremost, the outline of this embodiment is explained with reference to FIG. 1. As shown in FIG. 1, the same virtual storage apparatus ID is assigned to a first storage apparatus 100 and a second storage apparatus 150, and the first storage apparatus 100 and the second storage apparatus 150 are recognized as one virtual storage apparatus 10 by a host computer. The first storage apparatus 100 and the second storage apparatus 150 have a function of assigning the same virtual volume ID (also referred to as the Global Device ID) to two physical volumes that are respectively managed by the two storage apparatuses, and providing the two physical volumes to the host computer. The host computer 30 having an alternate path function recognizes the two physical volumes in the first virtual storage apparatus 10 as the same volume. The configuration of virtualizing two volumes of different storage apparatuses and duplicating data is referred to as an HA (High-Availability) configuration, and the primary side of the HA configuration is sometimes referred to as an HA primary, and the secondary side of the HA configuration is sometimes referred to as an HA secondary in the ensuing explanation.

In order to realize the foregoing function, data of the two physical volumes of the first storage apparatus 100 and the second storage apparatus 150 needs to be synchronized. Moreover, in this embodiment, in order to improve the response performance, the physical volumes managed in the first storage apparatus 100 and the physical volumes managed in the second storage apparatus 150 are installed at a short distance. However, the first storage apparatus and the second storage apparatus may also be installed at a long distance.

In addition, the second virtual storage apparatus 20 is located at a long distance from the first virtual storage apparatus 10, and configured from two storage apparatuses; namely, a third storage apparatus 200 and a fourth storage apparatus 250. As with the first virtual storage apparatus 10, the second virtual storage apparatus 20 also has a function of assigning the same virtual volume ID to two physical volumes that are respectively managed by the two storage apparatuses; namely, the third storage apparatus 200 and the fourth storage apparatus 250, and providing the two physical volumes to the host computer 30. This kind of volume redundancy function based on the HA configuration will be explained in detail later.

Moreover, based on an asynchronous remote copy function, data is backed up in the physical volumes that are managed in the third storage apparatus 200 and the fourth storage apparatus 250. If both of the two physical volumes of the first storage apparatus 100 and the second storage apparatus 150 located at a short distance become unavailable due to the occurrence of a widespread disaster, access from the host computer 30 is switched to the second virtual storage apparatus 20 that is positioned at a long distance from the first virtual storage apparatus 10. The configuration of backing up data based on this kind of asynchronous remote copy function is sometimes referred to as an RC (Remote Copy) configuration in the ensuing explanation.

Consequently, it becomes possible to improve the availability of the system by backing up data in a storage apparatus positioned at a long distance based on asynchronous remote copy while effectively utilizing the resources of the two storage apparatuses. Note that, as a configuration that may adopted, for example, the first storage apparatus and the second storage apparatus are installed in the same data center, and the third storage apparatus and the fourth storage apparatus are installed in a different data center of a remote location. Otherwise, the four storage apparatuses may be respectively installed in four different data centers.

Moreover, as the remote copy between the first virtual storage apparatus 10 and the second virtual storage apparatus 20, asynchronous remote copy using journal data is performed. Journal data is data which includes data and a sequential number that indicates the order in which the data was written.

As shown in FIG. 1, the first storage apparatus 100 includes first physical volumes 101A and 101B, which are physical volumes (LDEV: Logical DEVice) for storing data, and a first journal volume 102, which is a physical volume for storing journal data. Similarly, the second storage apparatus 150 includes second physical volumes 151A and 151B, and a second journal volume 152 for storing journal data.

Upon receiving a write request from the host computer 30, the first storage apparatus 100 stores data in the first physical volume 101A or 101B according to the write request, and stores journal data of that data (data and sequential number indicating the order that the data was written) in the first journal volume 102. In addition, the first storage apparatus 100 transfers the data and the sequential number to the second storage apparatus 150. The second storage apparatus 150 stores the received data in the second physical volume 151A or 151B, and creates a journal based on the received sequential number and stores the created journal in the second journal volume 152.

Moreover, the third storage apparatus 200 issues a read journal (RDJNL) command to the first storage apparatus 100 and, by receiving a journal stored in the first journal volume 102, implements remote copy asynchronously with the write request to the first storage apparatus 100. In other words, the third storage apparatus 200 restores the volume by storing the journal received from the first storage apparatus 100 in the second journal volume 202, and storing the data in the third physical volume 201A or 201B based on the sequential number included in the journal. Moreover, the data and the sequential number are also transferred to the fourth storage apparatus 250 from the third storage apparatus 200, and the write data is stored in the fourth physical volume 251A or 251B.

In this embodiment, as described above, a read/write request is sent from the host computer 30 not only to the first storage apparatus 100, but also to the second storage apparatus 150. Moreover, the first physical volume of the first storage apparatus 100 and the second physical volume of the second storage apparatus are recognized as the same volume from the host computer. Here, the sequence of sequential numbers of the journals that is created according to the writing of data becomes a problem. In this embodiment, the sequence of sequential numbers of the journals is guaranteed by fixing the storage apparatus, for which the sequential numbers of the journals are acquired, to the first storage apparatus 100 or the second storage apparatus 150.

For example, the first physical storage apparatus 100 is configured to always acquire a sequential number of the journal, and the first storage apparatus 100 acquires the sequential number of the journal regardless of whether data is written from the host computer 30 into the first storage apparatus 100 or written from the host computer 30 into the second storage apparatus 150. In addition, the sequential number of the journal acquired by the first storage apparatus 100 is transferred to the second storage apparatus 150, and the data and the sequential number are stored in the second journal volume 152 of the second storage apparatus 150. It is thereby possible to guarantee the sequence of sequential numbers of the journals in the first virtual storage apparatus 10.

(1-2) Configuration of Computer System

The computer system according to this embodiment is configured, as shown in FIG. 1, from a first virtual storage apparatus 10 including a first storage apparatus 100 and a second storage apparatus 150, a second virtual storage apparatus 20 including a third storage apparatus 200 and a fourth storage apparatus 250, and a host computer 30.

The first storage apparatus 100 and the second storage apparatus 150 are connected with the host computer 30 via I/O networks 50A and 50B. Moreover, the first storage apparatus 100 and the second storage apparatus 150 are connected via an I/O network 50C. Moreover, the first storage apparatus 100 and the third storage apparatus 200 are connected via an I/O network 40A, and the second storage apparatus 150 and the fourth storage apparatus 250 are connected via an I/O network 40B. In addition, the third storage apparatus 200 and the fourth storage apparatus 250 via an I/O network 40C.

Note that, in FIG. 1, while the first storage apparatus 100 and the third storage apparatus 200 via the I/O network 40A, and the second storage apparatus 150 and the fourth storage apparatus 250 are connected via the I/O network 40B, the configuration is not limited thereto, and the first storage apparatus 100 and the fourth storage apparatus 250 may be connected via an I/O network, and the second storage apparatus 150 and the third storage apparatus 200 may be connected via an I/O network.

The hardware configuration of the first storage apparatus 100, the second storage apparatus 150, the third storage apparatus 200 and the fourth storage apparatus 250 will be explained in detail later.

The host computer 30 sends a data read/write request to the first virtual storage apparatus 10 or the second virtual storage apparatus 20. The host computer 30 has an internal network, and the processor, the memory, and the I/O port are connected to that network. The processor functions as an arithmetic processing unit, and controls the operation of the host computer 30 according to programs and operation parameters stored in the memory.

The I/O networks 40A to 40C and 50A to 50C may be connected via a fibre channel as the first choice, they may also be connected via a combination of FICON (Fibre CONnection: registered trademark) or Ethernet (registered trademark) and TCP/IP (Transmission Control Protocol/Internet Protocol) and iSCSI (internet SCSI (Small Computer System Interface)), or a combination of Ethernet (registered trademark) and a network file system such as NFS (Network File System) or CIFS (Common Internet File System). In addition, the I/O network 1300 may also be other communication devices capable of transferring I/O requests.

(1-3) Configuration of Storage Apparatus

Figure 2:
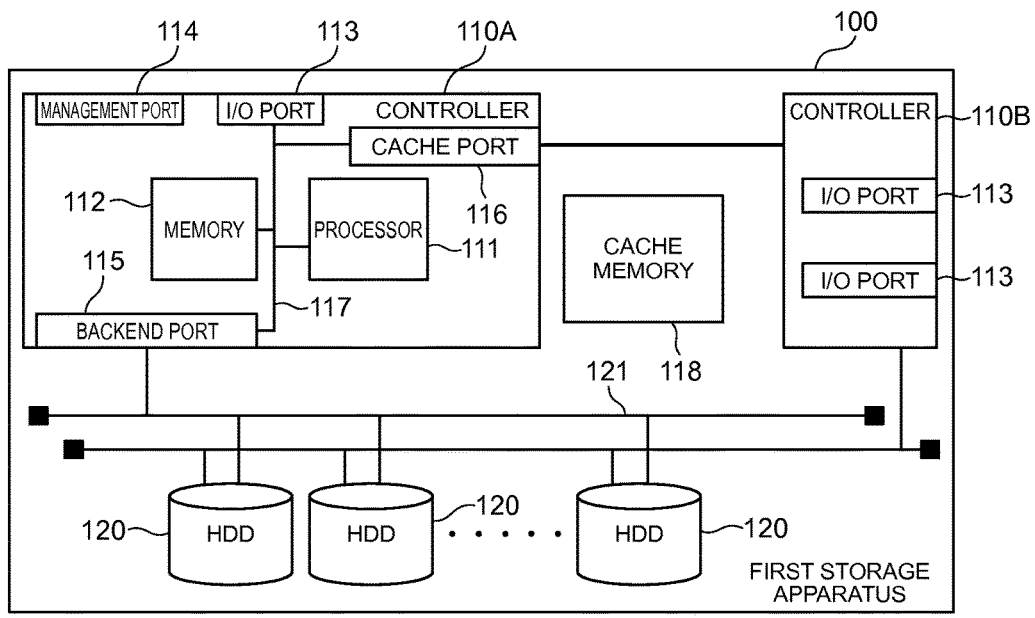
FIG. 2 is a block diagram showing the hardware configuration of the storage apparatus according to the first embodiment.

The hardware configuration of the first storage apparatus 100 is now explained with reference to FIG. 2. As shown in FIG. 2, the first storage apparatus 100 comprises controllers 110A, 110B (hereinafter sometimes collectively referred to as the "controller 110" in the ensuing explanation), a cache memory 118, and a plurality of HDDs (Hard Disk Drives)) 120. The controller 110 and the cache memory 118 may also be respectively configured from a plurality of components. As a result of being configured from a plurality of components, even if a failure occurs in an independent component and that component is blocked, the remaining components can be used to continue receiving I/O requests as represented by read and write requests. Note that the first storage apparatus may also comprise a storage device such as an SSD (Solid State Drive) in substitute for, or in addition to, an HDD.

The controller 110A is a device (for example, a circuit board) for controlling the operation of the first storage apparatus 100. The controller 110A has an internal network 117, and connected to this internal network 117 are an I/O port 113, a cache port 116, a management port 114, a backend port 115, a processor (for example, a CPU (Central Processing Unit)) 111 and a memory 112. The controller 110A, the controller 110B and the cache memory 118 are mutually connected via the internal network 117. Moreover, the controller 110 and the respective HDDs 120 are mutually connected via a plurality of backend networks 121.

Moreover, in FIG. 1, while only one I/O port 113 is provided in the controller 110, in reality, a plurality of I/O ports 113 may be provided in the controller 110.

Moreover, since the hardware configuration of the second storage apparatus 150, the third storage apparatus 200 and the fourth storage apparatus 250 is the same as the first storage apparatus 100, the explanation thereof is omitted.

Based on the foregoing hardware configuration, the host 30 can thereby read and write all or a part of the data stored in the HDD 120 of the first storage apparatus 100, the second storage apparatus 150, the third storage apparatus 200 or the fourth storage apparatus 250. Note that, in the ensuing explanation, while the processing is sometimes explained with each storage apparatus as the subject, in reality, it goes without saying that the processing 111 executes the processing based on the program stored in the memory 112 of each storage apparatus.

The controller controls a plurality of HDDs as a RAID group. Moreover, the controller divides the storage area based on the RAID group and configures one or more physical volumes. In other words, the physical volume is configured based on a part of the storage area of each of the plurality of HDDs in the RAID group. When the controller receives a read/write request from the host computer for reading from or writing into a volume, the controller identifies the HDD corresponding to that volume, and executes the reading/writing of data.

Note that a RAID group is a result of unifying a plurality of HDDs in a specific RAID level. As the RAID levels, there are, for example, RAID 1 referred to as "mirroring" of simultaneously writing the same data in a plurality of drives, RAID 5 of also recording parity data upon dividing and writing data stored in an HDD, and RAID 6 of recording parity data in duplicate in preparation for the simultaneous malfunction of two drives. In this embodiment, the RAID level may be any level.

(1-4) Volume Redundancy Based on HA Configuration

The volume redundancy function based on the HA configuration is now explained with reference to FIGS. 3 to 8. As described above, the volume redundancy function is the function of causing the host computer 30 to recognize different physical volumes as one volume by assigning the same virtual volume ID to different physical volumes.

Figure 3:
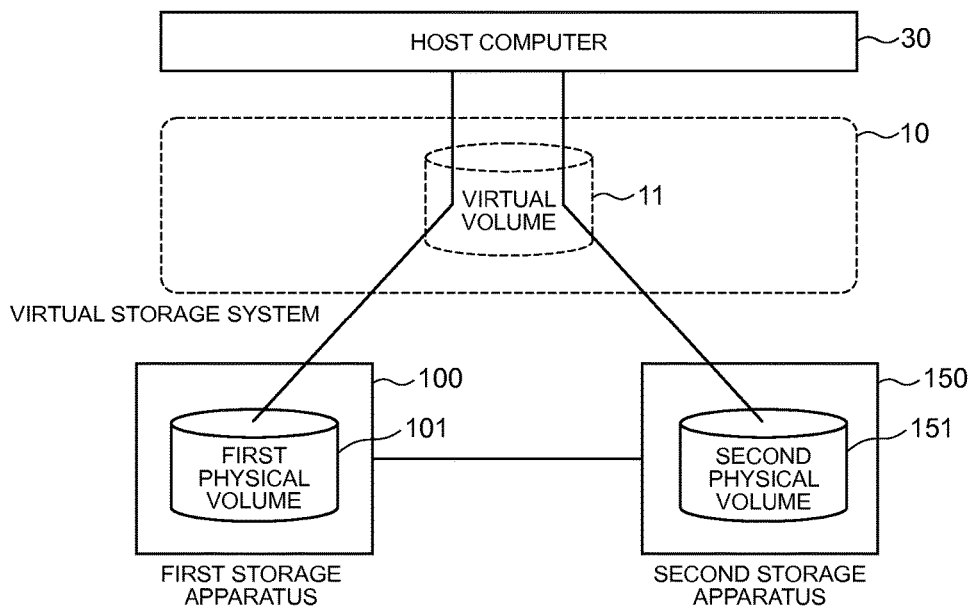
FIG. 3 is a conceptual diagram explaining the volume redundancy function based on the HA configuration according to the first embodiment.

The virtual storage apparatus and the virtual volume are now explained with reference to FIG. 3. The first storage apparatus 100 and the second storage apparatus 150 provide the same virtual storage apparatus ID to the host computer 30. Consequently, as shown in FIG. 3, the host computer 30 will recognize the virtual storage apparatus 10 without differentiation between the first storage apparatus 100 and the second storage apparatus 150. The respective storage apparatuses retain the correlation of their storage apparatus ID and virtual storage apparatus ID, respectively. For example, the mapping table of the storage apparatus ID and the virtual storage apparatus ID is stored in the memory 112 of the respective storage apparatuses. A plurality of virtual storage apparatuses may also be set.

When a storage apparatus ID is included in the port ID (for example, WWN: World Wide Name) of the respective storage apparatuses, a virtual port ID may also be set in the port ID. In other words, a plurality of virtual ports exist in a virtual storage apparatus, and the respective virtual ports are associated with one of the ports of the plurality of physical storage apparatuses. In addition, the host computer 30 designates a virtual port ID and issues an access request without differentiating in which physical storage apparatus the port exists. In the foregoing case, the respective physical storage apparatuses retain information (for example, mapping table) indicating the correlation of the virtual port in the memory and the port of the physical storage apparatus.

The virtual volume 11 that is recognized by the host computer 30 is managed in duplicate by the first physical volume 101 of the first storage apparatus 100 and the second physical volume 151 of the second storage apparatus 140. Specifically, the virtual volume ID of the same virtual volume 11 is managed by being associated with the physical ID of the first volume 101 and the physical ID of the second physical volume 151. The respective storage apparatuses retain the correlation of the virtual volume ID and a plurality of physical volume IDs that are associated with that virtual volume ID. For example, the mapping table of the virtual volume ID and the physical volume ID is stored in the memory 112 of the respective storage apparatuses.

Thus, the host computer 30 can recognize a plurality of storage apparatuses as one virtual storage apparatus 10, and can access the virtual volume 11 in the same manner as accessing a physical volume. In addition, data that is written into one of the physical volumes via the virtual volume 11 is duplicated by also being written into the other physical volume.

Accordingly, with a storage system that does not adopt the HA configuration, data can no longer be accessed when a failure occurs in a physical volume. However, based on the foregoing volume redundancy function, even if a failure occurs in one of the duplicated physical volumes, data can be accessed by using the other physical volume.

Moreover, upon migrating data from an old physical storage apparatus to a new physical storage apparatus, by virtualizing the physical storage apparatus and causing the host computer to recognize the new storage apparatus to be the same virtual storage apparatus as the old storage apparatus, similar operations can be performed before and after the migration. In other words, the physical storage apparatus can be replaced without having to stop the business affairs being carried out with the host computer.

As described above, with the volume redundancy function, even if one of the duplicated physical volumes becomes unavailable, data can be accessed by using the other physical volume. Thus, other than times of an occurrence of a failure, data needs to be duplicated and written into the two physical volumes. Here, the write processing that is performed upon duplicating data is explained with reference to FIG. 4 and FIG. 5.

Figure 4:
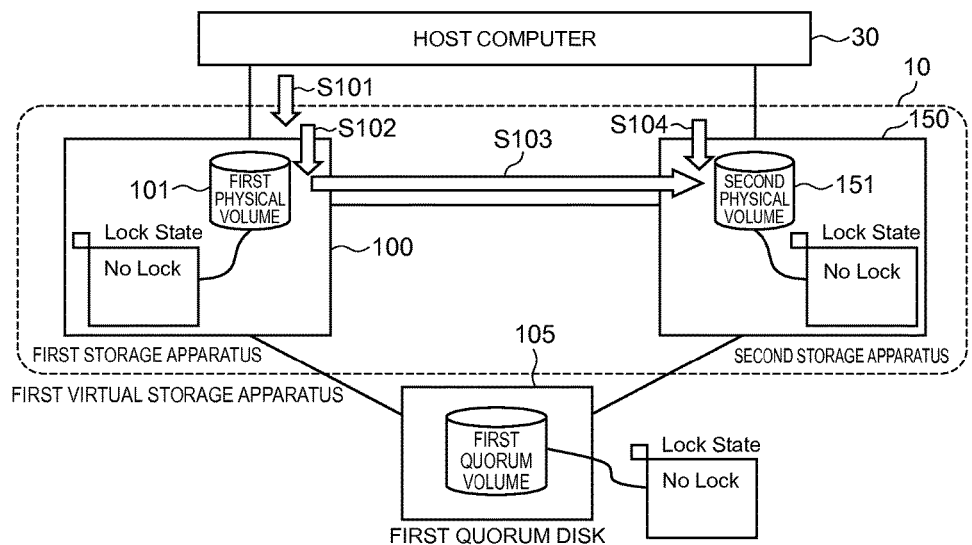
FIG. 4 is a conceptual diagram explaining the volume redundancy function based on the HA configuration according to the first embodiment.

As shown in FIG. 4, the first virtual storage apparatus 10 is configured from a first storage apparatus 100 and a second storage apparatus 150. In the ensuing explanation, a primary apparatus of the HA configuration (HA primary) is explained as the first storage apparatus 100, and a secondary apparatus of the HA configuration (HA secondary) is explained as the second storage apparatus 150. With the HA configuration, in order to maintain the consistency of data, it is necessary to predetermine a writing rule indicating from which device of the two devices data is to be written into its volume. In the ensuing explanation, explained is the write processing of writing data first into the HA primary side; that is, into the first storage apparatus 100.

As shown in FIG. 4, when a write request is sent from the host computer 30 to the first storage apparatus 100 (S101), the first storage apparatus 100 writes the data into the first physical volume 101 (S102). In addition, the first storage apparatus 100 transfers the data to the second storage apparatus 150 (S103), and the second storage apparatus 150 writes the data into the second physical volume 151 (S104). The role of the Quorum Disk shown in FIG. 4 will be explained in detail later.

Figure 5:
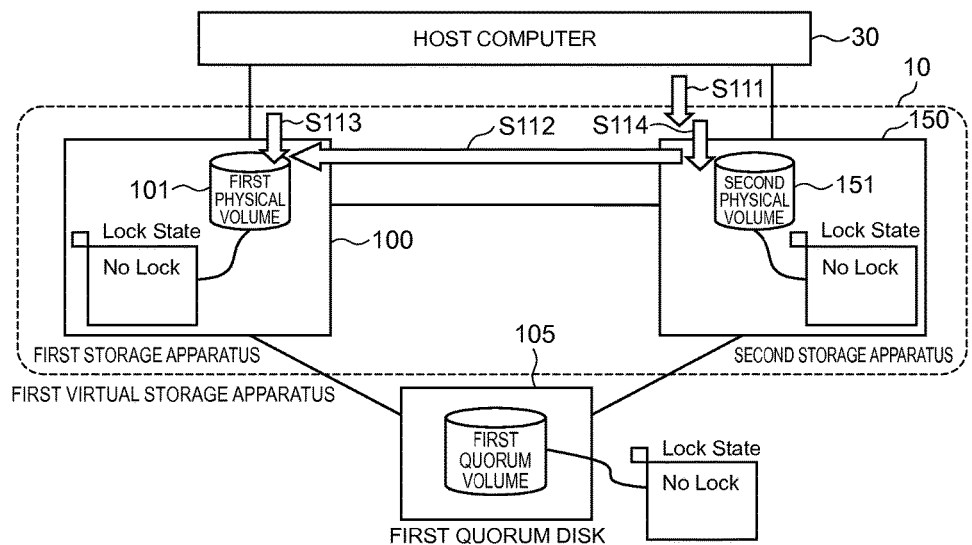
FIG. 5 is a conceptual diagram explaining the volume redundancy function based on the HA configuration according to the first embodiment.

Moreover, as shown in FIG. 5, when a write request is sent from the host computer 30 to the second storage apparatus 150 (S111), the second storage apparatus 150 transfers the data to the first storage apparatus 100 (S112). In addition, after the first storage apparatus 100 writes the data into the first physical volume 101 (S113), data is additionally written into the second physical volume 151 of the second storage apparatus 150 (S114).

The read processing is now explained. For example, in a state when data is written only in the primary side, considered may be a case where the data that is written only in the primary side is read. Here, when a failure occurs on the primary side and becomes unavailable before the data is written into the secondary side and a read command is issued to the secondary side, considered may be a case where data, which is older than the data on the primary side, is read. In order to avoid this kind of data inconsistency, as the means for guaranteeing the sequence of read processing according to the write processing, considered may be the exclusive control of write processing and read processing to the same data range. This is now explained in detail.

Foremost, the means for guaranteeing the sequence of read processing is explained with reference to FIG. 6 and FIG. 7. The reading order of data in read processing differs according to the foregoing writing rule. When the order of write processing is set to be from the primary side to the secondary side, read processing is executed from the secondary side. Contrarily, when the order of write processing is set to be from the secondary side to the primary side, read processing is executed from the primary side.

In the ensuing explanation, explained is a case of performing read processing from the secondary side. As shown in FIG. 6, when a read request is sent from the host computer 30 to the first storage apparatus 100 (S121), the read request is notified from the first storage apparatus 100 to the second storage apparatus 200, and data is read from the second physical volume 151 of the second storage apparatus 200 (S122).

Figure 7:
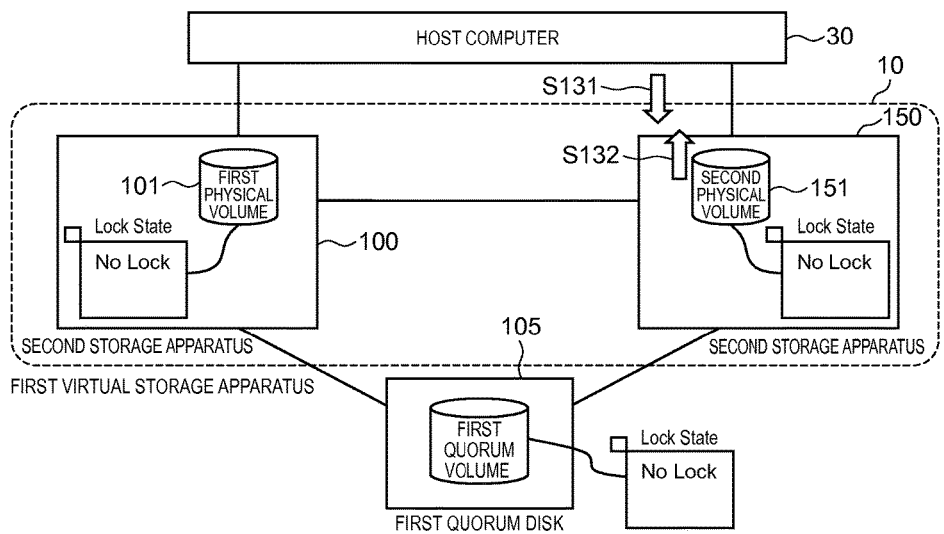
FIG. 7 is a conceptual diagram explaining the volume redundancy function based on the HA configuration according to the first embodiment.

Moreover, as shown in FIG. 7, when a read request is sent from the host computer 30 to the second storage apparatus 100 (S131), data is read from the second physical volume 151 of the second storage apparatus 100 (S132). Accordingly, when a read request is sent from the host computer 30, by always reading the data from the secondary side, it is possible to avoid the inconsistency of data during a volume failure.

Figure 8:
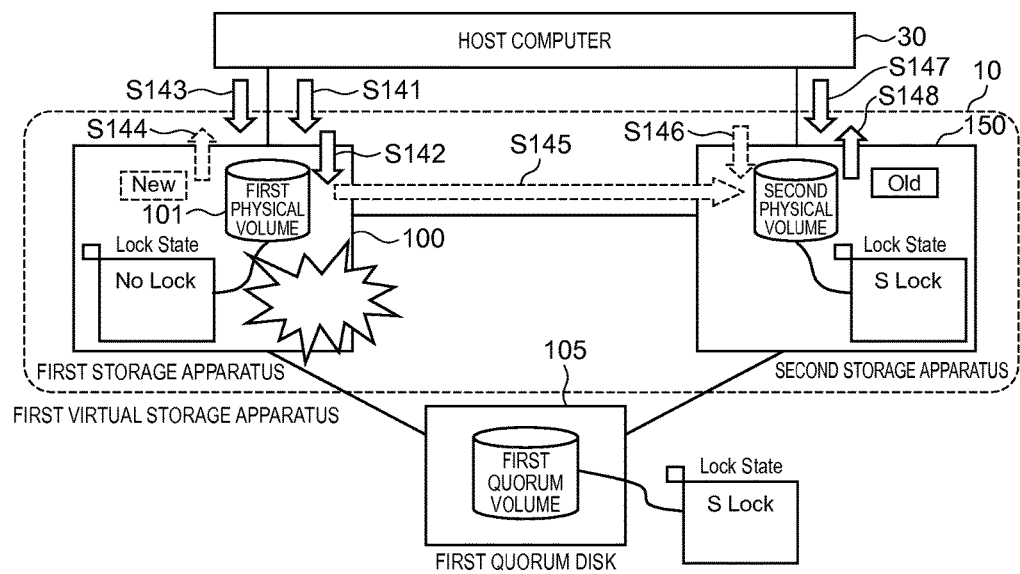
FIG. 8 is a conceptual diagram explaining the volume redundancy function based on the HA configuration according to the first embodiment.

The exclusive control of write processing and read processing is now explained with reference to FIG. 8. When a write request is sent from the host computer 30 to the first storage apparatus (S141), data is written into the first volume 101 (S142). Subsequently, when a failure occurs in the first storage apparatus 100 before the data is transferred to the second storage apparatus 150, data transfer to the second storage apparatus (S145) and data writing in the second physical volume 151 (S146) are not performed.

Here, when a data read request is sent to the second storage apparatus 150 (S147), since new data is not written into the second physical volume 151, old data is read (S148).

Meanwhile, on the side of the first storage apparatus 100, a read command to the first volume 101 is rejected until the writing of new data on the side of the second storage apparatus 150 is completed. Consequently, even when a failure occurs in the first storage apparatus 100 before the data transfer, since new data is not read on the side of the first storage apparatus 100, the reversion of data will not occur, and inconsistency of data during a volume failure can be avoided.

The initial copy to be performed upon forming the HA configuration is now explained. In the initial copy of the HA configuration, all data on the primary side of the HA configuration (HA primary side) are copied to the secondary side of the HA configuration (HA secondary side). In addition, the difference bitmap is managed from the initial data position to the final data position, and data in which the difference bitmap is ON is copied in order from the initial position to the final position. During the initial copy, the difference bitmap of all data is set to ON.

With regard to the operation of read/write processing, let it be assumed that write processing is performed in order from the HA primary side to the HA secondary side in the same manner as described above. The write processing operation to the data position where the initial copy is complete is performed in order from the HA primary side to the HA secondary side. Moreover, the write processing to the data position where the initial copy is not complete is not performed to the secondary side, the write processing is performed only to the HA primary side, and the data written to the HA primary side is written to the HA secondary side based on the initial copy.

Note that, if a failure occurs on the HA primary side during the initial copy, since the data on the HA secondary side is unavailable because the copy is not complete, Lock of the quorum disk is acquired on the HA primary side. The quorum disk 105 is a storage device that is used for performing adjustments between the devices. With the HA configuration, shared exclusive control is performed to the quorum disk 105 by using a SCSI command. As described above, when a failure occurs on the HA primary side during the initial copy, the lock of the quorum disk on the HA primary side is acquired, and access to the HA secondary side is guarded.

The case when a failure occurs after the completion of the initial copy is now explained.

(HA Primary Volume Failure/Apparatus Failure)

If a failure occurs on the HA primary side, since data is not duplicated on the HA primary side, data on the HA primary side becomes old data in comparison to the HA secondary side. In order to prevent access from the host computer 30 to old data, the lock of the quorum disk 105 is acquired on the HA secondary side. Access to the HA primary side is guarded as a result of the lock being acquired on the HA secondary side. Moreover, at the point in time that the lock of the quorum disk 105 is acquired on the HA secondary side, the second storage apparatus 150, which used to be the HA secondary side, will have the attribute of the HA primary side. In addition, data that cannot be duplicated on the HA primary side is managed based on difference on the HA secondary side.

(HA Secondary Volume Failure/Apparatus Failure)

Moreover, when a failure occurs on the HA secondary side, the lock of the quorum disk 105 is acquired on the HA primary side. Access to the HA secondary side is guided as a result of the lock being acquired on the HA primary side. Moreover, data that cannot be duplicated on the HA secondary is managed based on difference on the HA primary side.

(Path Failure)

For example, let it be assumed that a write request has been sent from the host computer 30 to the secondary side but data cannot be written to the primary side due to a path failure. In the foregoing case, the lock of the quorum disk 105 is acquired on the HA secondary side. Access to the HA primary side is guarded as a result of the lock being acquired on the HA secondary side. Moreover, let it be assumed that a write request has been sent from the host computer 30 to the primary side but data cannot be written to the secondary side due to a path failure. In the foregoing case, the lock of the quorum disk 105 is acquired on the HA primary side. Access to the HA secondary side is guarded as a result of the lock being acquired on the HA primary side.

(Quorum Disk Failure)

Moreover, when a failure occurs in the quorum disk 105, the failure is detected based on the periodical inspection on the HA primary side. In addition, let it be assumed that the lock of the quorum disk is acquired on the HA primary side and the HA secondary side becomes a blocked state. This is because, when data on the primary side and the secondary side can no longer be synchronized after the failure of the quorum disk 105, determination of which data is the latest data can be facilitated. In addition, after the failure of the quorum disk is recovered, the lock acquisition information on the HA primary side is written into the quorum disk 105.

The failure recovery processing in the HA configuration is now explained. Foremost, a case where the failure on the HA secondary side is recovered is explained. The failed part on the HA secondary side is foremost recovered. In addition, a resin operation is performed from the HA primary side to the HA secondary side. As a result of performing the resin operation, difference data is copied between the HA primary side and the HA secondary side. In addition, during the resin completion, the lock state of the quorum disk 105 on the HA primary side is cancelled. Subsequently, the path from the host computer 30 to the HA secondary side is recovered, and the blocked state on the HA secondary side is recovered.

Moreover, during the difference data copy based on the resin operation, with regard to the write processing to the data range in which the difference bitmap is ON, write processing is performed only to the HA primary side while leaving the difference bitmap ON, and data is copied to the HA secondary side based on difference copy. While it is also possible to consider performing write processing to both the HA primary/HA secondary side and turning OFF the difference bitmap, in the foregoing case, the response time will increase due to the processing of turning OFF the difference bitmap on the HA primary side after the write processing to the HA secondary side. Moreover, with regard to the write processing to the data range in which the difference bitmap is OFF, data is written into duplicate to both the HA primary side and the HA secondary side while the difference bitmap is OFF.

The case of recovering the failure on the HA primary side is now explained. Foremost, the failed part on the original HA primary side is recovered. Note that, from the point in time that the lock of the quorum disk 105 was acquired, the roles of the HA secondary side and the HA primary side are reversed. In addition, the resin operation is performed from the original HA secondary side to the original HA primary side. Based on the performance of the resin operation, difference data is copied from the original HA secondary side to the original HA primary side. Subsequently, the lock state of the quorum disk on the original HA secondary side is cancelled when the resin is complete. In addition, the path from the host computer 30 to the original HA primary side is recovered, and the blocked state on the HA primary side is recovered.

Moreover, during the difference data copy based on the resin operation, with regard to the write processing to the data range in which the difference bitmap is ON, write processing is performed only to the original HA secondary side while leaving the difference bitmap ON, and data is copied to the original HA primary side based on difference copy. While it is also possible to consider performing write processing to both the original HA secondary/original HA primary side and turning OFF the difference bitmap, in the foregoing case, the response time will increase due to the processing of turning OFF the difference bitmap on the HA secondary side after the write processing to the original HA primary side. Moreover, with regard to the write processing to the data range in which the difference bitmap is OFF, data is written into duplicate to both the original HA secondary side and the original HA primary side while the difference bitmap is OFF.

(1-5) Coordination with Asynchronous Remote Copy Function

Coordination with the foregoing asynchronous remote copy function is now explained. In the ensuing explanation, explained is the processing of coordinating the foregoing HA configuration and the RC configuration, which is the configuration of backing up the data based on the asynchronous remote copy function.

(Write Processing Part 1)

Figure 9:
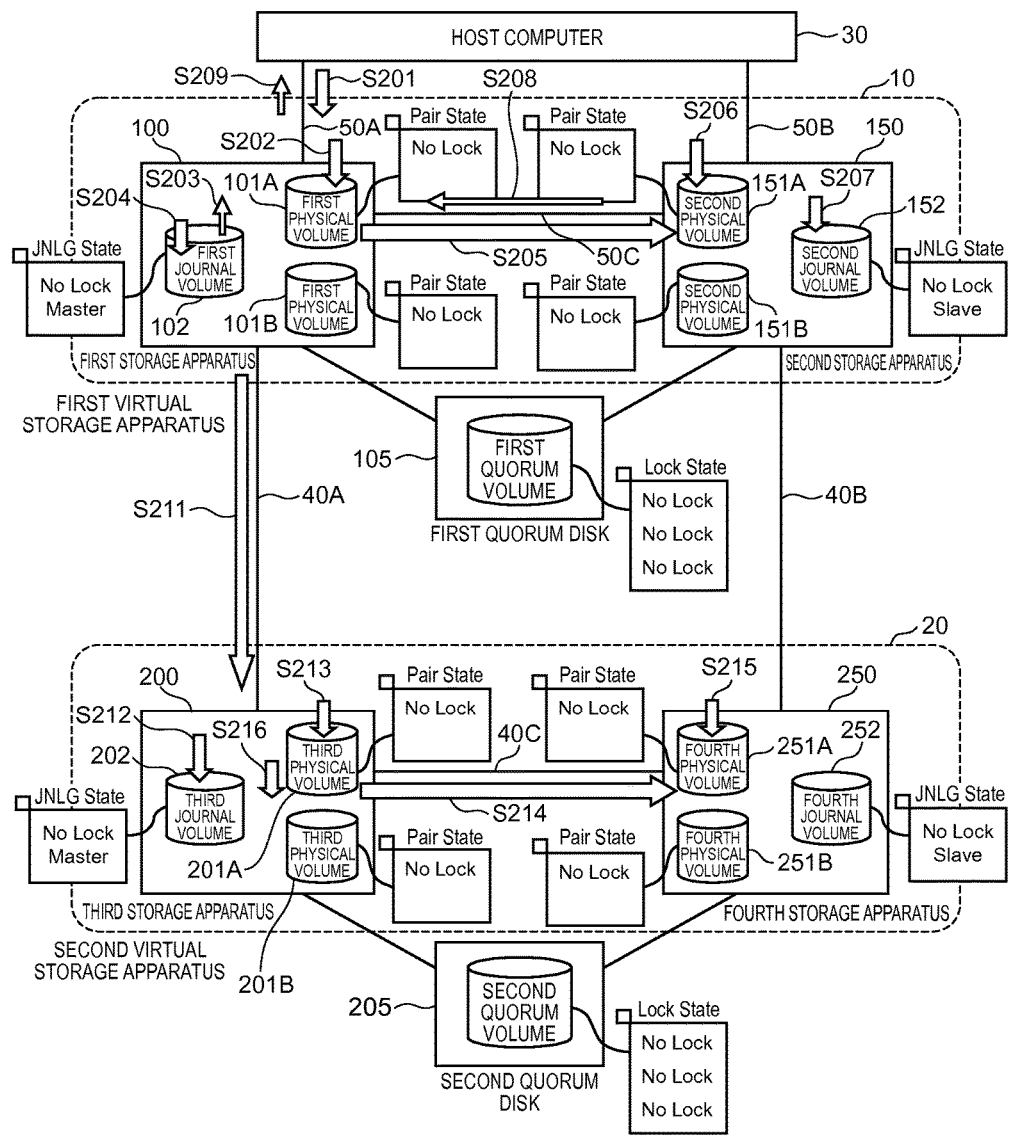
FIG. 9 is a conceptual diagram explaining the cooperative processing with the RC configuration according to the first embodiment.

The normal processing that is performed when a write request is sent from the host computer 30 to the HA primary side is now explained with reference to FIG. 9. In FIG. 9, as with the configuration of FIG. 1, the first storage apparatus 100 and the second storage apparatus 150 form the HA configuration of duplicating the volume, and the third storage apparatus 200 and the fourth storage apparatus 250 also form the HA configuration. Moreover, the first virtual storage apparatus 10 including the first storage apparatus and the second storage apparatus and the second virtual storage apparatus 20 including the third storage apparatus 200 and the fourth storage apparatus 250 form the RC configuration in which data is duplicated based on the asynchronous remote copy function.

Foremost, when a write request is sent from the host computer 30 to the first storage apparatus 100 (S201), the first storage apparatus 100 writes the data into the first physical volume 101A (S202). Subsequently, the first storage apparatus 100 acquires the sequential number of the data (S203), and creates a journal in the first journal volume 102 (S204). In addition, the first storage apparatus 100 transfers the data and the sequential number to the second storage apparatus 200, and performs data duplication processing (S205). Note that, as shown in FIG. 9, the journal attribute (indicated as "JNLG State" in the diagrams) on the primary side of the HA configuration; that is, on the side of creating a journal becomes the master (indicated as "Master" in the diagrams), and the journal attribute on the secondary side of the HA configuration; that is, the side to receive the created journal, becomes the slave.

The second storage apparatus 150 writes data into the second physical volume 151A (S206), and uses the sequential number sent in step S205 to create a journal in the second journal volume 152 (S207). Subsequently, the second storage apparatus 150 sends an end response to the first storage apparatus 100 (S208), and the first storage apparatus 100 sends an end response to the host computer 30 (S209).

Next, the third storage apparatus 200 asynchronously issues an RDJNL command, and acquires the journal stored in the first journal volume 102 of the first storage apparatus 100 (S211). The third storage apparatus 200 stores the journal data in the third journal volume 202 (S212), and performs the restoration processing of restoring data from the journal data (S213). The third storage apparatus 200 transfers the data and the sequential number to the fourth storage apparatus 250, and performs data duplication processing (S214).

Subsequently, the fourth storage apparatus 250 writes the data into the fourth physical volume 251A (S215), and the third storage apparatus 200 writes the data into the third physical volume 201A (S216).

(Write Processing Part 2)

The normal processing that is performed when a write request is sent from the host computer 30 to the HA secondary side is now explained with reference to FIG. 10.

Foremost, when a write request is sent from the host computer 30 to the second storage apparatus 150 (S221), the second storage apparatus 150 transfers the data to the first storage apparatus 150 (S222). Subsequently, the first storage apparatus 100 writes the data into the first physical volume 101A (S223), acquires the sequential number of the data (S224), and creates a journal in the first journal volume 102 (S225). In addition, the first storage apparatus 100 transfers the data and the sequential number to the second storage apparatus 200, and sends an end response (S226).

The second storage apparatus 150 writes the data into the second physical volume 151A (S227), and uses the sequential number sent in step S226 and creates a journal in the second journal volume 152 (S228). Subsequently, the second storage apparatus 150 sends an end response to the host computer 30 (S229).

Since the subsequent processing of the asynchronous remote copy in the third storage apparatus 200 and the fourth storage apparatus 250 of the second virtual storage apparatus 20 is the same as the processing of FIG. 9, the detailed explanation is omitted.

(Write Processing Part 3)

Moreover, while FIG. 11 explains the normal processing that is performed when a write request is sent from the host computer 30 to both the HA primary side and the HA secondary side, since the processing is the same as the processing explained with reference to FIG. 9 when a write request is sent to the HA primary side, and the processing is the same as the processing explained with reference to FIG. 10 when a write request is sent to the HA secondary side, the detailed explanation is omitted. Moreover, even when a write request is sent to both the HA primary side and the HA secondary side, since the asynchronous remote copy processing is the same as the processing of FIG. 9, the detailed explanation is omitted.

In this embodiment, when the respective storage apparatuses include a plurality of volumes, a journal is created in the plurality of volumes. Specifically, as shown in FIG. 11, when data is written into the first physical volume 101B of the first storage apparatus 100 (S242), a sequential number of that data is acquired (S243), and a journal is created in the first journal volume 102 (S244). Moreover, when data is written into the first physical volume 101A (S253), a sequential number of that data is acquired (S254), and a journal is created in the first journal volume 102 (S255).

As described above, in this embodiment, a sequence of sequential numbers is assigned to the writing into a plurality of volumes. If a failure occurs in one volume among the plurality of volumes, the failover can be carried out with the volume units without having to perform the failover in journal group units to which the failed volume belongs. Consequently, it is possible to avoid a situation where access from the host computer 30 is biased to one storage apparatus during the occurrence of a failure, and resources cannot be effectively utilized.

(Purge Processing)

Figure 12:
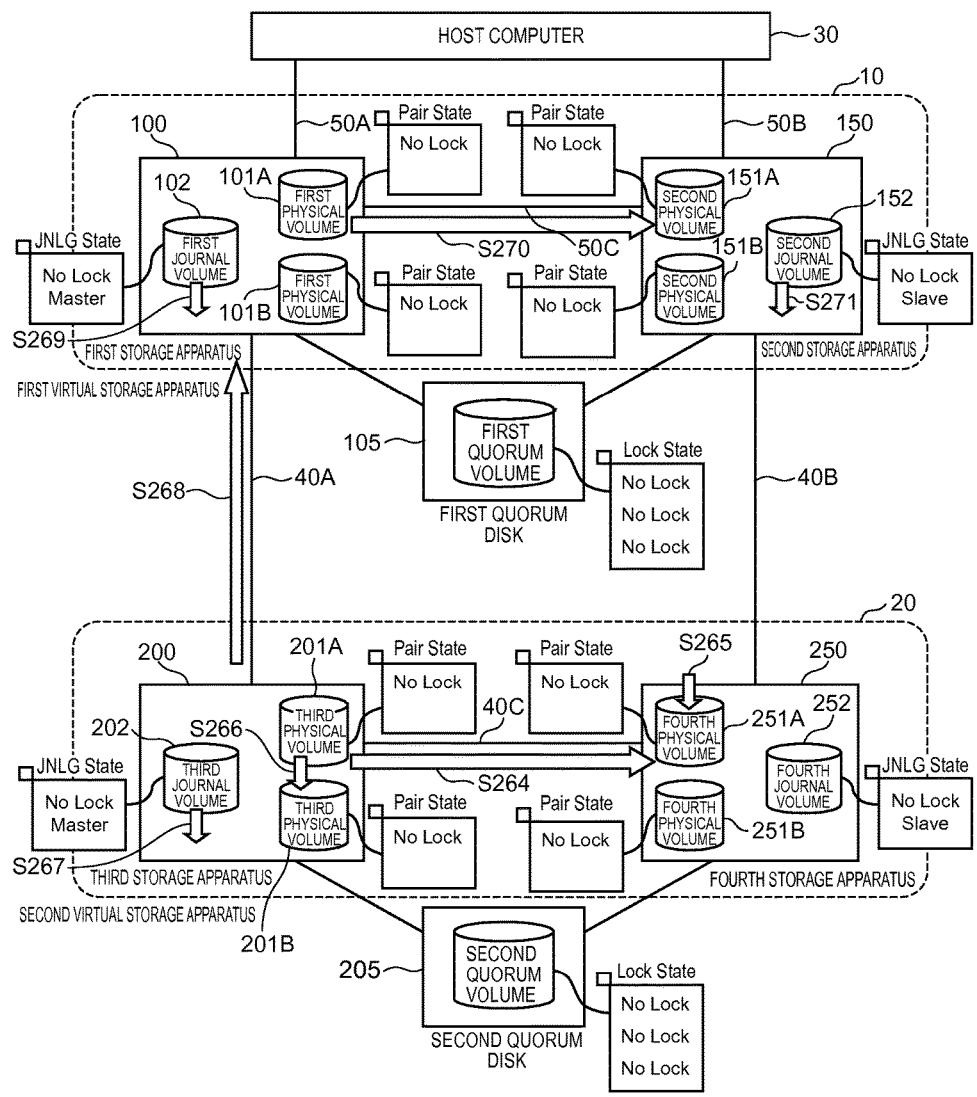
FIG. 12 is a conceptual diagram explaining the purge processing according to the first embodiment.

The purge processing for abolishing the journal data is now explained. As shown in FIG. 12, duplication processing (S264, S265) is normally performed in the second virtual storage apparatus 20, data is written into the third physical volume 201B of the third storage apparatus 200 (S266), and the journal data is purged (S267).

Upon using the RDJNL command and acquiring a journal from the first storage apparatus 100, the third storage apparatus 200 notifies a purge able sequential number of the journal to the first storage apparatus 100 (S268). The first storage apparatus 100 purges the journal that was notified from the first journal volume 102 in step S268 (S269). Subsequently, the first storage apparatus 100 notifies the purge able sequential number of the journal to the second storage apparatus 150 (S270). The second storage apparatus 150 purges, from the second journal volume 152, the journal of the sequential number that was notified in step S270 (S271).

(1-6) Failure Pattern

The processing that is performed during the occurrence of a failure in the configuration of coordinating the foregoing HA configuration and the RC configuration, which is the configuration of backing up the data based on the asynchronous remote copy function is now explained.

(Failure Pattern 1)

Figure 13:
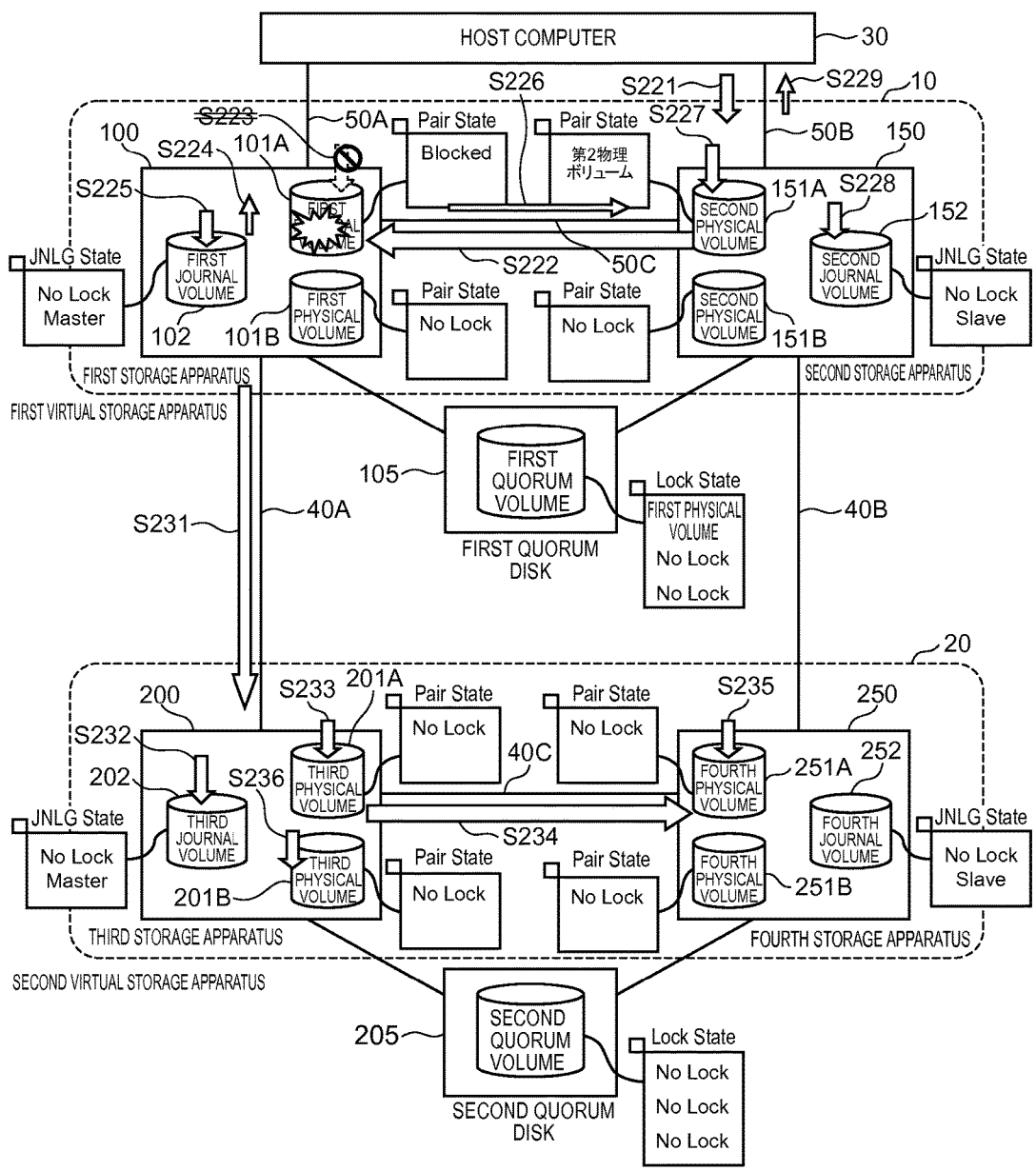
FIG. 13 is a conceptual diagram explaining the processing that is performed upon the occurrence of a failure in the first physical volume according to the first embodiment.

FIG. 13 shows a case where a failure occurred in the first physical volume 101A of the first storage apparatus 100. As shown in FIG. 13, when a write request is sent from the host computer 30 to the second storage apparatus 150 (S221), the second storage apparatus 150 transfers the data to the first storage apparatus 100 (S222). Nevertheless, data is not written since a failure has occurred in the first physical volume 101A, and the sequential number of the data is acquired (S224), and a journal is created in the first journal volume 102 (S225).

Figure 10:
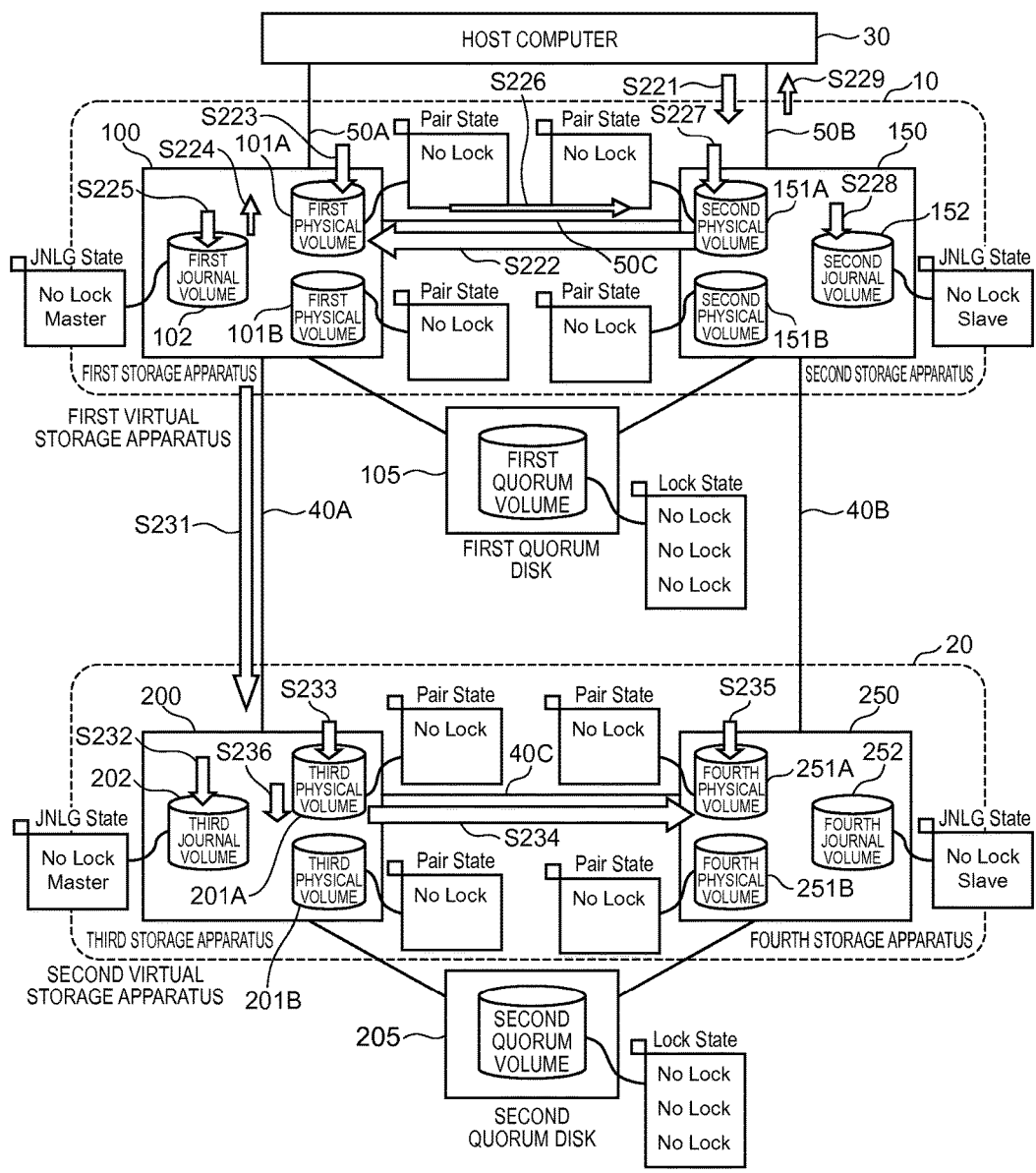
FIG. 10 is a conceptual diagram explaining the cooperative processing with the RC configuration according to the first embodiment.

Since step S226 onward is the same as the write processing shown in FIG. 10, the detailed explanation is omitted. Accordingly, even if a failure occurs in the first physical volume 101A, the sequence of data in the foregoing HA configuration can be ensured by acquiring the sequential number of the data and creating a journal in the first storage apparatus 100, and, even if a failure occurs in yet another pair volume (for example, pair of first physical volume 101B and second physical volume 151B) after the occurrence of the volume failure, continuation of the asynchronous remote copy is enabled.

(Failure Pattern 2)

Figure 14:
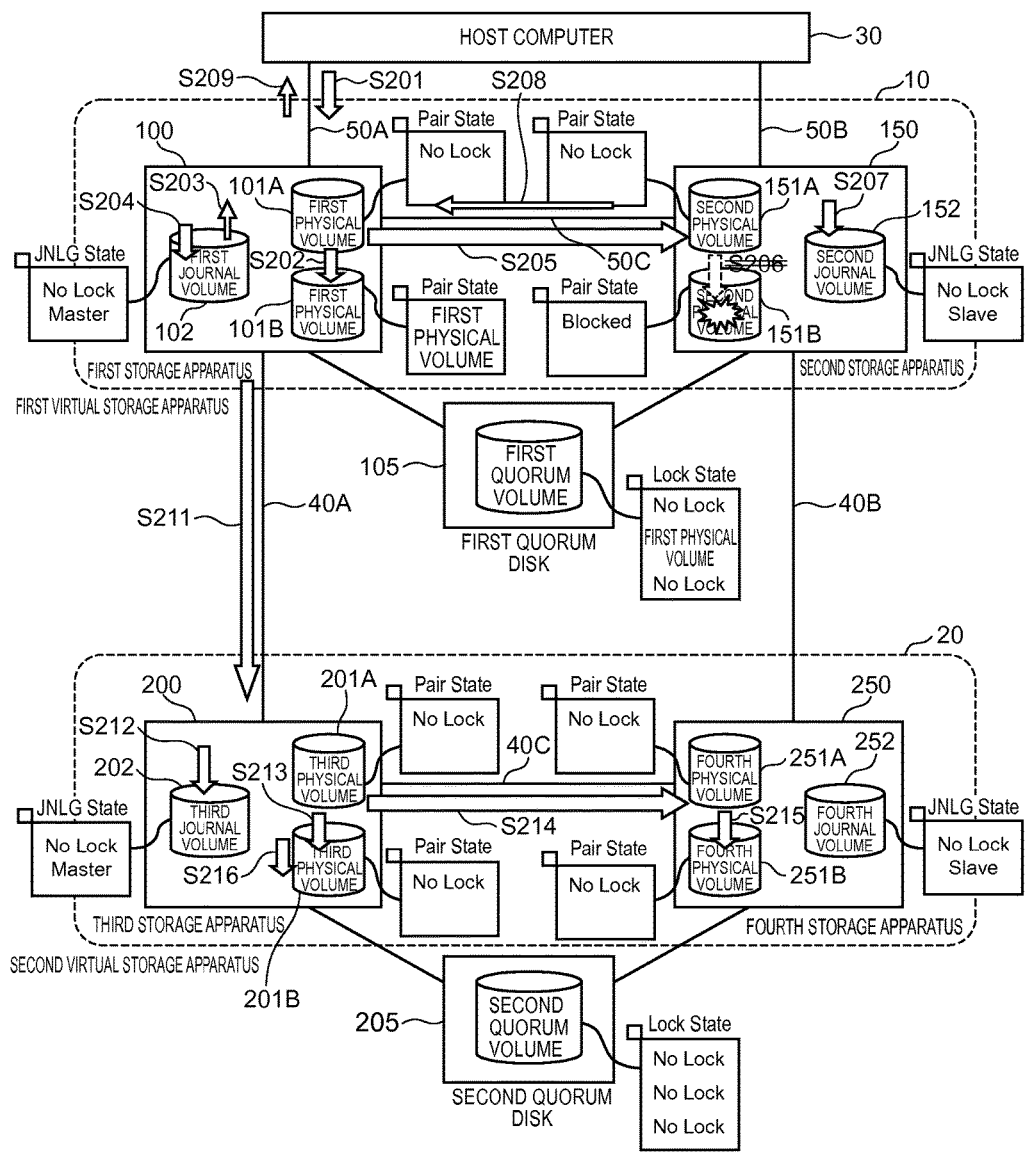
FIG. 14 is a conceptual diagram explaining the processing that is performed upon the occurrence of a failure in the second physical volume according to the first embodiment.

FIG. 14 shows a case where a failure occurred in the second physical volume 151B of the second storage apparatus 150. As shown in FIG. 14, when a write request is sent from the host computer 30 to the first storage apparatus 100 (S201), the first storage apparatus 100 writes the data into the first physical volume 101B (S202). Subsequently, the first storage apparatus 100 acquires the sequential number of the data (S203), and creates a journal in the first journal volume 102 (S204). Subsequently, the first storage apparatus 100 transfers the data and the sequential number to the second storage apparatus 200, and performs data duplication processing (S205).

Since a failure occurred in the second physical volume 151B, the second storage apparatus 150 does not write the data into the second physical volume 151B, and uses the sequential number sent in step S205 and creates a journal in the second journal volume 152 (S207). Subsequently, the second storage apparatus 150 sends an end response to the first storage apparatus 100 (S208), and the first storage apparatus 100 sends an end response to the host computer 30 (S209).

Since the processing of asynchronous remote copy in the third storage apparatus 200 and the fourth storage apparatus 250 of the second virtual storage apparatus 20 is the same as the processing of FIG. 9, the detailed explanation is omitted.

Accordingly, even if a failure occurs in the second physical volume 101B, the sequence of data in the foregoing HA configuration can be ensured by acquiring the sequential number of the data and creating a journal in the first storage apparatus 100, and, even if a failure occurs in yet another pair volume after the occurrence of the volume failure, continuation of the asynchronous remote copy is enabled.

(Failure Pattern 3)

Figure 15:
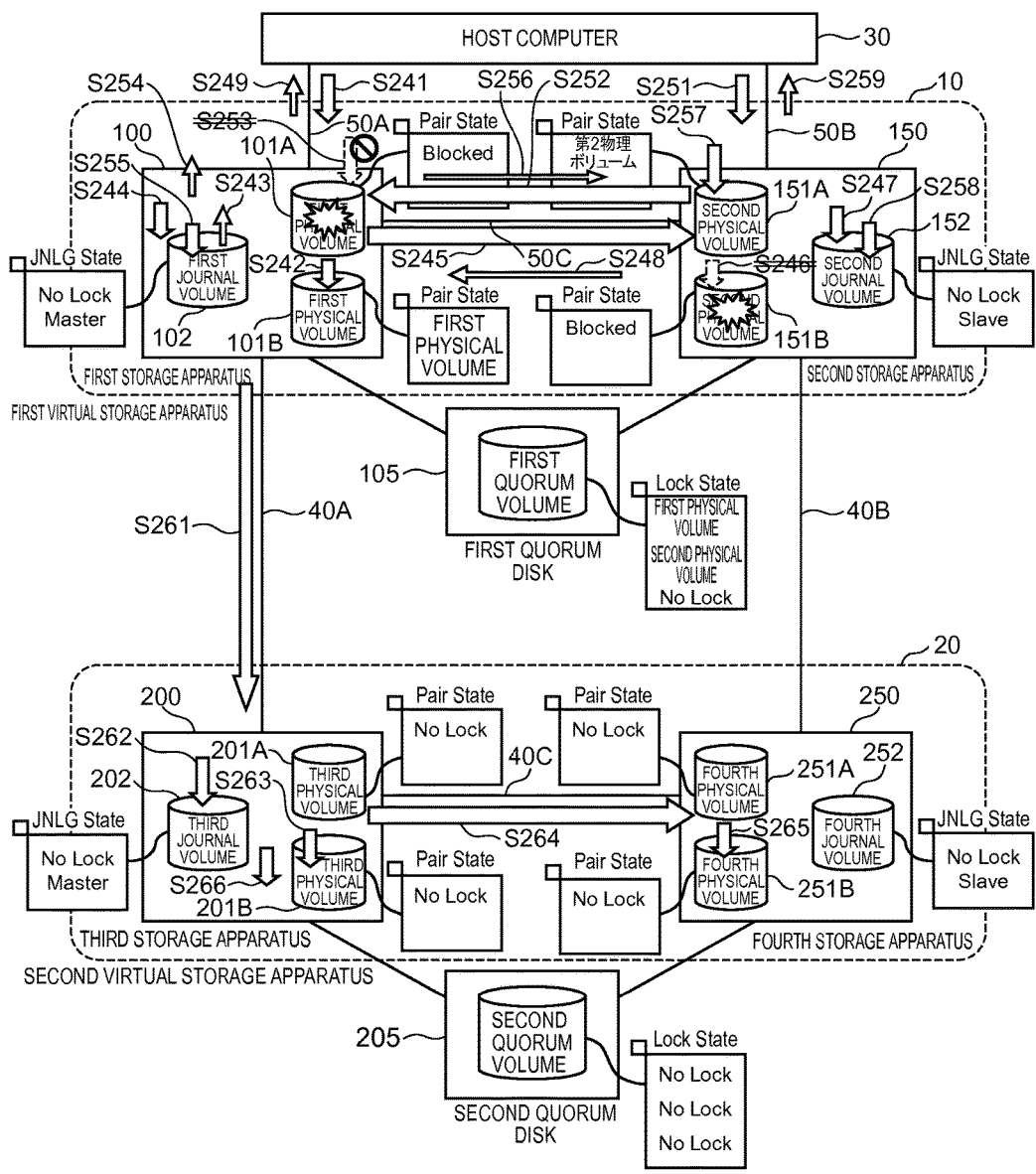
FIG. 15 is a conceptual diagram explaining the processing that is performed upon the occurrence of a failure in the first and second physical volumes according to the first embodiment.

FIG. 15 shows a case where a failure occurred in the first physical volume 101A of the first storage apparatus 100 and the second physical volume 151B of the second storage apparatus 200. As shown in FIG. 15, if a failure occurs in the first physical volume 101A and the second physical volume 151B, data is not written into both volumes in step S253 and step S246. Nevertheless, acquisition of the sequential number and creation of the journal are performed in step S243 and step S244. Moreover, creation of the journal is also performed in step S247.

Accordingly, even if a failure occurs in the volume of both apparatuses, by continuing the creation of the journal, even if a failure occurs in yet another pair volume after the occurrence of the volume failure of the first storage apparatus 100 or the second storage apparatus 150, continuation of the asynchronous remote copy is enabled.

(Failure Pattern 4)

Figure 16:
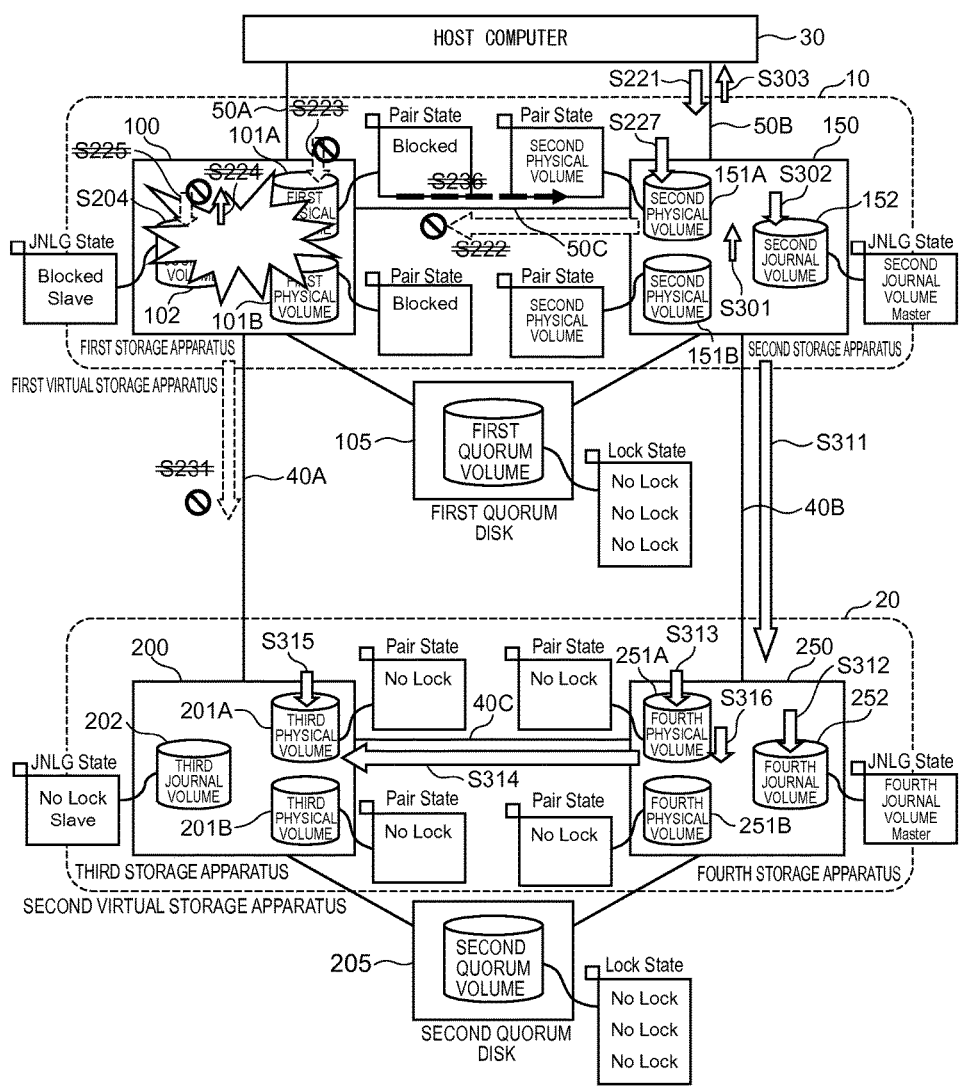
FIG. 16 is a conceptual diagram explaining the processing that is performed upon the occurrence of a failure in the first storage apparatus according to the first embodiment.

FIG. 16 shows a case where a failure occurred in the first storage apparatus 100. When a failure occurs in the first storage apparatus 100, even if a write request is sent to the second storage apparatus 150, data cannot be transferred to the first storage apparatus 100, the duplication processing from step S222 to step S226 cannot be performed. Specifically, when the second storage apparatus 150 detects that the duplication write processing cannot be performed to the first storage apparatus 100 and acquires a journal lock in the quorum disk 105, the second storage apparatus 150 stops the duplication write processing of the journal.

Subsequently, when all locks of the volume pair and the journal group are acquired in the quorum disk 105, the second storage apparatus 150 switches the second storage apparatus 150 to the primary side. Subsequently, the second storage apparatus 150 switches the journal attribute (indicated as "JNLG State" in the diagrams) from slave (Slave) to master (Master), and writes the data into the second physical volume 151A (S227). The second storage apparatus 150 indexes the sequential number in which 1 is added to the sequential number of the journal created in the second journal volume 152 (S301), and creates a journal (S302).

Note that, when a failure occurs in the first storage apparatus 100, the lock state of the journal group and the volume pair is set to a blocked state (Blocked). Moreover, if the first storage apparatus 100 malfunctions before the lock state is set to a Block state, the quorum disk 105 is read upon the recovery of the first storage apparatus 100, and, when the other side of the HA configuration has acquired Lock, its own lock state is changed to a Block.

Subsequently, the second storage apparatus 150 notifies the fourth storage apparatus 250 that the master of the journal attribute has been switched; that is, the second storage apparatus 150 is now the primary side. Note that, when the second storage apparatus 150 and the third storage apparatus 200 are connected via a network, the switching of the master of the journal attribute may also be notified to the third storage apparatus 200.

When the fourth storage apparatus 250 receives a notice of the journal attribute switching from the second storage apparatus 150, the fourth storage apparatus 250 changes the journal attribute to master, and additionally issues an RDJNL stop command to the third storage apparatus 200. Moreover, the third storage apparatus 200 receives the RDJNL stop command, and stops the issue of the RDJNL command. Subsequently, the fourth storage apparatus 250 adds 1 to the restored sequential number and issues an RDJNL command (S311) to the second storage apparatus 150 and acquires a journal (S312), and starts the restoration (S313).

Subsequently, the fourth storage apparatus 250 transfers the data and the sequential number to the third storage apparatus 200, and performs data duplication processing (S314). The third storage apparatus 200 writes the data into the third physical volume 201A (S315), and the fourth storage apparatus 250 writes the data into the fourth physical volume 251A (S316).

As described above, in the first storage apparatus 100 and the second storage apparatus 150, the plurality of volumes and the journal are subject to duplicate management based on the HA configuration. Thus, even if a failure occurs in the first storage apparatus 100, it is possible to continue the access from the host computer 30 to the second storage apparatus 150, and continue the remote copy between the second storage apparatus 150 and the storage apparatus on the secondary side of the RC configuration.

(Failure Pattern 5)

Figure 17:
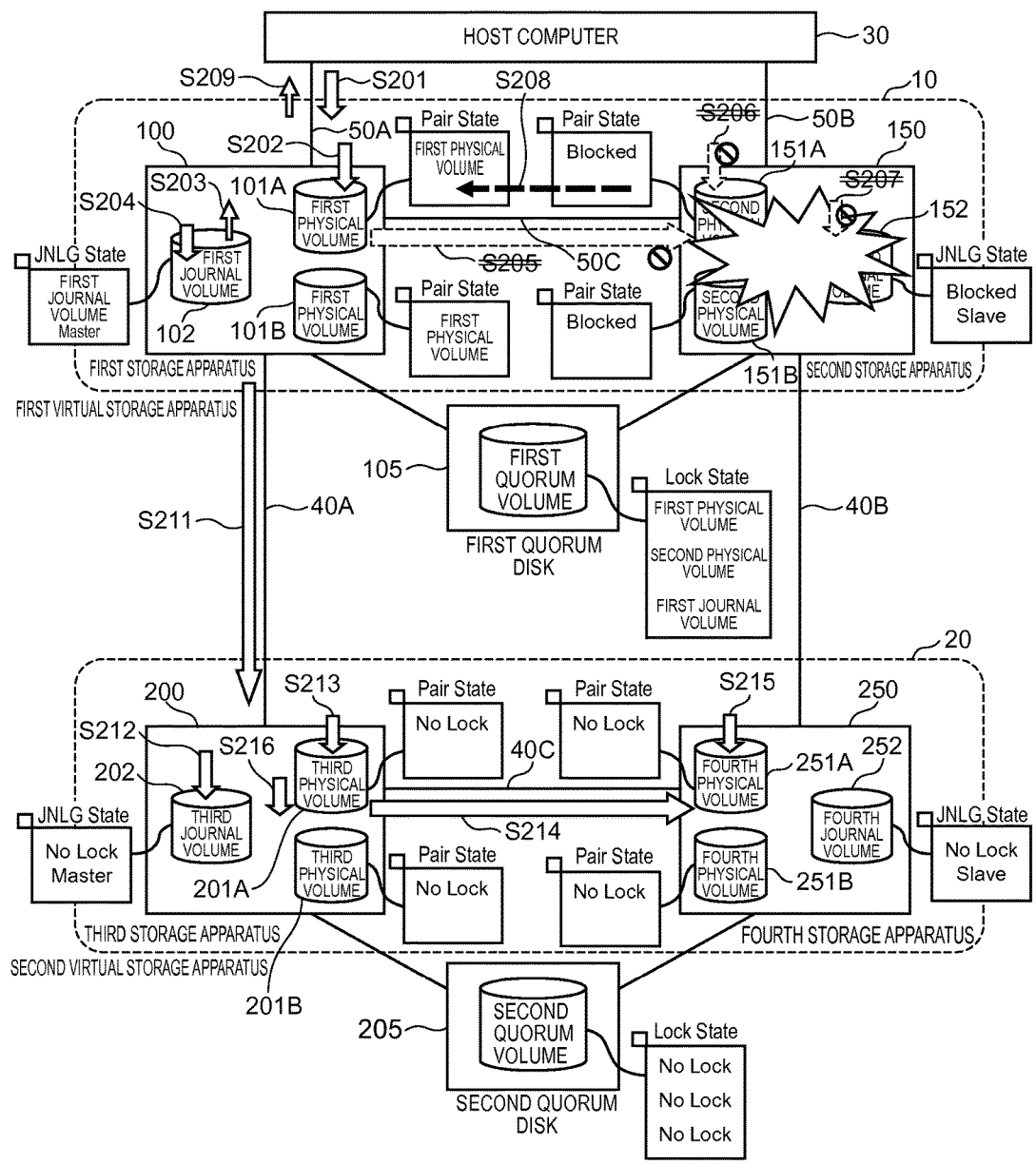
FIG. 17 is a conceptual diagram explaining the processing that is performed upon the occurrence of a failure in the second storage apparatus according to the first embodiment.

FIG. 17 shows a case where a failure occurred in the second storage apparatus 150. When a write request is sent from the host computer 30 to the first storage apparatus 100 (S201), the first storage apparatus 100 writes the data into the first physical volume 101A (S202). Subsequently, the first storage apparatus 100 acquires the sequential number of the data (S203), and creates a journal in the first journal volume 102 (S204).

Subsequently, when the first storage apparatus 100 detects that the duplication write processing to the second physical volume 151A of the second storage apparatus 150 is not possible, the first storage apparatus 100 acquires the lock of the journal attribute of the quorum disk 105, and thereafter stops the duplication write processing.

Since the subsequent processing of asynchronous remote copy in the third storage apparatus 200 and the fourth storage apparatus 250 of the second virtual storage apparatus 20 is the same as the processing of FIG. 9, the detailed explanation is omitted.

Accordingly, even if a failure occurs in the second storage apparatus 150, similar to the case where a failure occurs in the first storage apparatus 100 shown in FIG. 16, it is possible to continue the access from the host computer 30 to the first storage apparatus 100, and continue the remote copy between the first storage apparatus 10 and the storage apparatus on the secondary side of the RC configuration.

(Failure Pattern 6)

Figure 18:
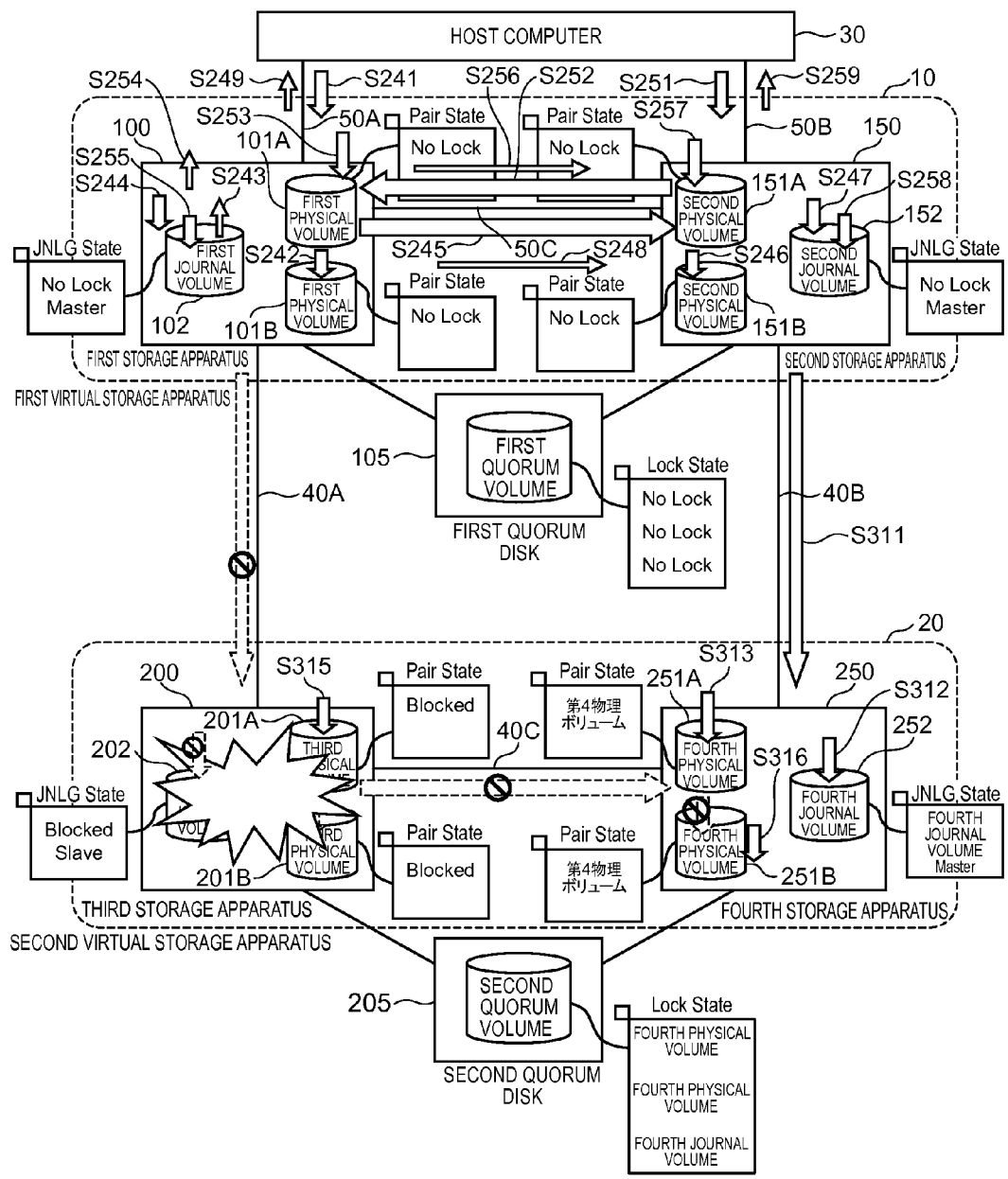
FIG. 18 is a conceptual diagram explaining the processing that is performed upon the occurrence of a failure in the third storage apparatus according to the first embodiment.

FIG. 18 shows a case where a failure occurred in the third storage apparatus 200. In FIG. 18, as with FIG. 11, a write request is sent from the host computer 30 to both the HA primary side and the HA secondary side.

When the first storage apparatus 100 detects the stoppage of the RDJNL command from the third storage apparatus 200, since the primary side and the secondary side are switched in the first virtual storage apparatus 10, the master/slave of the journal attribute is switched. Subsequently, based on the notice from the first storage apparatus 100, the second storage apparatus 150 switches the journal attribute to master, and commands the fourth storage apparatus 250 to perform master switching.

Note that, when the first storage apparatus 100 and the fourth storage apparatus 250 are connected, it is also possible to send a switching notice from the first storage apparatus 100 to the fourth storage apparatus 250 for issuing an RDJNL command without switching the primary side and the secondary side in the first virtual storage apparatus 10.

Subsequently, upon receiving a notice from the second storage apparatus 150, the fourth storage apparatus 250 switches the journal attribute to master. Moreover, since the duplication write processing to the third storage apparatus 200 is not possible, the lock of the volume pair and the journal attribute is acquired in the quorum disk 105.

Note that, as described above, when a switching notice for issuing an RDJNL command is sent from the first storage apparatus 100 to the fourth storage apparatus 250, since the duplication write processing to the third storage apparatus 200 is not possible, the lock of the volume pair and the journal attribute is acquired in the quorum disk 105. Subsequently, the journal attribute of the fourth storage apparatus 250 is switched, and the path for issuing the RDJNL command is switched from the second storage apparatus 150 to the first storage apparatus 100.

Subsequently, the fourth storage apparatus 250 adds 1 to the restored sequential number and issues an RDJNL command to the second storage apparatus 150 and acquires a journal (312), and starts the restoration (S313). Since the duplication processing to the third storage apparatus 200 cannot be performed, the fourth storage apparatus 250 writes the data into the fourth physical volume 251B (S316).

Note that, when the first storage apparatus 100 and the fourth storage apparatus 250 are connected, the fourth storage apparatus 250 may issue an RDJNL command to the first storage apparatus 100 and acquire the journal data without switching the master/slave between the first storage apparatus 100 and the second storage apparatus 150.

As described above, in the third storage apparatus 200 and the fourth storage apparatus 250, the plurality of volumes and the journal are subject to duplicate management based on the HA configuration. Thus, as described above, even if a failure occurs in the third storage apparatus 200, the remote copy between the fourth storage apparatus 250 and the first virtual storage apparatus 10 can be continued by the fourth storage apparatus 250 taking over the processing of issuing the RDJNL command and the like.

(Failure Pattern 7)

Figure 19:
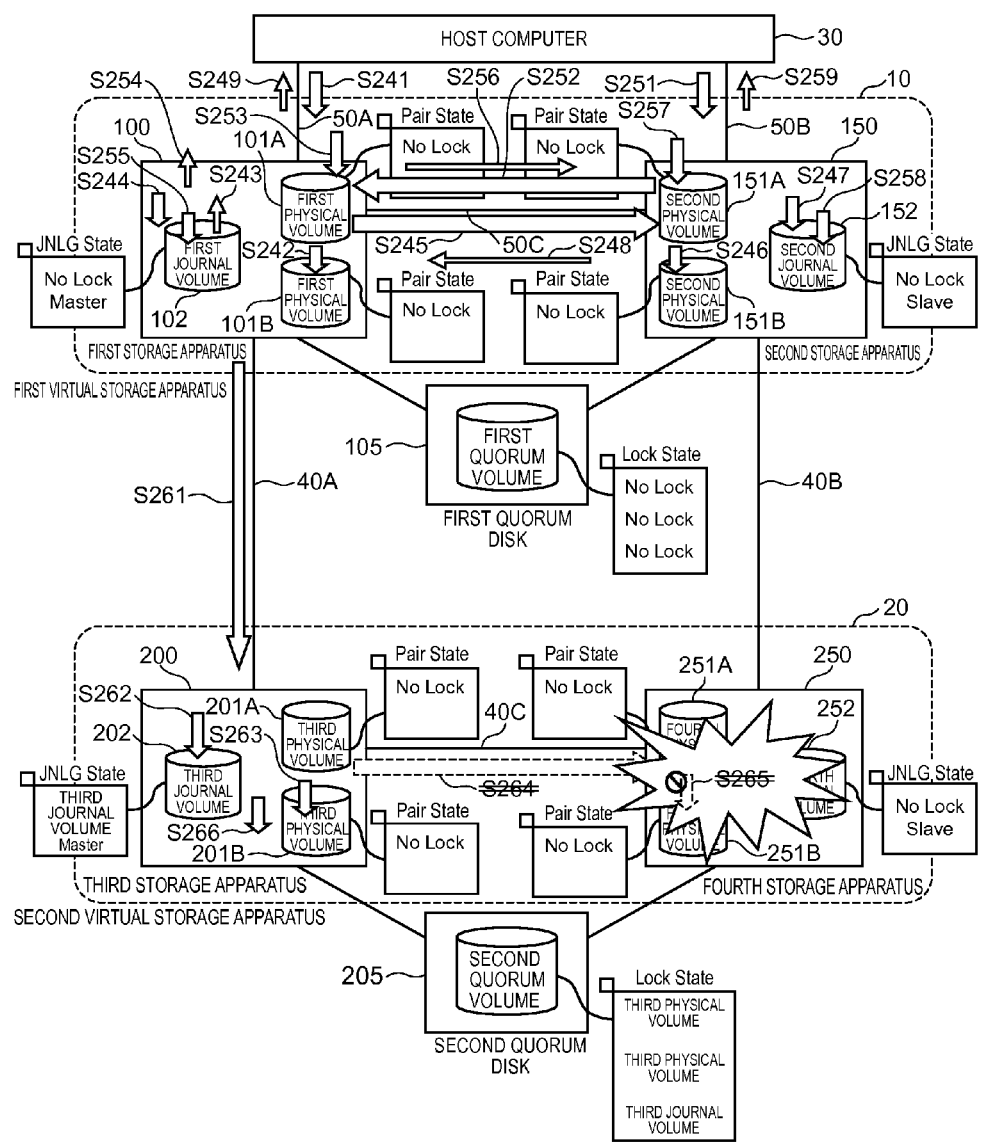
FIG. 19 is a conceptual diagram explaining the processing that is performed upon the occurrence of a failure in the fourth storage apparatus according to the first embodiment.

FIG. 19 shows a case where a failure occurred in the fourth storage apparatus 250. In the foregoing case, data duplication processing (S264, S265) is not performed in the second virtual storage apparatus 20 on the secondary side in the RC configuration. When the third storage apparatus 200 detects that the duplication write processing to the fourth storage apparatus 250 cannot be performed, the third storage apparatus 200 acquires the lock of the volume pair and the lock of the journal attribute of the third storage apparatus 200, and stops the duplication processing.

While a failure is occurring in the fourth storage apparatus 250, data cannot be subject to duplicate management on the secondary side of the RC configuration, but the remote copy between the third storage apparatus 200 and the first virtual storage apparatus 10 can be continued without change.

(Failure Pattern 8)

Figure 20:
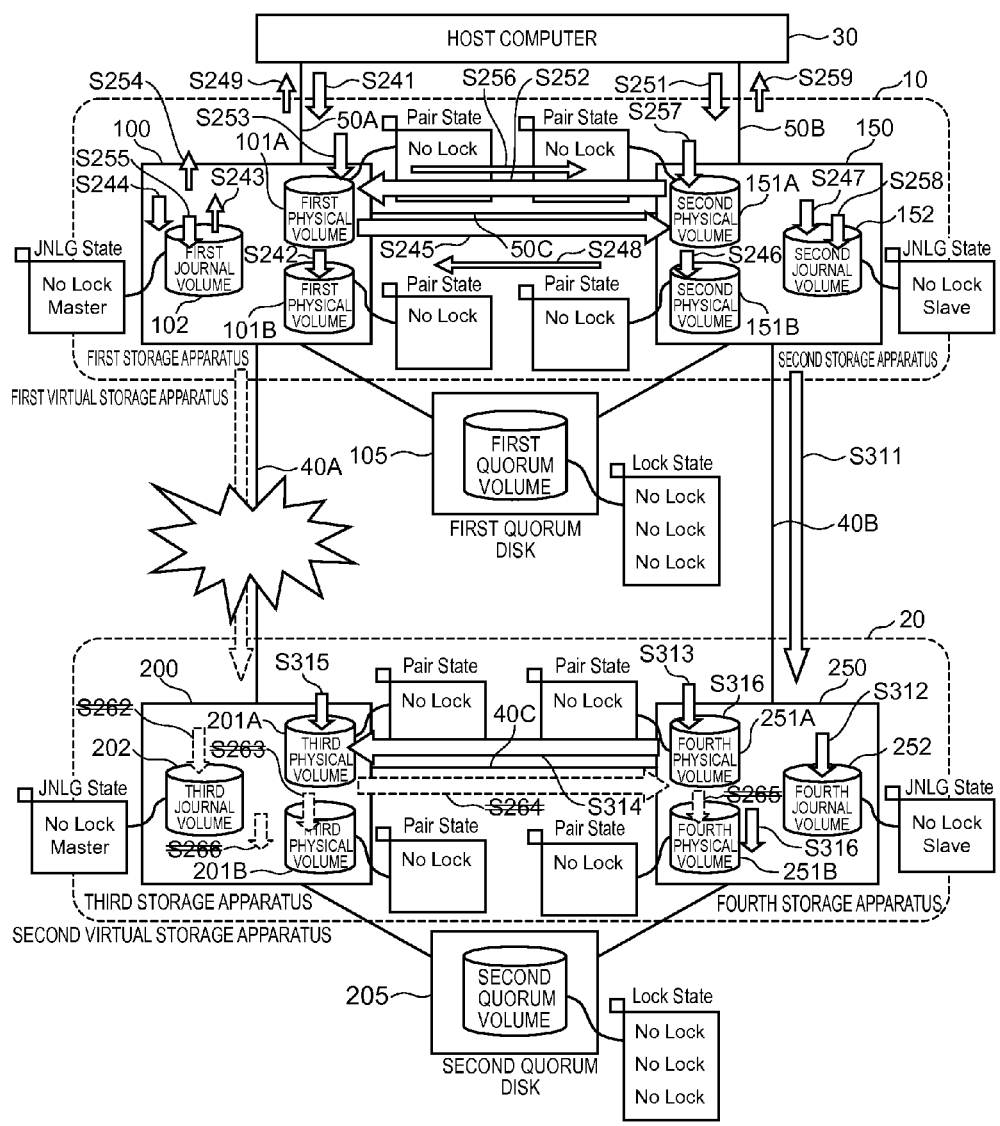
FIG. 20 is a conceptual diagram explaining the processing that is performed upon the occurrence of a path failure according to the first embodiment.

FIG. 20 shows a case where a failure occurred in the path connecting the first storage apparatus 100 and the third storage apparatus 200. When the first storage apparatus 100 detects the interruption of the RDJNL command from the third storage apparatus 200, since the primary side and the secondary side in the first virtual storage apparatus 10 are switched, the master/slave of the journal attribute is switched. Subsequently, upon receiving a notice from the first storage apparatus 100, the second storage apparatus 150 switches the journal attribute to master, and commands the fourth storage apparatus 250 to perform master switching.

Note that, when the first storage apparatus 100 and the fourth storage apparatus 250 are connected, it is also possible to send a switching notice for issuing an RDJNL command from the first storage apparatus 100 to the fourth storage apparatus 250 without switching the primary side and the secondary side in the first virtual storage apparatus 10.

Subsequently, upon receiving a notice from the second storage apparatus 150, the fourth storage apparatus 250 switches the journal attribute to master.

Note that, as described above, when a switching notice for issuing an RDJNL command is sent from the first storage apparatus 100 to the fourth storage apparatus 250, the journal attribute of the fourth storage apparatus 250 is switched to master, and the path for issuing the RDJNL command is switched from the second storage apparatus 150 to the first storage apparatus 100.

Subsequently, the fourth storage apparatus 250 adds 1 to the sequential number of the restored journal and issues an RDJNL command to the second storage apparatus 150 and acquires a journal (312), and starts the restoration (S313). Subsequently, the third storage apparatus 200 transfers the data and the sequential number to the fourth storage apparatus 250, and performs data duplication processing (S314). The third storage apparatus 200 writes the data into the third physical volume 201A (S315), and the fourth storage apparatus 250 writes the data into the fourth physical volume 251A (S316).

As described above, in the third storage apparatus 200 and the fourth storage apparatus 250, the plurality of volumes and the journal are subject to duplicate management based on the HA configuration. Thus, as described above, even if a failure occurs in the path connecting the first storage apparatus 100 and the third storage apparatus 200, the remote copy between the fourth storage apparatus 250 and the first virtual storage apparatus 10 can be continued by the fourth storage apparatus 250 taking over the processing of issuing the RDJNL command and the like. Moreover, the data duplication processing can be continued between the fourth storage apparatus 250 and the third storage apparatus 200.

(Failure Pattern 9)

Figure 21:
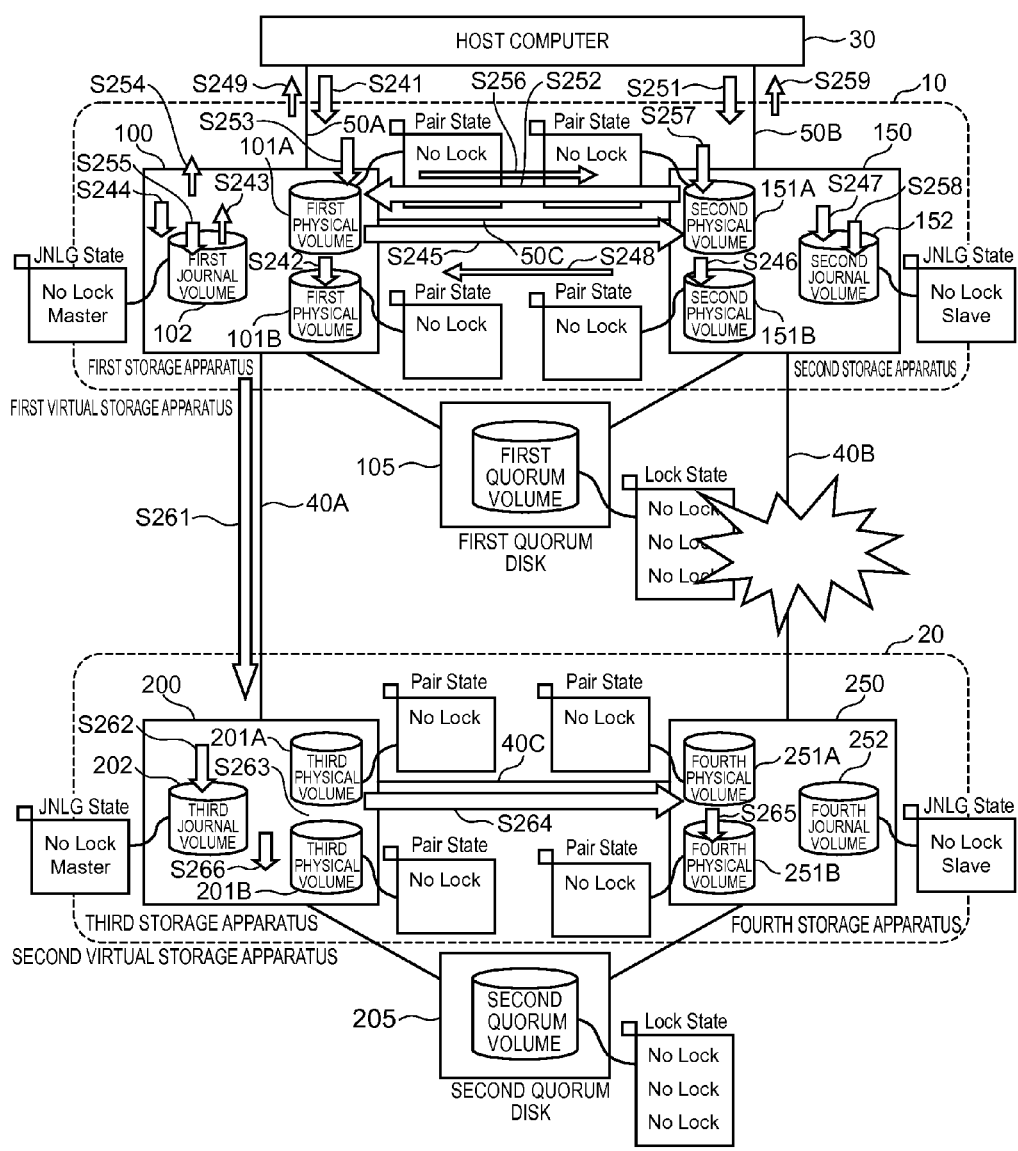
FIG. 21 is a conceptual diagram explaining the processing that is performed upon the occurrence of a path failure according to the first embodiment.

FIG. 21 shows a case where a failure occurred in the path connecting the second storage apparatus 150 and the fourth storage apparatus 200. Since this failure does not affect the duplication processing in the HA configuration or the asynchronous remote copy processing in the RC configuration, the same processing as the normal processing shown in FIG. 11 is performed.

Even when a failure occurs in the path connecting the second storage apparatus 150 and the fourth storage apparatus 200, since data is written into the fourth physical volume 251 of the fourth storage apparatus 250, the duplication of data in the second virtual storage apparatus 20 can be continued.

(Failure Pattern 10)

Figure 22:
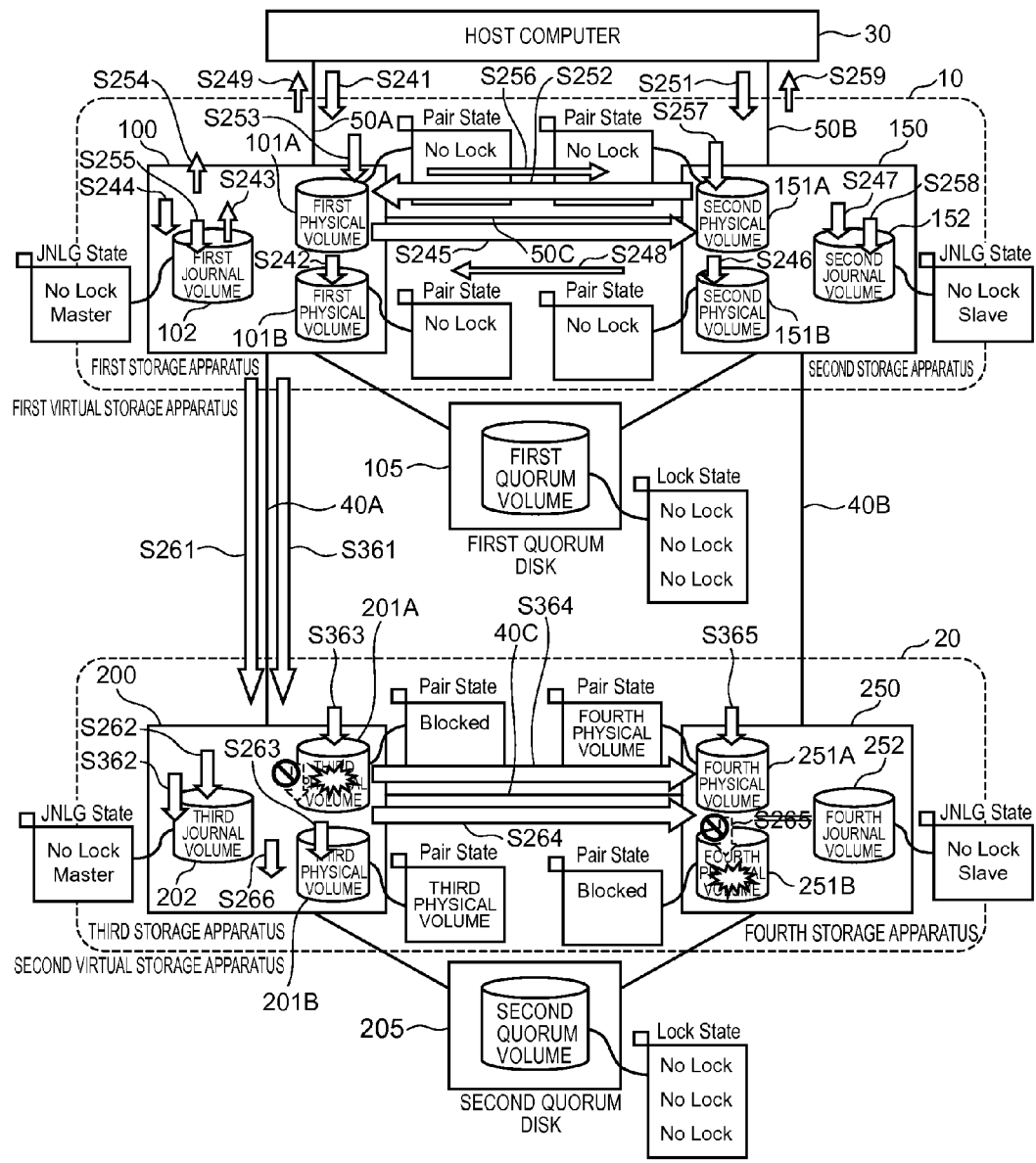
FIG. 22 is a conceptual diagram explaining the processing that is performed upon the occurrence of a failure in the third and fourth physical volumes according to the first embodiment.

FIG. 22 shows a volume failure on the remote copy side forming the RC configuration. In FIG. 22, a failure has occurred in the third physical volume 201A of the third storage apparatus 200 and in the fourth physical volume 251B of the fourth storage apparatus 250. In the foregoing case, data is not written into the physical volume that was subject to a failure on the remote copy side, and data is not duplicated. Nevertheless, since the sequential number of the data is notified from the third storage apparatus 200 to the fourth storage apparatus 250, the latest sequential number is stored in the fourth journal volume of the fourth storage apparatus 250.

As described above, in this embodiment, the fourth journal volume is formed based on the third storage apparatus 200 and the fourth storage apparatus 250 on the secondary side of the RC configuration. Thus, even if a volume failure occurs on the secondary side of the RC configuration to which the restoration processing is executed, restoration processing can be continued with the volume pair in which a failure has not occurred.

(Failure Pattern 11)

Figure 23:
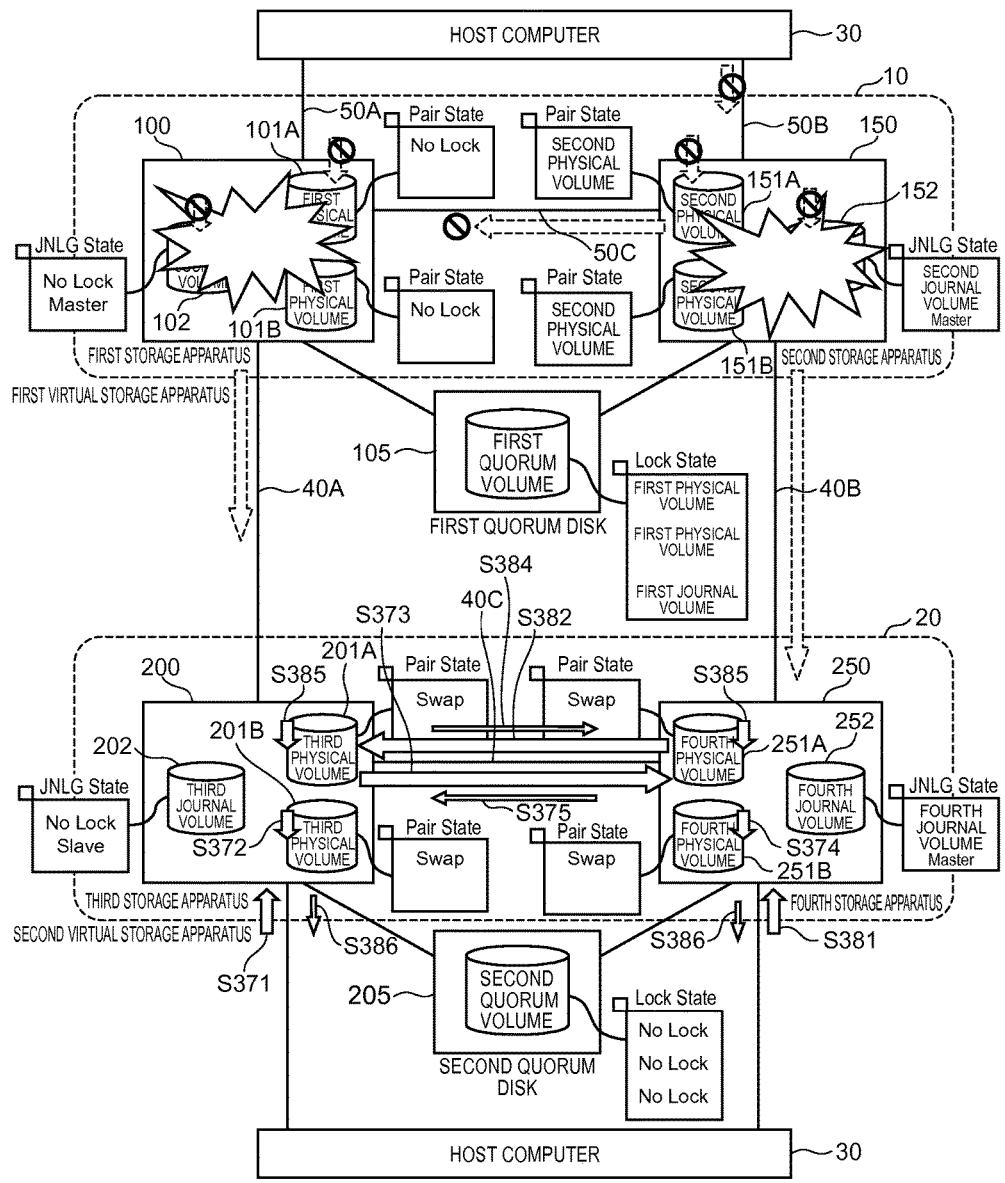
FIG. 23 is a conceptual diagram explaining the processing that is performed upon the occurrence of a failure in the first and second storage apparatuses according to the first embodiment.

FIG. 23 shows a case where a failure occurred in the first storage apparatus 100 and the second storage apparatus 150 of the first virtual storage apparatus 10. In the foregoing case, the host computer 30 cannot access the first virtual storage apparatus 10. Thus, the host computer 30 is switched to a host computer of a separate remote location, and data write processing is performed from that host computer to the third storage apparatus 200 or the fourth storage apparatus 250. Since the write processing in the foregoing case is the same as the normal write processing in FIG. 11, the detailed explanation is omitted.

In this embodiment, since the secondary side of the RC configuration also forms the HA configuration with the third storage apparatus 200 and the fourth storage apparatus 250, even if a failure occurs in both apparatuses of the first storage apparatus 100 and the second storage apparatus 150 on the primary side of the RC configuration, it is possible to instantaneously realize the same configuration as the primary side HA configuration on the secondary side of the RC configuration located at a remote location.

(Failure Pattern 12)

Figure 24:
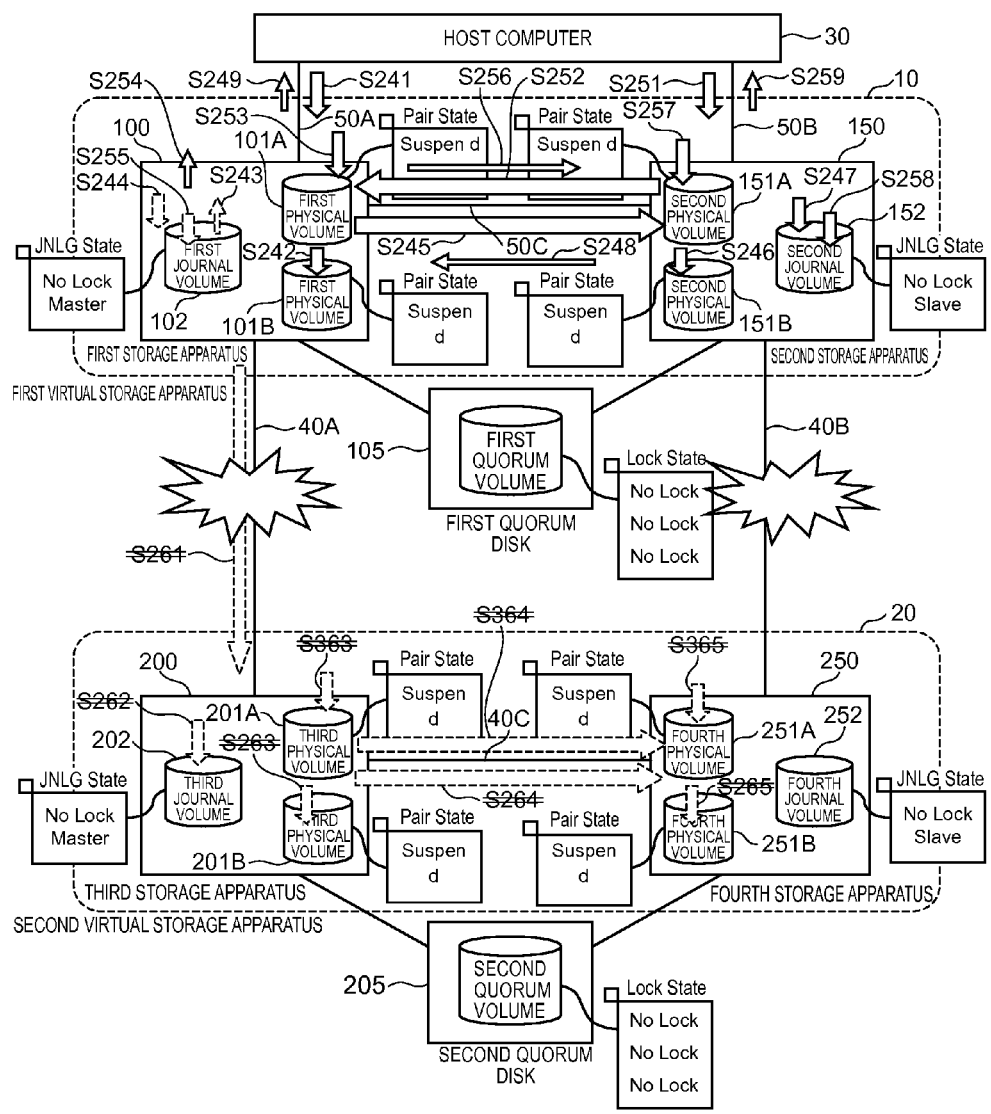
FIG. 24 is a conceptual diagram explaining the processing that is performed upon the occurrence of a failure suspension according to the first embodiment.

FIG. 24 shows a case of failure suspension due to the occurrence of a path failure between the first storage apparatus 100 and the third storage apparatus 200 and a path failure between the second storage apparatus 150 and the fourth storage apparatus 250.

When the first storage apparatus 100 detects an interruption of the RDJNL command from the third storage apparatus 200, the first storage apparatus 100 attempts to switch the master/slave of the journal attribute, and switch the primary side and the secondary side of the first virtual storage apparatus 10. Nevertheless, since the interruption of the RDJNL command is also detected by the second storage apparatus 150, it is determined that switching cannot be performed, and the pair state of the RC configuration is suspended. Here, a state where the asynchronous remote copy is not performed in the RC configuration is referred to as the pair state suspension in the ensuing explanation. The first storage apparatus 100 notifies the suspension to the second storage apparatus 150, and the pair state of the second storage apparatus 150 is also suspended.

When asynchronous remote copy is not performed; that is, access from the host computer 30 after the pair state is suspended is the same as in the case of the HA configuration without the RC configuration; that is, the same as the read/write processing of the HA configuration shown in FIG. 4 to FIG. 7. However, when write processing is performed, the difference bitmap of the data range written into both apparatuses of the first storage apparatus 100 and the second storage apparatus 150 is turned ON. By using this difference bitmap, the pair state between the first virtual storage apparatus 10 and the second virtual storage apparatus 20 can be synchronized after the path failure is recovered.

Moreover, since the third storage apparatus 200 is unable to acquired a journal based on the RDJNL command, the third storage apparatus 200 attempts to switch the master/slave of the journal attribute, and switch the primary side and the secondary side in the second virtual storage apparatus 20. Nevertheless, since the fourth storage apparatus 250 is also unable to acquire a journal based on the RDJNL command, the pair state is suspended. The third storage apparatus 200 also notifies the suspension to the fourth storage apparatus 250, and the pair state of the fourth storage apparatus 250 is also suspended.

Accordingly, even when the asynchronous remote copy is not performed due to a path failure and the pair state is suspended, the duplicate management based on the HA configuration can be continued on the primary side of the RC configuration. Moreover, when the path failure is recovered, the remote copy based on the RC configuration can be promptly resumed by using the difference bitmap.

(Failure Pattern 13)

Figure 25:
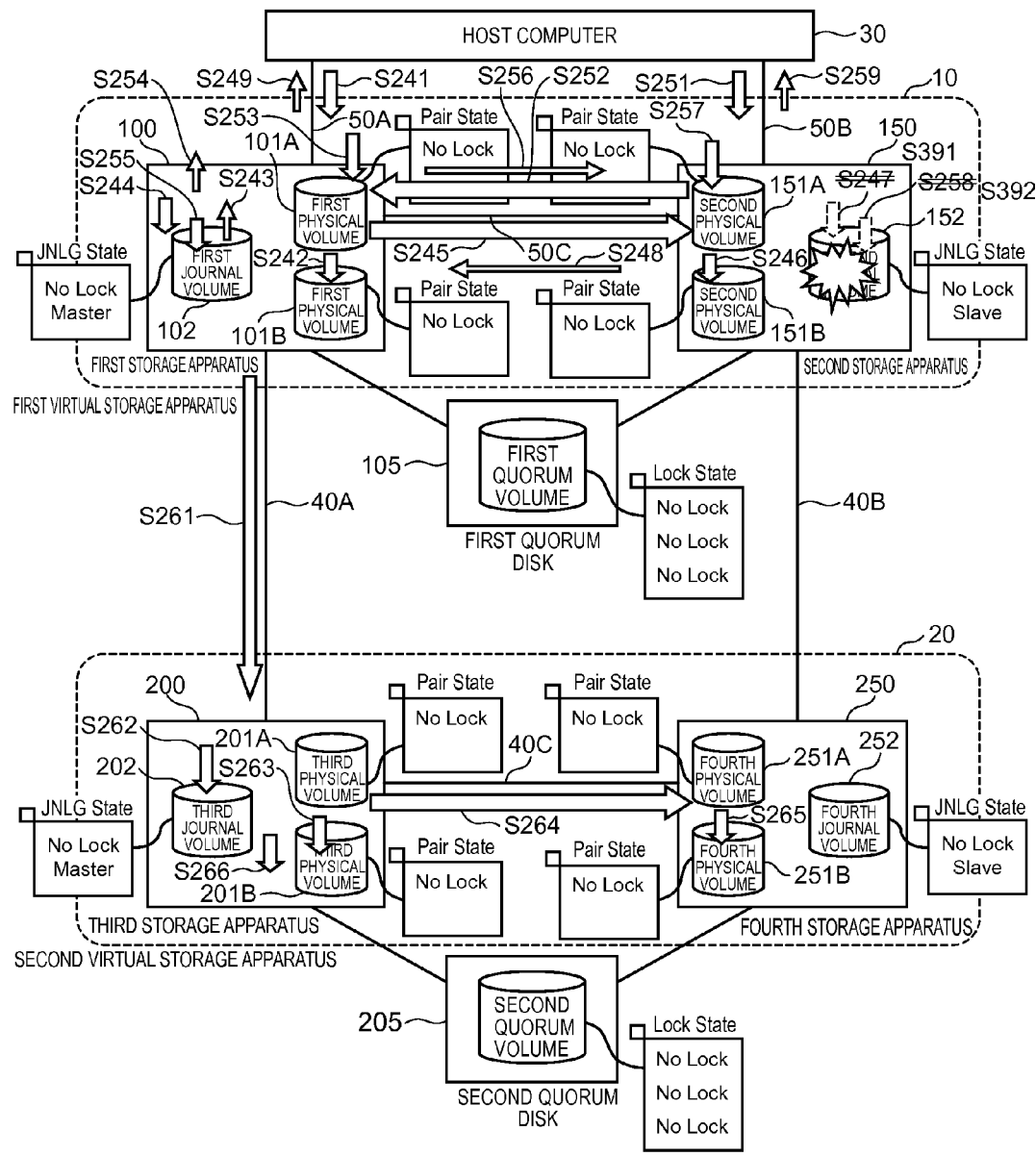
FIG. 25 is a conceptual diagram explaining the processing that is performed upon the occurrence of a failure in the second journal volume according to the first embodiment.

FIG. 25 shows a case where a failure occurred in the second journal volume 152 of the second storage apparatus 150. In the foregoing case, a journal cannot be created in the second storage apparatus 150. Nevertheless, the duplication of data to the second physical volumes 151A and 151B is continued, and the asynchronous remote copy is continued with the first storage apparatus 100. Thus, the pair state between the second storage apparatus 150 and the fourth storage apparatus 250 is maintained. However, during the period that journal creation is not possible, the second storage apparatus 150 turns ON the difference bitmap of the data written into the second physical volume 151A or 151B.

For example, when a failure occurs in the second journal volume 152 and a failure thereafter occurs in the first storage apparatus 100, the pair state in the RC configuration is suspended. When the difference bitmap is not turned ON by the second storage apparatus 150 at the time of the occurrence of the foregoing failure, all data, including the data before the occurrence of the failure, must be copied when the pair state of the RC configuration is recovered. Accordingly, it is necessary to turn ON the difference bitmap for the RC configuration on the side of the second storage apparatus 150.

(Failure Pattern 14)

Figure 26:
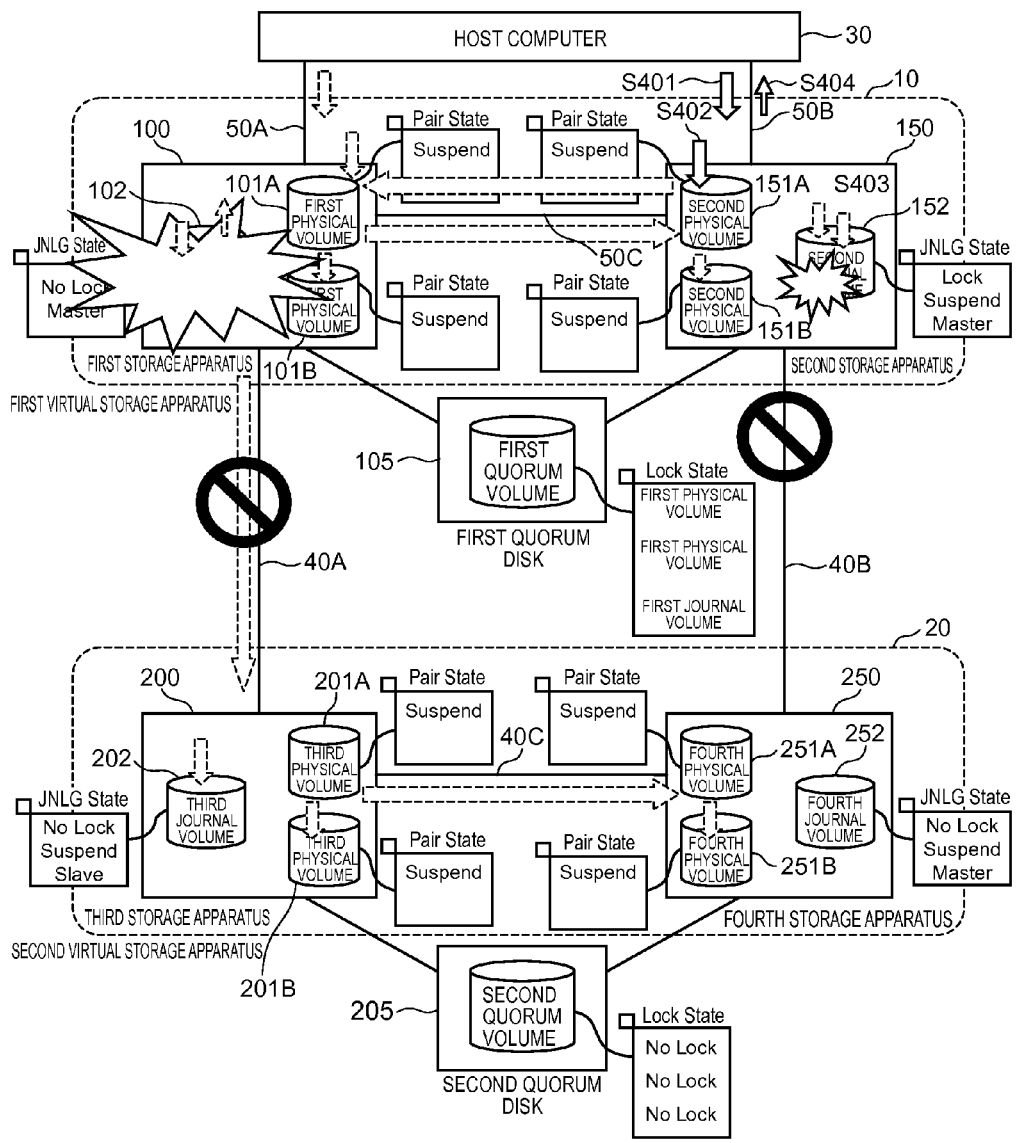
FIG. 26 is a conceptual diagram explaining the processing that is performed upon the occurrence of a failure in the second journal volume and the first storage apparatus according to the first embodiment.

FIG. 26 shows a case where a failure occurred in the first storage apparatus 100 after a failure occurred in the second journal volume 152 of the second storage apparatus 150 as shown in FIG. 25.

In the foregoing case, since a journal cannot be created in either the first storage apparatus 100 or the second storage apparatus 150, asynchronous remote copy cannot be performed, and the pair state of the RC configuration is suspended.

Since the host computer 30 can perform read/write processing to the second storage apparatus 150, the read/write processing of data can be performed to the second physical volumes 151A and 151B of the second storage apparatus 150. The second storage apparatus 150 turns ON the difference bitmap of the written data when write processing is performed. Subsequently, when the failure is recovered and the asynchronous remote copy is restored, the pair state of the RC configuration is synchronized using the difference bitmap.

Accordingly, even in cases where a journal cannot be created on the primary side of the RC configuration, by keeping the different bitmap ON during the occurrence of a failure, there is no need to copy all data when the failure is recovered, and only data in which the difference bitmap is ON needs to be copied. Thus, the remote copy based on the RC configuration can be promptly resumed.

(Failure Pattern 15)

Figure 27:
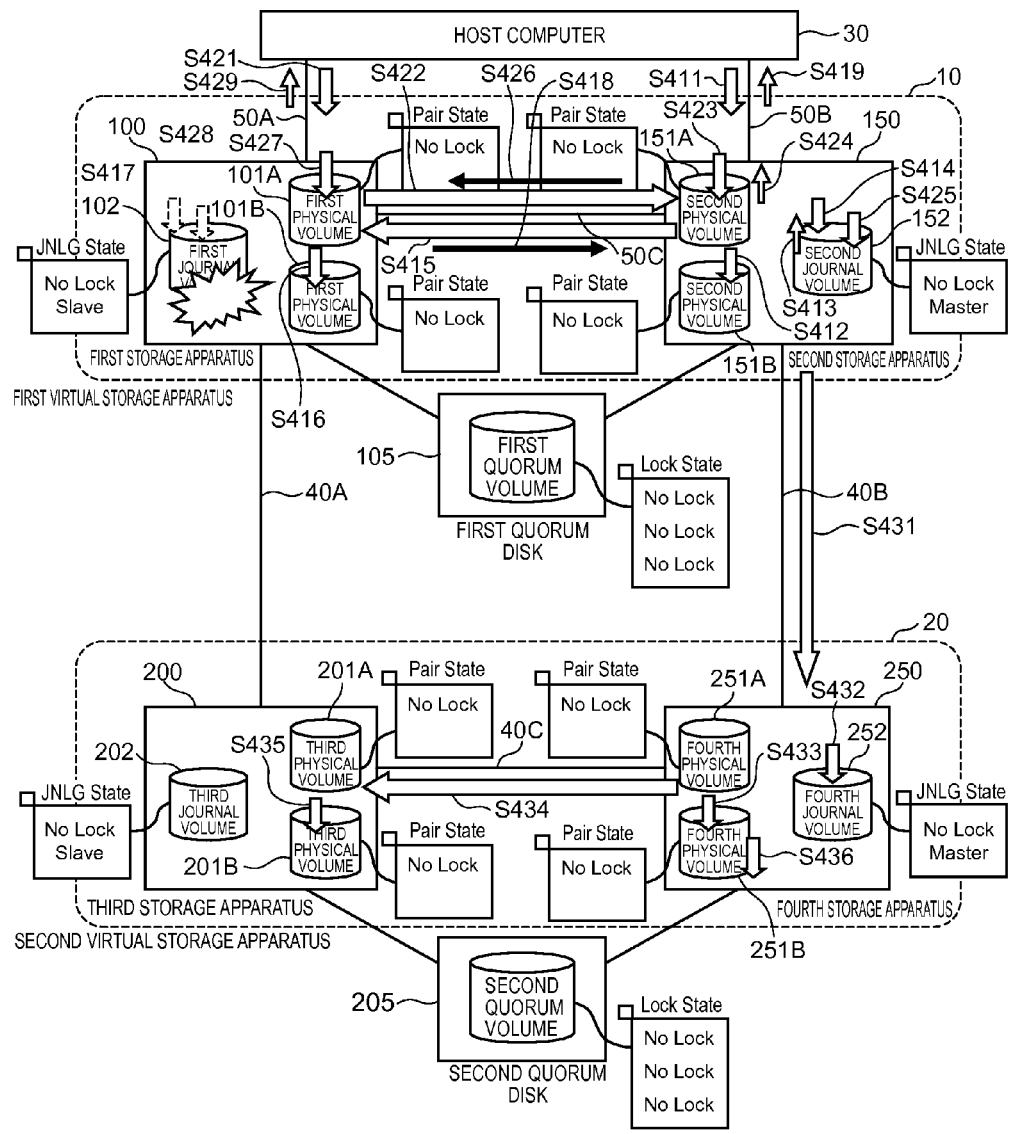
FIG. 27 is a conceptual diagram explaining the processing that is performed upon the occurrence of a failure in the first journal volume according to the first embodiment.

FIG. 27 shows a case where a failure occurred in the first journal volume 102 of the first storage apparatus 100. In the foregoing case, a journal cannot be created in the first storage apparatus 100. Nevertheless, since the duplication of data is continued in the first physical volumes 101A, 101B and the asynchronous remote copy is continued, the pair state in the RC configuration is maintained. However, during the period that journal creation is not possible, the first storage apparatus 100 turns ON the difference bitmap of the data written into the first physical volume 101A or 101B.

For example, if a failure occurs in the second storage apparatus 150 after a failure occurs in the first journal volume 102, the pair state in the RC configuration is suspended. When the difference bitmap is not turned ON by the first storage apparatus 100 at the time of the occurrence of the foregoing failure, all data, including the data before the occurrence of the failure, must be copied when the pair state of the RC configuration is recovered. Accordingly, it is necessary to turn ON the difference bitmap for the RC configuration on the side of the first storage apparatus 100.

Moreover, after a failure occurs in the first journal volume 102, the second storage apparatus 150 is switched to the master of the journal attribute, and the second storage apparatus 150 acquires the sequential number of the data. Moreover, it is also possible to adopt a configuration where the third storage apparatus 200 and the fourth storage apparatus 250 on the side of the second virtual storage apparatus 20 also switch the master/slave of the journal attribute, and the fourth storage apparatus 250 issues the RDJNL command.

As described above, in the first storage apparatus 100 and the second storage apparatus 150, the plurality of volumes and the journal are subject to duplicate management based on the HA configuration. Thus, as described above, even if a failure occurs in the first journal volume 102 of the first storage apparatus 100, it is possible to continue the access from the host computer 30 to the second storage apparatus 150 without change, and continue the remote copy between the second storage apparatus 150 and the storage apparatus on the secondary side of the RC configuration. Moreover, during the period that a failure is occurring in the first journal volume 102, by keeping the difference bitmap ON, the journal data can be promptly synchronized between the first storage apparatus 100 and the second storage apparatus 150 when the failure of the first journal volume 102 is recovered.

(Failure Pattern 16)

Figure 28:
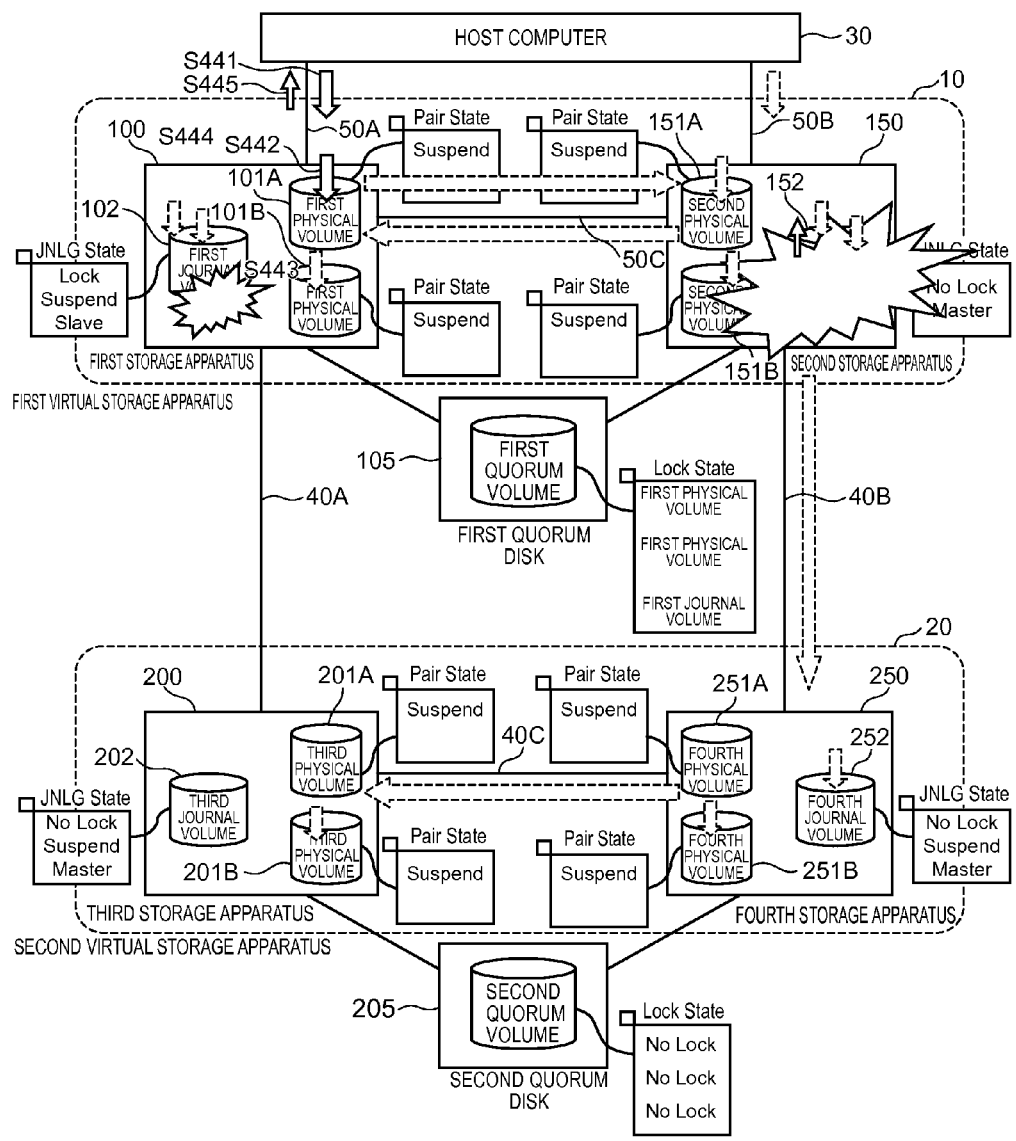
FIG. 28 is a conceptual diagram explaining the processing that is performed upon the occurrence of a failure in the first journal volume and the second storage apparatus according to the first embodiment.

FIG. 28 shows a case where a failure occurred in the second storage apparatus 200 after a failure occurred in the first journal volume 102 of the first storage apparatus 100 as shown in FIG. 27.

In the foregoing case, since a journal cannot be created in either the first storage apparatus 100 or the second storage apparatus 150, asynchronous remote copy cannot be performed, and the pair state of the RC configuration is suspended. Note that, when there is journal data that has not yet been subject to purge processing, the first storage apparatus 100 may also cause the third storage apparatus 200 to acquire the journal, restore the data with the third storage apparatus 200, duplicate the data in the fourth storage apparatus 250, thereafter purge the journal data, and perform the suspension.

Moreover, the first storage apparatus 100 turns ON the difference bitmap of the written data when write processing is performed. Subsequently, when the failure is recovered and the asynchronous remote copy is restored, the pair state of the RC configuration is synchronized by using the difference bitmap.

Accordingly, even in cases where a journal cannot be created on the primary side of the RC configuration, by keeping the different bitmap ON during the occurrence of a failure, there is no need to copy all data when the failure is recovered, and only data in which the difference bitmap is ON needs to be copied. Thus, the remote copy based on the RC configuration can be promptly resumed.

(1-7) Initial Formation of System (Before Journal Registration)

Figure 29:
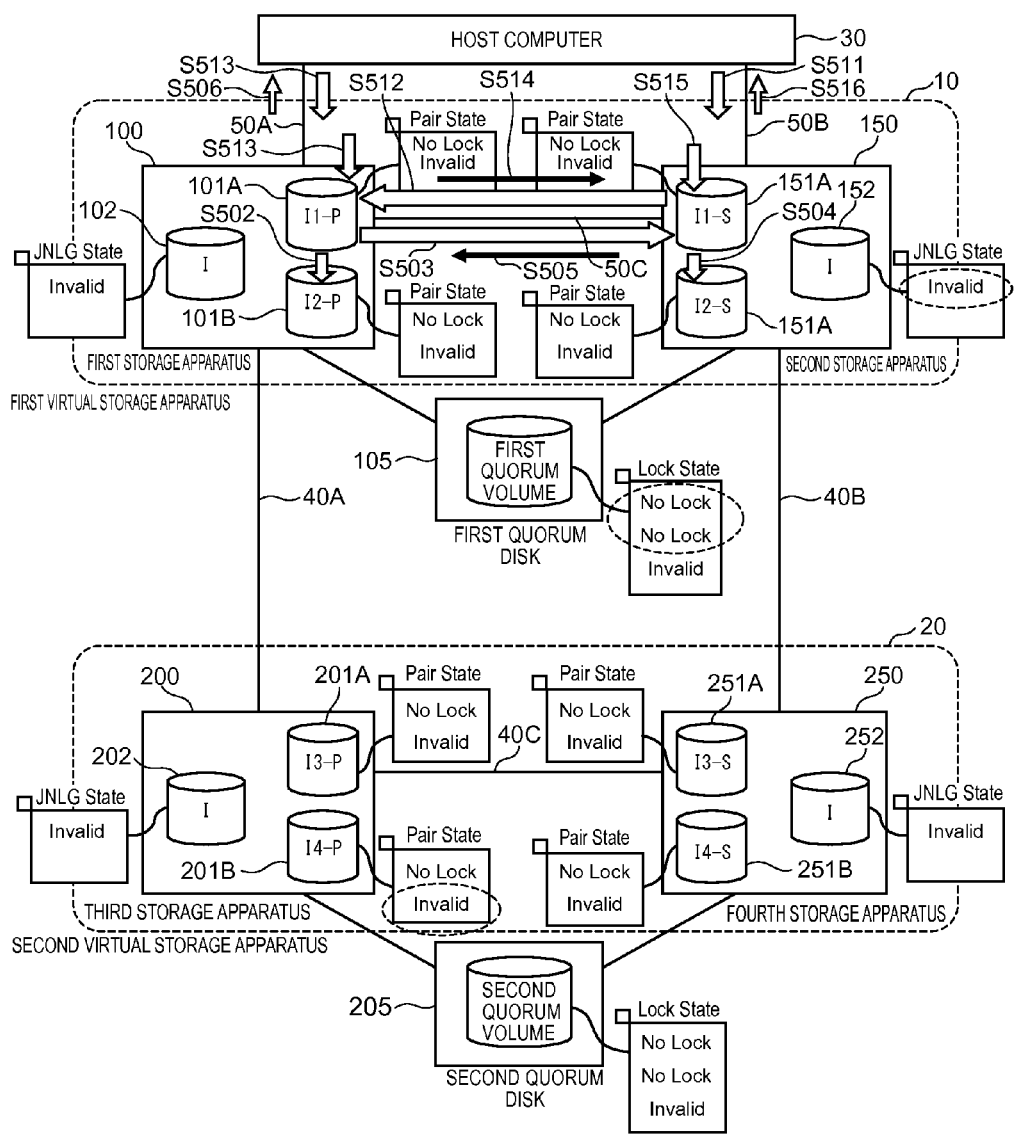
FIG. 29 is a conceptual diagram explaining the state before journal registration according to the first embodiment.

The initial formation of a computer system having the foregoing HA configuration and the RC configuration is now explained. FIG. 29 shows a state before registering a journal in the first virtual storage apparatus 10. A state before a journal is registered in the first virtual storage apparatus 10 is a state where only the HA configuration is formed between the first storage apparatus 100 and the second storage apparatus 150, and the RC configuration is not formed between the first virtual storage apparatus 10 and the second virtual storage apparatus 20. Accordingly, access from the host computer 30 is the same as the HA configuration without the RC configuration; that is, the same as the read/write processing of the HA configuration shown in FIG. 4 to FIG. 7 above.

Note that, as shown in FIG. 29, before journal registration, the pair state (indicated as "Pair State" in the diagrams) of the first storage apparatus 100 and the second storage apparatus 150 is invalid, and the journal attribute is also invalid (indicated as "Invalid" in the diagrams). Moreover, in the lock state (indicated as "Lock State" in the diagrams) of the first quorum disk 105, while lock state of the physical volumes of both apparatuses of the first storage apparatus 100 and the second storage apparatus 150 is valid, the lock state of the journal volume of both apparatuses is invalid.

Moreover, since this is a state where the RC configuration pair has not been formed, the pair state of the third storage apparatus 200 and the fourth storage apparatus 250, the journal attribute, and the lock state of the journal volume are all invalid.

(Journal Registration)

Figure 30:
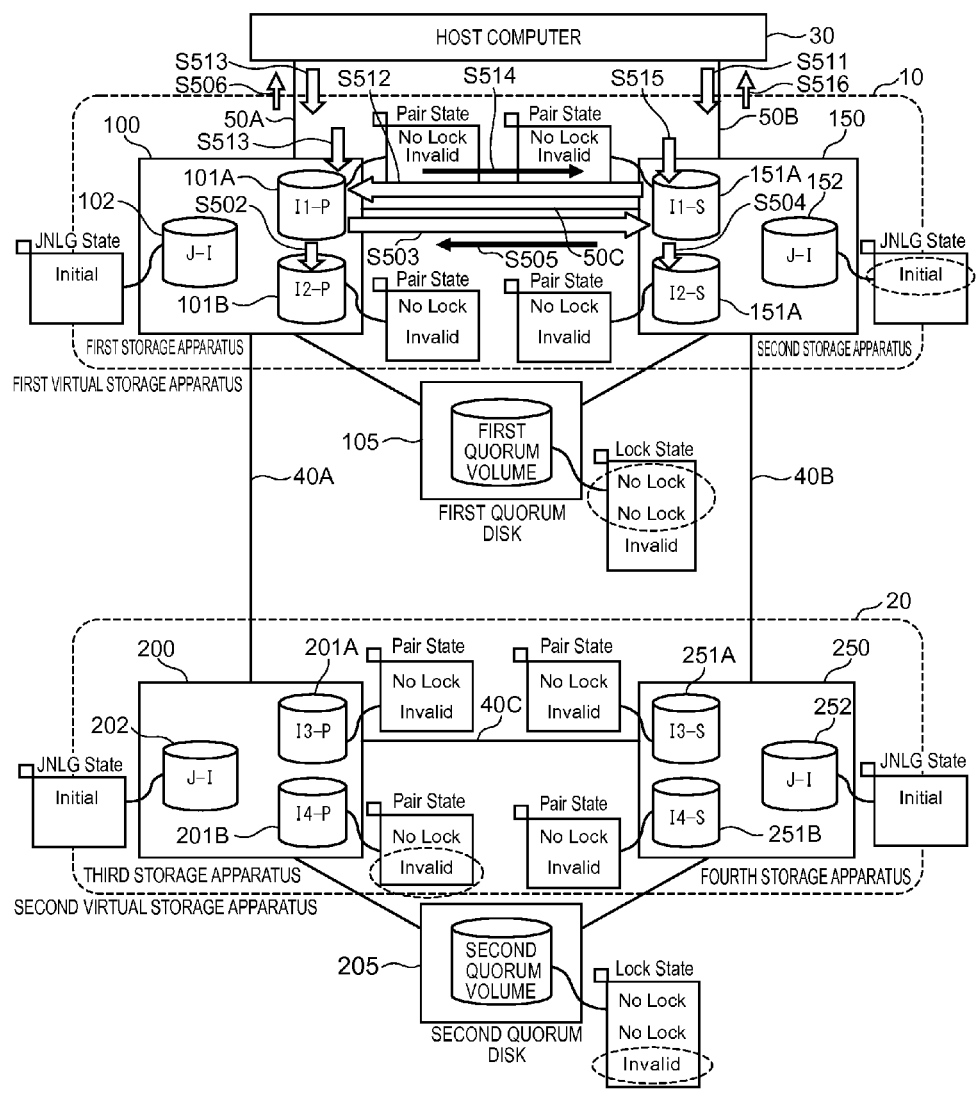
FIG. 30 is a conceptual diagram explaining the journal group registration processing according to the first embodiment.

FIG. 30 shows the registration of a journal group (JNLG) in the first virtual storage apparatus 10. The registration of the journal group is implemented in the respective apparatuses; namely, the first storage apparatus 100, the second storage apparatus 150, the third storage apparatus 200 and the fourth storage apparatus 250. As a result of the respective apparatuses registering a journal group, the pair formation of the RC configuration is enabled. When a journal group is registered in the respective apparatuses, the journal attribute to the journal volume of the respective apparatuses becomes "Initial", which indicates an initial state.

While the journal attribute is in an initial state, since the pair formation of the RC configuration has been realized, the RC pair state remains "Invalid". Note that access from the host computer 30 is the same as the HA configuration without the RC configuration; that is, the same as the read/write processing of the HA configuration shown in FIG. 4 to FIG. 7 above.

(RC Configuration Pair Formation)

Figure 31:
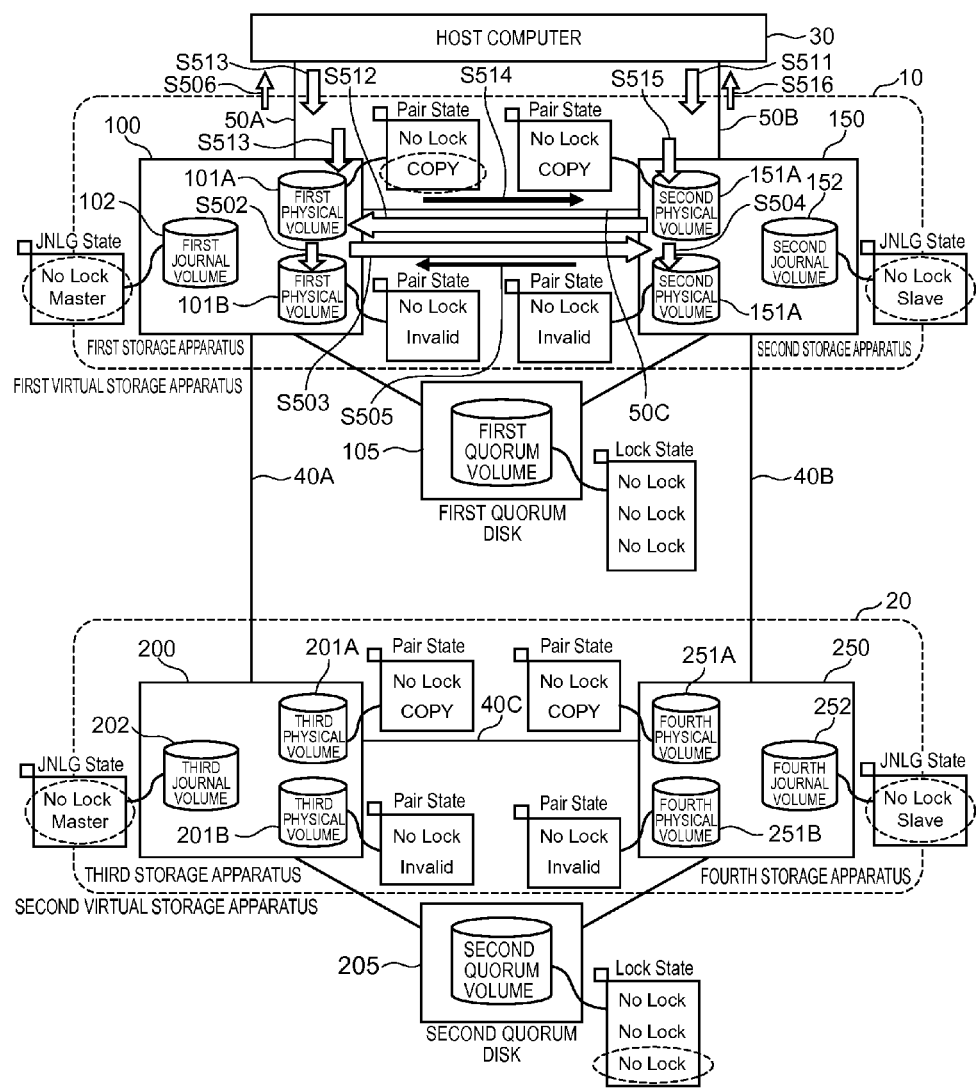
FIG. 31 is a conceptual diagram explaining the RC configuration pair formation processing according to the first embodiment.

FIG. 31 shows the pair formation processing of the RC configuration after the journal group has been registered. Either the first storage apparatus 100 or the second storage apparatus 150 receives the initial RC pair formation command. When the volume designated in the primary volume of the RC configuration is the HA configuration, the other side forming the HA configuration also passes on the RC pair formation command. Subsequently, the RC pair is formed in both apparatuses of the first storage apparatus 100 and the second storage apparatus 150.

The first virtual storage apparatus 10 sets the journal attribute on the primary side of the HA configuration to a master attribute, and sets the journal attribute on the secondary side of the HA configuration to a slave attribute. Moreover, the master/slave attribute of the journal attribute of the second virtual storage apparatus 20 is set to configure a pair with the RC configuration of the first virtual storage apparatus 10.

In FIG. 31, the journal attribute becomes a master attribute on the primary side of the HA configuration of the first storage apparatus 100, and the journal attribute becomes a slave attribute on the secondary side of the HA configuration of the second storage apparatus 150. Moreover, the journal attribute of the third storage apparatus 200 which forms the RC configuration pair with the first storage apparatus 100 becomes a master attribute, and the journal attribute of the fourth storage apparatus 250 which configures the RC configuration pair with the second storage apparatus 150 becomes a slave attribute.

Moreover, when the RC configuration pair is registered as described above, the lock state of the journal attribute of the quorum disk 105 is also initialized in a no lock state (indicated as "No Lock" in the diagrams). Subsequently, the RC pair state is changed from an Invalid state to a Copy state, and initial copy is started from the primary volume of the RC configuration to the secondary volume of the RC configuration.

Note that access from the host computer 300 during the pair formation processing of the RC configuration described above is the same as the HA configuration without the RC configuration; that is, the same as the read/write processing of the HA configuration shown in FIG. 4 to FIG. 7 above.

(Initial Copy)

Figure 32:
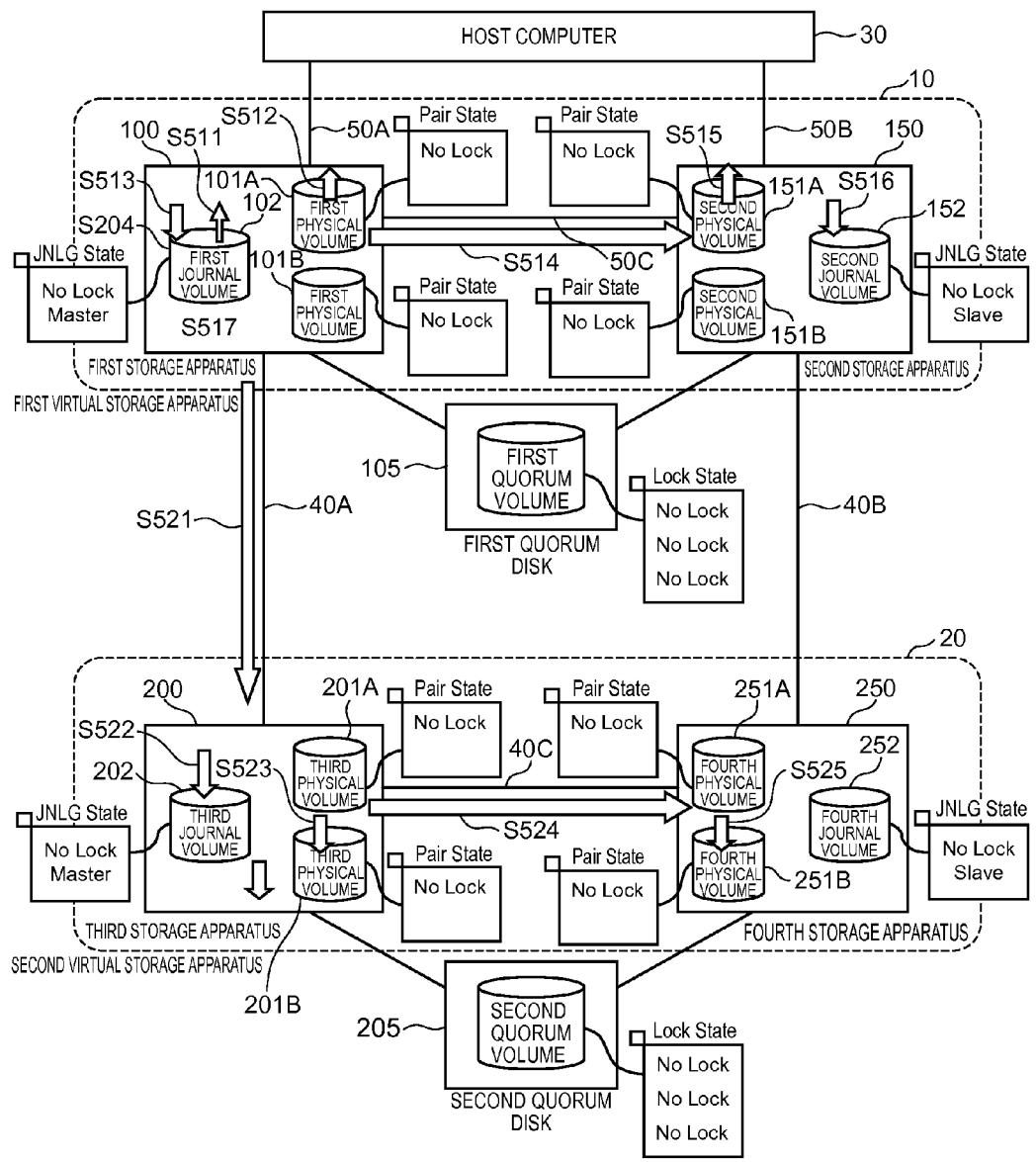
FIG. 32 is a conceptual diagram explaining the initial copy processing in the RC configuration pair formation according to the first embodiment.

FIG. 32 shows the initial copy processing in the pair formation of the RC configuration. As shown in FIG. 32, in the initial copy processing, the first storage apparatus 100 foremost reads data in order from the initial slot to the final slot of the first physical volume 101A (S512), assigns a sequential number (S511), and creates a journal in the first journal volume 102 (S513).

Subsequently, the first storage apparatus 100 transfers the sequential number and the data slot number to the second storage apparatus 200 (S514). The second storage apparatus 200 reads, from the second physical volume 151A, the data corresponding to the data slot number that was transferred from the first storage apparatus 100 (S515), and creates a journal in the second journal volume 152 based on the sequential number (S516). Subsequently, the first storage apparatus 100 turns OFF the difference bitmap of the data (S517).

Similar to the write processing from the host computer 30, the first storage apparatus 100 also acquires the sequential number in the initial copy processing. After performing the processing of step S511 to step S517 described above, the first storage apparatus 100 advances the copy pointer to the subsequent slot, and repeats the processing of step S511 to step S517. The first storage apparatus 100 repeatedly performs the processing of step S511 to step S517 from the initial slot to the final slot.

Since the copy processing for forming the RC configuration is similar to the processing of the asynchronous remote copy of FIG. 9 described above, the detailed explanation is omitted.

Details of the initial copy using the difference bitmap are now explained with reference to FIG. 33. PVOL-side (primary side of RC configuration) HA primary/HA secondary and SVOL-side (secondary side of RC configuration) HA primary/HA secondary all have a difference bitmap. In other words, in FIG. 32, all first to fourth storage apparatuses have a difference bitmap for forming the RC configuration. When the pair formation of the RC configuration described above is performed in a state where all first to fourth storage apparatuses are operating normally, the initial copy is controlled by using the difference bitmap of the first storage apparatus 100 having a journal attribute of a master attribute on the PVOL side.

(Initial Copy Part 1)

Figure 33:
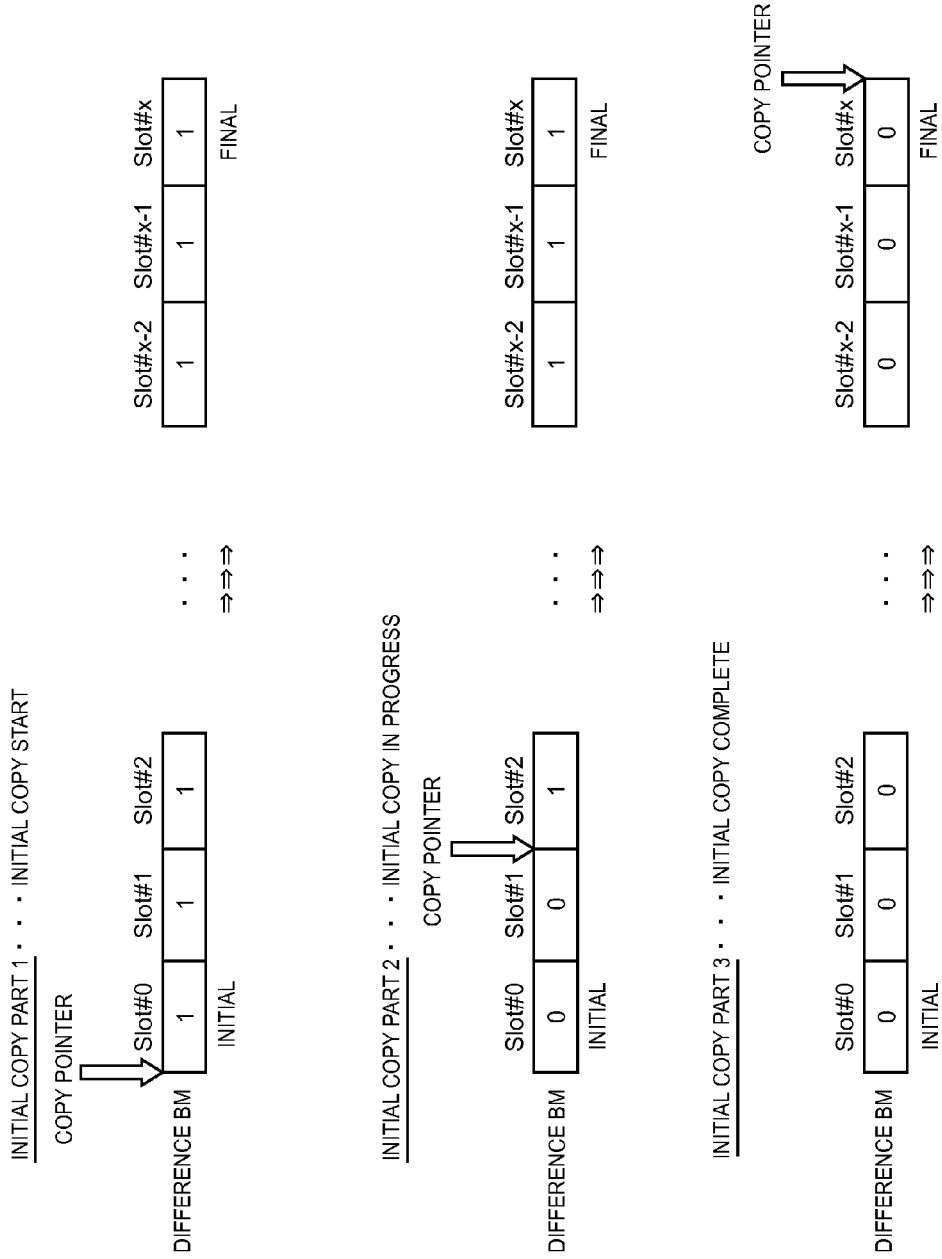
FIG. 33 is a conceptual diagram explaining the initial copy using a difference bitmap according to the first embodiment.

As shown in FIG. 33, when the initial copy is started after the copy pair formation, all difference bitmaps are ON (1), and the copy pointer is positioned at the initial slot.

(Initial Copy Part 2)

Subsequently, when the sequential journal creation from the HA primary side to the HA secondary is completed, the difference bitmap of the data range in which journals were created is turned OFF (0). Subsequently, when journal data for use in the initial copy is created on both the HA primary side and the HA secondary side, the copy pointer is advanced to the subsequent slot.

(Initial Copy Part 3)

When the processing of step S511 to step S517 of FIG. 32 is repeatedly performed and the initial copy is completed, all difference bitmaps are turned OFF, and the copy pointer advances to the final data position.

(Read/Write Processing During Initial Copy)

Figure 6:
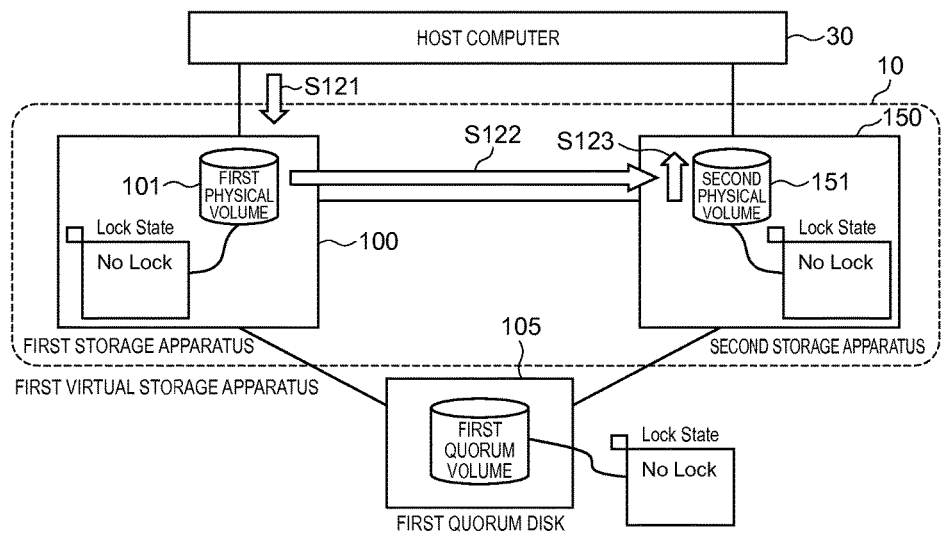
FIG. 6 is a conceptual diagram explaining the volume redundancy function based on the HA configuration according to the first embodiment.

Moreover, when a data read request is sent from the host computer 30 during the initial copy, data is read in a similar manner as the read processing in the HA configuration of FIG. 6 or FIG. 7 described above.

Moreover, when data write processing is performed from the host computer 30 during the initial copy, the operation will differ depending on whether the write processing is to be performed to a copied area; that is, an area where the bitmap is OFF, or to a non-copied area; that is, an area where the bitmap is ON.

Figure 11:
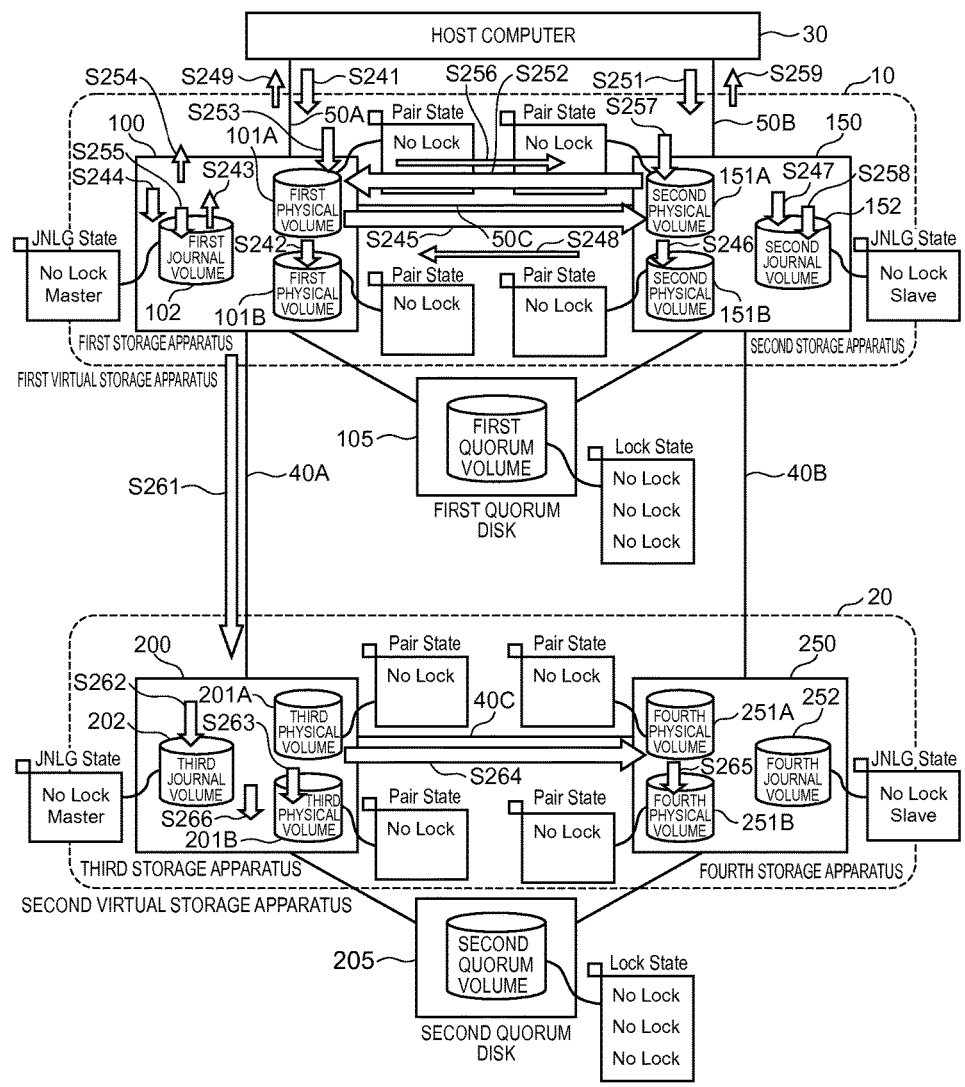
FIG. 11 is a conceptual diagram explaining the cooperative processing with the RC configuration according to the first embodiment.

When write processing is to be performed to a copied area, data is written in a similar manner as the write processing during the coordination of the HA configuration and the RC configuration of FIG. 11 described above. In other words, a sequential number is acquired on the primary side of the HA configuration, data is sequentially duplicated from the HA primary side to the HA secondary side, and a journal is created in both the HA primary and the HA secondary. Note that the write processing and the initial copy to the foregoing range are rejected.

Meanwhile, when write processing is to be performed to a non-copied area, data is written in a similar manner as the write processing when there is no coordination with the RC configuration shown in FIG. 4 or FIG. 5. In other words, data is sequentially duplicated from the HA primary side to the HA secondary side without the creation of a journal. In the foregoing case, the difference bitmap remains ON.

(Failure During Initial Copy)

Figure 34:
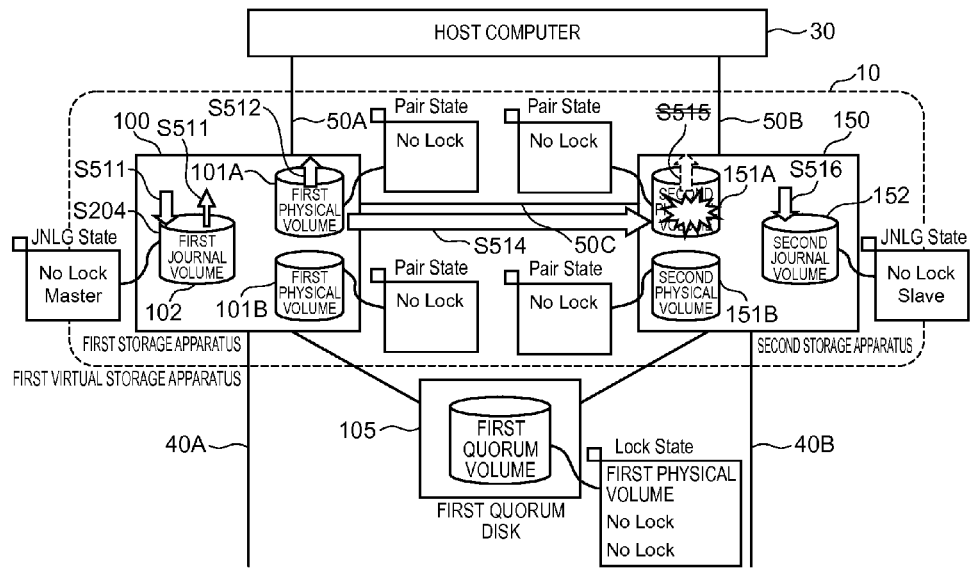
FIG. 34 is a conceptual diagram explaining the occurrence of a failure during initial copy according to the first embodiment.

FIG. 34 shows a case where a failure has occurred on the HA secondary side; that is, in the second physical volume 151A of the second storage apparatus 150, during the initial copy. In the foregoing case, copy processing that is similar to the initial copy processing shown in FIG. 32 is performed. As shown in FIG. 34, when a failure occurs in the second physical volume 151A and the HA secondary side becomes a blocked state, while journal data cannot be created using data on the HA secondary side, by transferring the journal data from the HA primary side, journal data can be created on the HA secondary side in a similar manner as the initial copy processing shown in FIG. 32.

Figure 35:
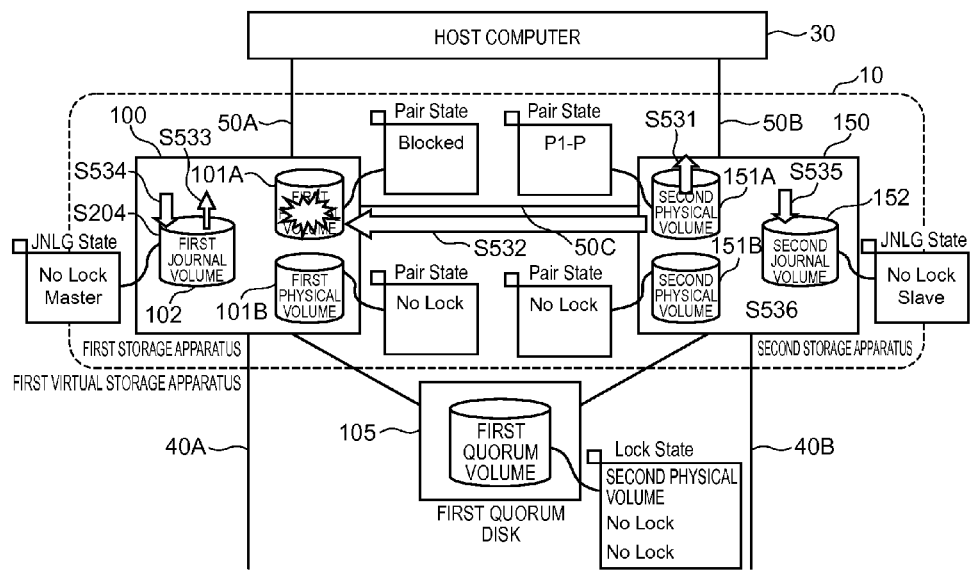
FIG. 35 is a conceptual diagram explaining the occurrence of a failure during initial copy according to the first embodiment.

FIG. 35 shows a case where a failure has occurred on the HA primary side; that is, in the first physical volume 101A of the first storage apparatus 100, during the initial copy. In the foregoing case, the initial copy is controlled by using the difference bitmap on the HA secondary side.

As shown in FIG. 35, if a failure occurs in the first physical volume 101A and the HA primary side becomes a blocked state, data of the second storage apparatus 150 is read (S531), and the data is transferred to the first storage apparatus 100 (S532). Subsequently, the first storage apparatus 100 acquires a sequential number (S533), creates a journal (S534), and sends the sequential number to the second storage apparatus 150. The second storage apparatus 150 creates a journal based on the sent sequential number (S535), and turns OFF the difference bitmap (S536). Processing of step S531 to step S536 is repeated for the amount of data slots.

Figure 36:
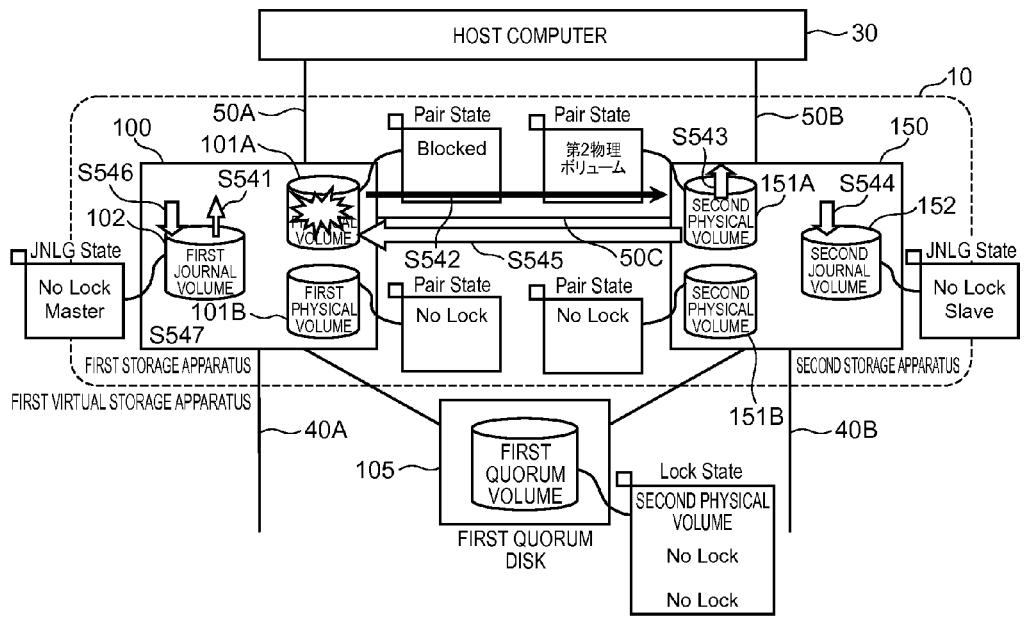
FIG. 36 is a conceptual diagram explaining the occurrence of a failure during initial copy according to the first embodiment.

FIG. 36 shows a case of controlling the initial copy by using the difference bitmap on the HA difference side when a failure occurs on the HA primary side; that is, in the first physical volume 101A of the first storage apparatus 100, during the initial copy.

As shown in FIG. 36, foremost, the first storage apparatus 100 acquires a sequential number (S541), and transfers the sequential number and the slot number to the second storage apparatus 150 (S542). When a failure occurs in the first physical volume 101A, since the HA primary side is in a blocked state, the second storage apparatus 150 reads data corresponding to the slot number (S543), and creates a journal (S544).

Subsequently, the second storage apparatus 150 transfers the read data to the first storage apparatus 100 (S545). The first storage apparatus 100 creates a journal by using the sequential number acquired in step S541 and the data transferred in step S545 (S546), and turns OFF the difference bitmap (S547). The processing of step S541 to step S547 is repeated for the amount of data slots.

(1-8) Operation During Suspension Operation (Suspension Operation 1)

Figure 37:
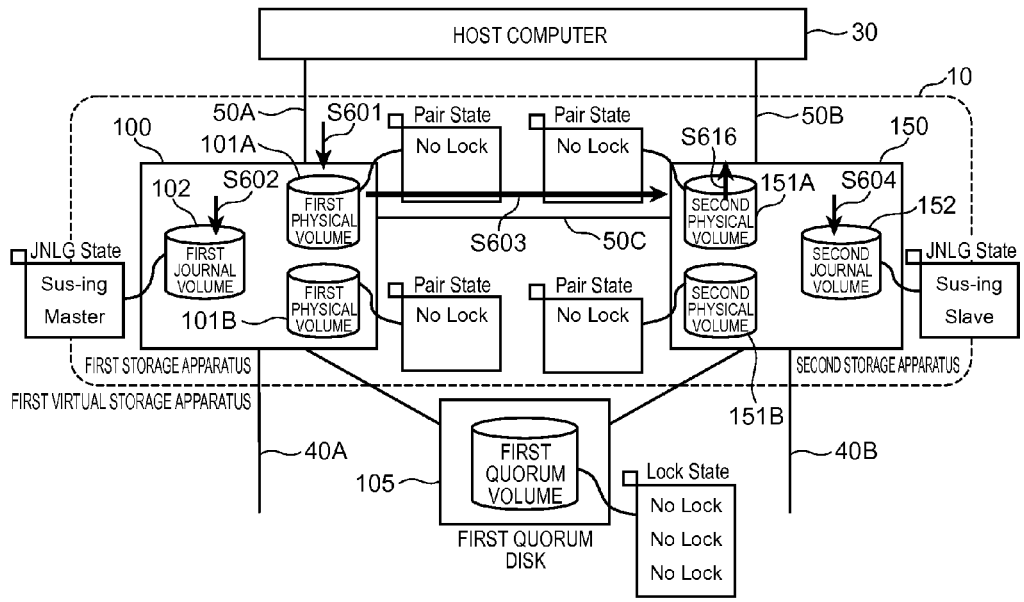
FIG. 37 is a conceptual diagram explaining the processing that is performed during the suspension operation according to the first embodiment.

A case of controlling the suspension operation on the HA primary side is foremost explained. As shown in FIG. 37, when the HA primary side; that is, when the first storage apparatus 100 receives a suspension operation (S601), the journal attribute is suspended (S602). Subsequently, the first storage apparatus 100 passes on the suspension operation to the second storage apparatus 150 (S603), and the second storage apparatus 150 suspends the journal attribute (S604).

Moreover, when the HA secondary side; that is, when the second storage apparatus 150 receives a suspension operation, the suspension operation is passed on to the first storage apparatus 100, and the processing of step S602 to step S604 described above is performed. When a suspended state is set to the journal attribute of both the first storage apparatus 100 and the second storage apparatus 150, a completion response of the suspension operation is returned.

(Suspension Operation 2)

As shown in FIG. 37, after changing the journal attribute to a suspended state in the first storage apparatus 100 and the second storage apparatus 150, the RC configuration pair belonging to that journal group is suspended.

The suspended state is managed, for each journal group, using the bitmap of the physical volumes that form the journal group. When the HA configuration and the RC configuration are coordinated, the pair formation state of the physical volumes in the HA primary and the HA secondary on the primary side of the RC configuration and in the HA primary and the HA secondary on the secondary side of the RC configuration is managed based on bitmaps, respectively.

Figure 38:
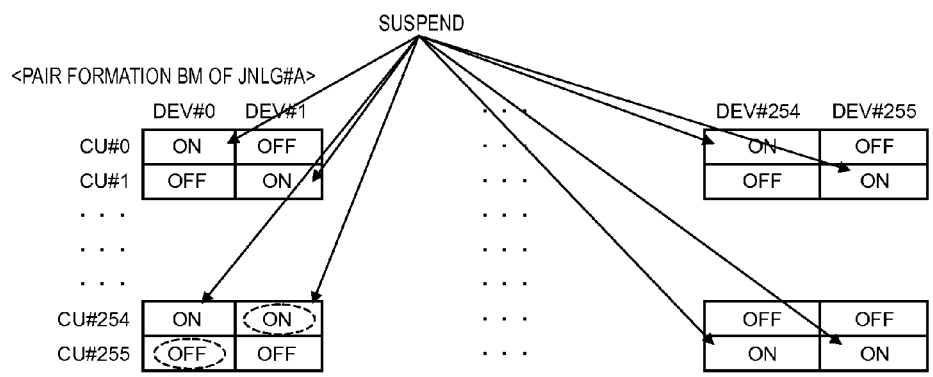
FIG. 38 is a conceptual diagram explaining the bitmap that manage the pair formation state according to the first embodiment.

As shown in FIG. 38, the bitmaps managing the pair formation state are in an initial state; that is, the bitmaps are OFF before pair formation. Subsequently, when a pair of physical volumes belonging to the journal group is formed, the bitmap is turned ON.

Upon suspending the RC configuration pair, the physical volume of the pair belonging to the journal group in a suspended state is searched, and the target pair is suspended.

As shown in FIG. 38; for example, let it be assumed that this storage apparatus includes CU#0 to CU#255, and includes DEV#0 to DEV#255 corresponding to each CU#. When suspension processing is to be performed, by searching the physical volume belonging to the journal group from the bitmap and identifying the CU#, DEV#, the pair to be subject to suspension operation is suspended.

Figure 39:
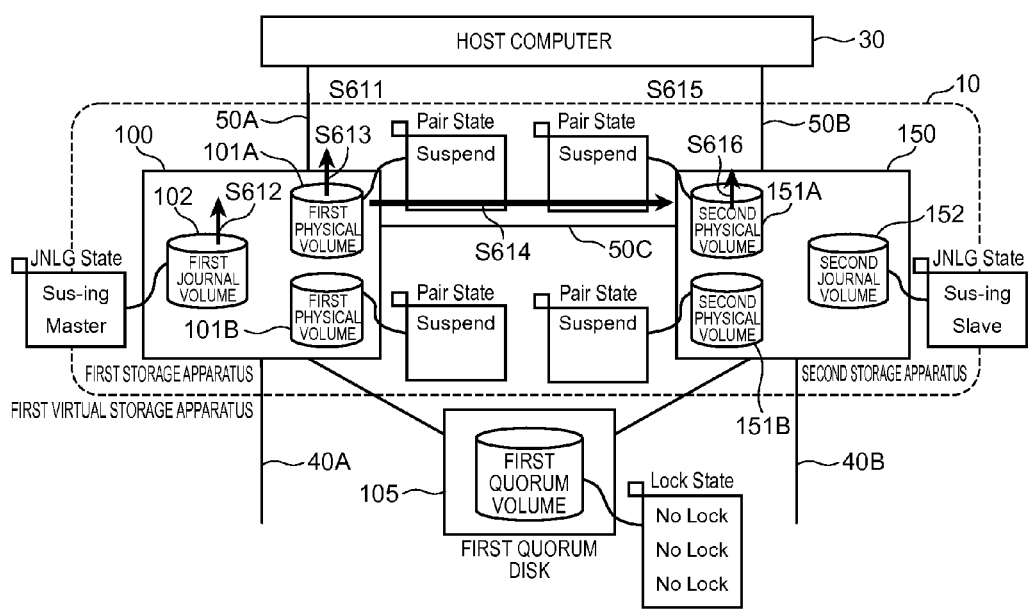
FIG. 39 is a conceptual diagram explaining the processing that is performed during the suspension operation according to the first embodiment.

As shown in FIG. 39, when the HA primary on the primary side of the RC configuration is operating normally, the suspension processing is controlled by the HA primary. The first storage apparatus 100 changes all pairs belonging to the journal group to a suspended state based on the bitmap of the pair formation in the HA primary on the primary side of the RC configuration (S611). After changing all pairs to a suspended state, the first storage apparatus 100 acquires a sequential number on the HA primary side (S612), and creates a suspension marker by assigning the sequential number (S613).

Moreover, the first storage apparatus 100 assigns the acquired sequential number, and also sends a suspension command to the HA secondary side on the primary side of the RC configuration (S614). The second storage apparatus 150 that received the suspension command changes all pairs to a suspended state based on the pair formation bitmap (S615), and thereafter creates a suspension marker with the sequential number that was transferred from the HA primary side (S616).

Note that the journal data created before the creation of the suspension marker are all restored on the secondary side of the RC configuration. Thus, the suspension transient state is maintained until the journal data is restored on the secondary side of the RC configuration after the suspension operation is received. Subsequently, after all journal data is restored, the suspension transient state is changed to a suspended state.

(Suspension Operation 3)

Figure 40:
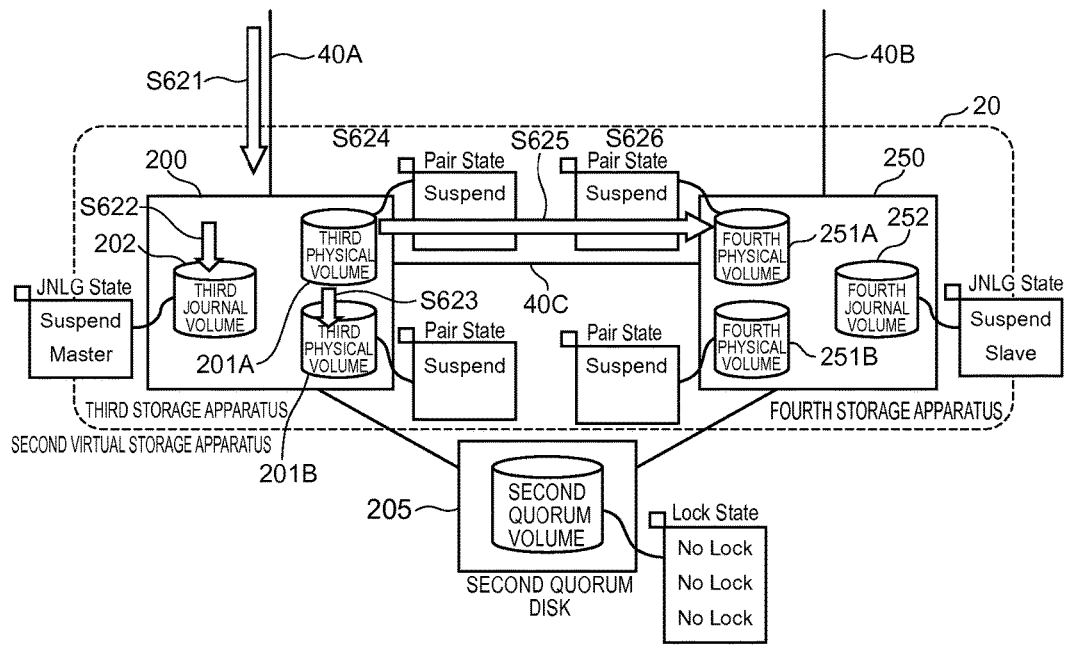
FIG. 40 is a conceptual diagram explaining the processing that is performed during the suspension operation according to the first embodiment.

FIG. 40 shows a case of changing the secondary side of the RC configuration to a suspended state. As shown in FIG. 40, when the third storage apparatus 200, which is the HA primary side on the secondary side of the RC configuration, issues an RDJNL command to the first storage apparatus 100, which is the HA primary side on the primary side of the RC configuration, and detects the suspension maker created in the first storage apparatus 100 (S621), the third storage apparatus 200 stores the suspension marker in the third journal volume 202 (S622), and restores the suspension marker (S623). The third storage apparatus 200 restores the suspension maker in step S623, changes the journal attribute to a suspension transient state, and, after causing all pairs to be a suspended state, defines the suspension of the journal group state.

Subsequently, the third storage apparatus 200 sends a suspension command, together with the sequential number, to the fourth storage apparatus 250 (S625), and also changes the fourth storage apparatus 250 to a suspended state. Note that, since the suspension marker is processed, in accordance with the sequential number, by the second virtual storage apparatus 20 that forms the RC configuration, all journal data that are created before the creation of the suspension marker are restored in the physical volume of the second virtual storage apparatus 20, and thereafter changed to a suspended state.

(Suspension Operation 4)

Figure 41:
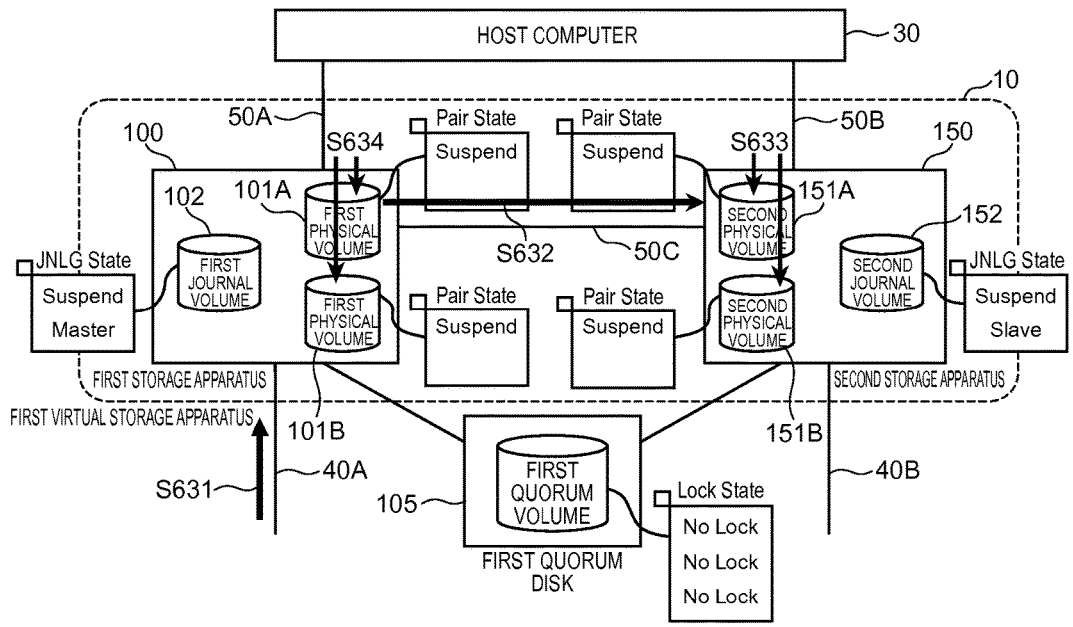
FIG. 41 is a conceptual diagram explaining the processing that is performed during the suspension operation according to the first embodiment.

As described above, when the third storage apparatus 200 of the second virtual storage apparatus 20 changes all physical volumes belonging to the journal group to a suspended state, as shown in FIG. 41, it notifies the completion of suspension to the first storage apparatus 100 (S631). When the first storage apparatus 100 receives the suspension completion notice, it sends a suspension finalization command to the second storage apparatus 150 (S632).

The second storage apparatus 150 changes all pair states to a suspended state (S633). Specifically, the second storage apparatus 150 defines the suspension transient state of the pair belonging to the journal group as a suspended state based on the pair formation bitmap.

The first storage apparatus 100 changes all pair states to a suspended state (S634). Specifically, the pair belonging to the journal group defines the suspension transient state as a suspended state based on the pair formation bitmap.

As described above, as a result of the pair state being changed from a suspension transient state to a suspension defined state, the secondary side of the RC configuration can deem that the copy of all data that was subject to write processing before the performance of the suspension operation to the physical volumes on the secondary side of the RC configuration has been guaranteed.

(I/O Operation During Suspension)

Figure 42:
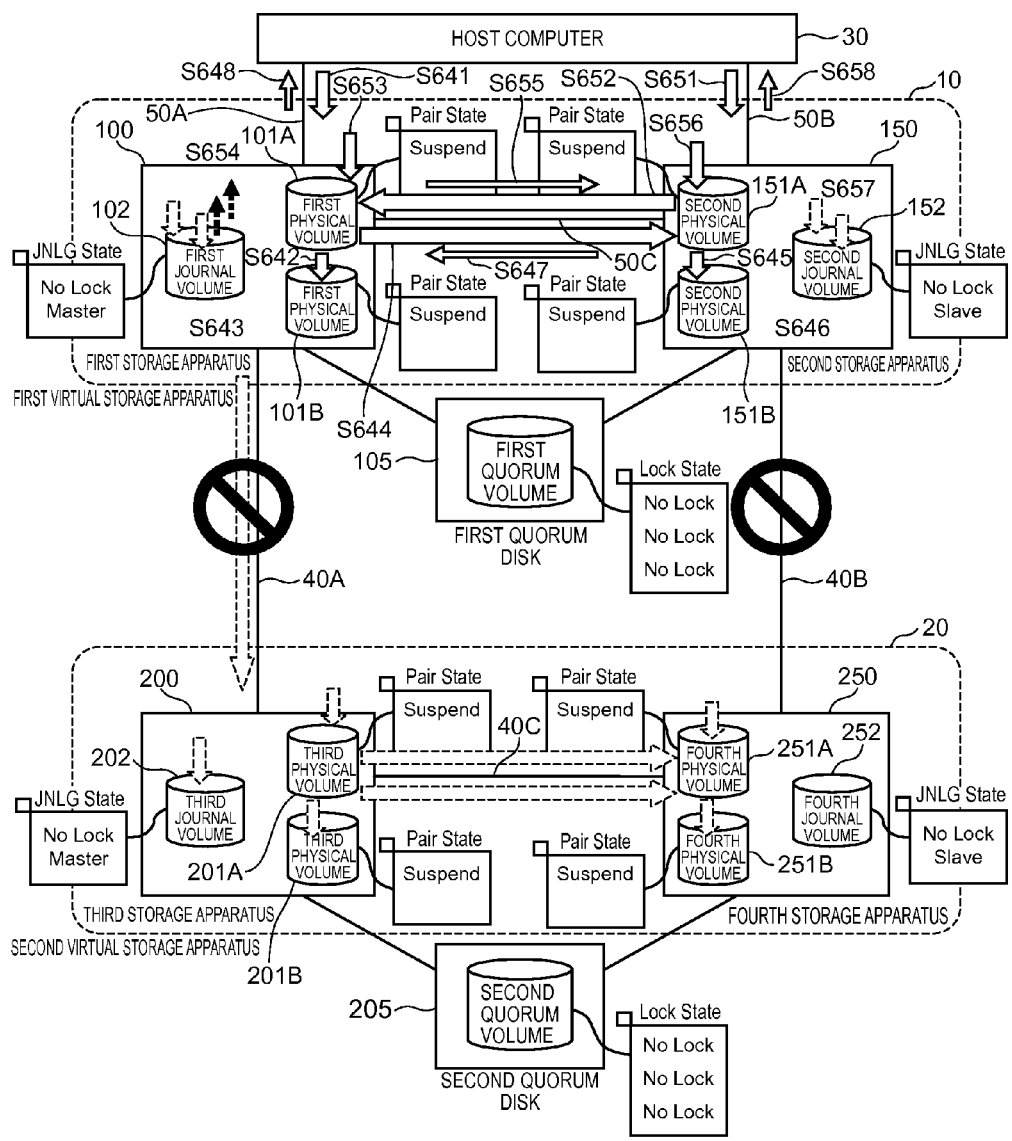
FIG. 42 is a conceptual diagram explaining the I/O operation during suspension according to the first embodiment.

FIG. 42 shows the I/O operation from the host computer 30 during the suspension. When a data read request is sent from the host computer 30 during the suspension, data is read in a manner that is similar to the read processing in the HA configuration of FIG. 6 or FIG. 7 described above. Moreover, when a data write request is sent from the host computer 30 during the suspension, data is written in a similar manner as the write processing in the HA configuration of FIG. 4 or FIG. 5 described above. In other words, a journal is not created during the write processing in the first virtual storage apparatus 10.

However, the difference bitmap is turned ON, and the difference position of the primary side and the secondary side of the RC configuration is recorded. Accordingly, in the first storage apparatus 100 on the HA primary side also, the difference bitmap is turned ON without creating a journal during the writing of data in the second storage apparatus 150 on the HA secondary side. The reason for turning ON the difference bitmap as described above is the same reason as the case of the failure suspension of the failure pattern 12 shown in FIG. 24.

(Pair Deletion Operation)

The operation in the RC configuration and the HA configuration during the pair deletion operation is similar to the foregoing suspension operation. However, unlike during the suspension operation, the suspension transient state becomes a Simplex transient state with regard to the journal group state, the suspension defined state becomes a Simplex defined state, and the suspension marker is changed to a deletion marker. Moreover, while the difference bitmap is turned ON in the suspension transient state in the suspension operation, the Simplex transient state during pair deletion differs from the suspension operation with respect to the point that the difference bitmap is not turned ON. Moreover, in the pair deletion operation, the physical volume of the pair belonging to the deleted journal group is searched from the bitmap, and the bitmap of the target pair is changed from ON to OFF.

(Pair Resumption Operation)

When a pair resumption operation is performed to the pair in the suspended state as described above, the pair is resumed, and the difference data recorded in the difference bitmap is copied from the primary side to the secondary side of the RC configuration. The copy processing from the primary side to the secondary side in the RC configuration is similar to the copy processing in the foregoing initial copy.

During the initial copy described above, all difference bitmaps are turned ON, journal data is created for all data, and data is copied to the secondary side of the RC configuration. Meanwhile, during the pair resumption, the difference bitmap is referred to, journal data is created only for data in which the difference is ON, and data is copied from the physical volume on the primary side to the physical volume on the secondary side of the RC configuration. Moreover, similar to the case of initial copy, journal data is created on both the HA primary side and the HA secondary side on the primary side of the RC configuration.

Note that, when a SWAP-designated pair resumption operation is performed, difference copy, which is similar to the one described above, is performed from the secondary side to the primary side of the RC configuration. Moreover, there are cases were data has been written on both the primary side and the secondary side of the RC configuration in the suspended state. For example, if a failure occurs in the host computer 30 connected to the primary side of the RC configuration in the suspended state and the host computer 30 performs a failover on the secondary side of the RC configuration, data is also written on the secondary side of the RC configuration. In the foregoing case, during the pair resumption, the difference bitmaps on the primary side and the secondary side of the RC configuration are merged, and the difference copy is thereafter performed.

The difference bitmap merge processing foremost merges the difference bitmaps of the HA primary side on the primary side of the RC configuration and the HA primary side on the secondary side of the RC configuration. Subsequently, the difference data is reflected in both the HA primary side and the HA secondary side on the primary side of the RC configuration. After merging the difference bitmap on the primary side of the RC configuration, the difference bitmap of the HA primary side and the HA secondary side on the secondary side of the RC configuration is cleared. In the case of a SWAP-designated pair resumption operation, the merged difference bitmap is reflected in the former secondary side of the RC configuration, the difference bitmap on the former primary side of the RC configuration is cleared, and the difference copy is then performed from the former secondary side to the former primary side of the RC configuration.

Upon receiving the pair resumption operation on the primary side of the RC configuration, the primary side of the RC configuration changes the journal group state from a suspended state to a normal state. Subsequently, communication is made with the secondary side of the RC configuration, and the state of all journal groups is changed from a suspended state to a normal state. Subsequently, the pair formation bitmap of the HA primary side on the primary side of the RC configuration is referred to, all RC configuration pairs belonging to the journal group are changed from a suspended state to a copy state, and the pair state is resumed. Note that, with regard to the change from a suspended state to a copy state, the same operation of changing to a copy state in the initial copy is performed. Subsequently, the pair state of all journal groups is changed from a suspended state to a copy state.

Note that the I/O operation from the host computer 30 during the data copy from the primary side to the secondary side of the RC configuration based on the pair resumption operation is similar to the I/O operation during the initial copy in the initial formation. Details of the pair resumption operation are now explained with reference to FIG. 43 to FIG. 46.

(Pair Resumption Part 1)

Figure 43:
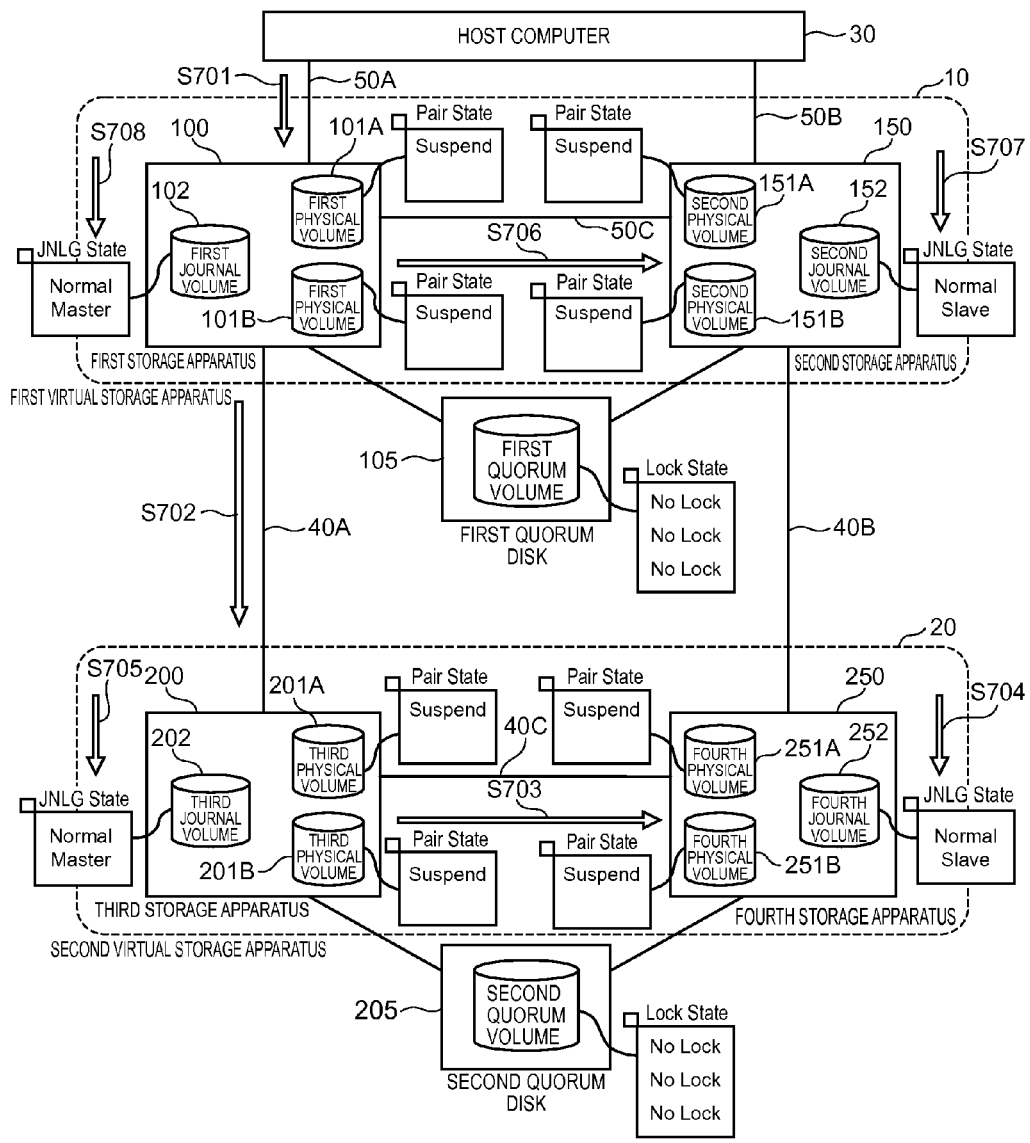
FIG. 43 is a conceptual diagram explaining the pair resumption operation according to the first embodiment.

As shown in FIG. 43, when the first storage apparatus 100 receives a pair resumption operation (S701), the first storage apparatus 100 transfers a pair resumption command to the third storage apparatus 200 (S702). Subsequently, the third storage apparatus 200 passes on the pair resumption command to the fourth storage apparatus 250 (S703). Subsequently, the journal group state of the fourth storage apparatus 250 and the third storage apparatus 200 is changed from suspension to normal (S704, S705).

Moreover, the first storage apparatus 100 passes on the pair resumption command to the second storage apparatus (S706). Subsequently, the journal group state of the second storage apparatus 150 and the first storage apparatus 100 is changed from suspension to normal (S707, S708).

(Pair Resumption Part 2)

Figure 44:
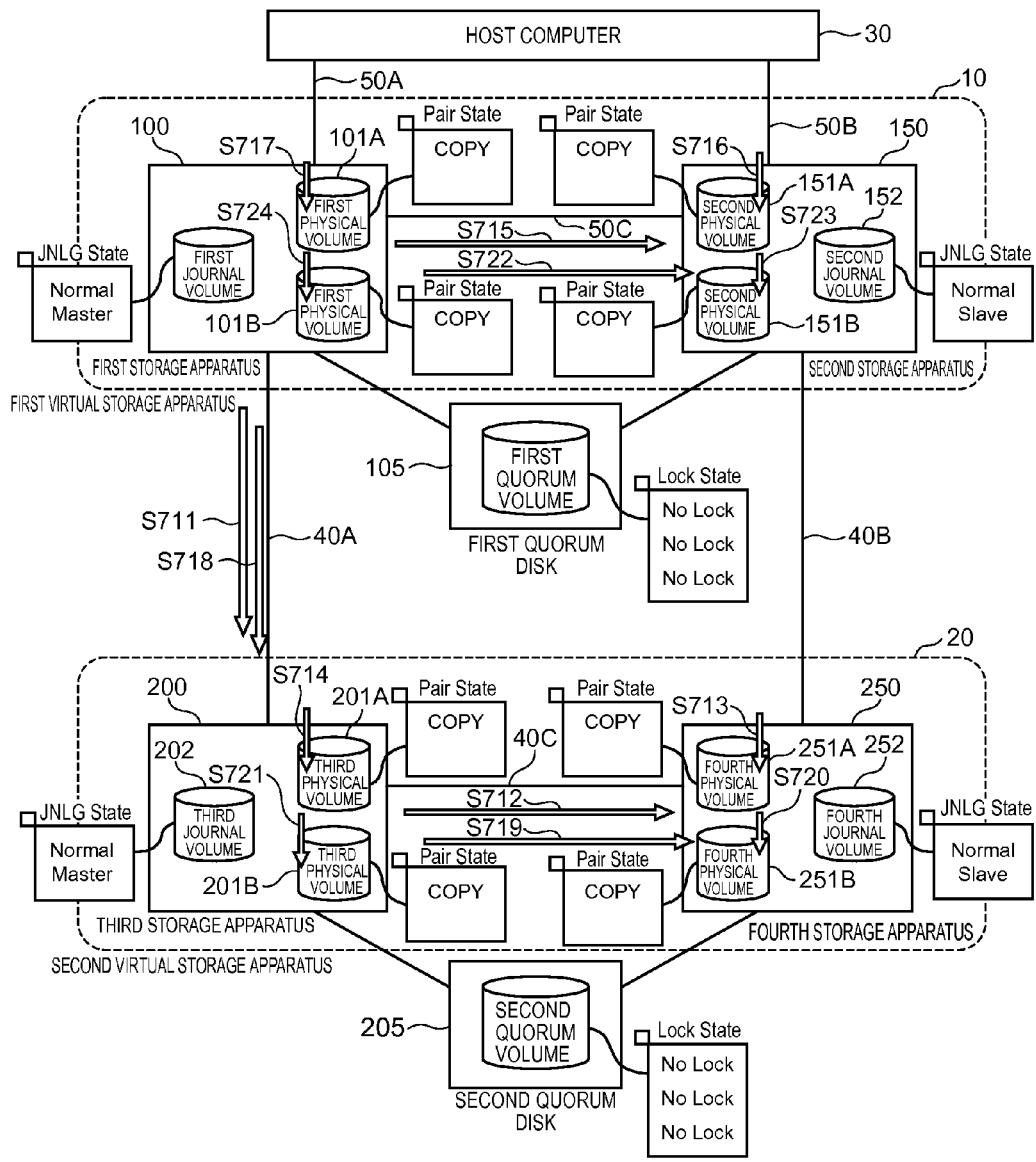
FIG. 44 is a conceptual diagram explaining the pair resumption operation according to the first embodiment.

In FIG. 44, the pair resumption command is transferred or passed on from the first storage apparatus 100 to the second storage apparatus 150, the third storage apparatus 200 and the fourth storage apparatus 200, and the state of all pairs belonging to the journal group is changed from a suspended state to a copy state in the respective apparatuses.

Specifically, when a pair resumption command of the first physical volume 101A is sent (S711, S712, S715), the pair state of the physical volumes of the same journal group as the first volume 101A in the respective apparatuses is resumed (S713, S714, S716, S717). Subsequently, a pair resumption command of the first physical volume 101B is sent (S718, S719, S722), and the pair state of the physical volumes of the same journal group as the first volume 101A of the respective apparatuses is resumed (S720, S721, S723, S724).

(Pair Resumption Part 3)

Figure 45:
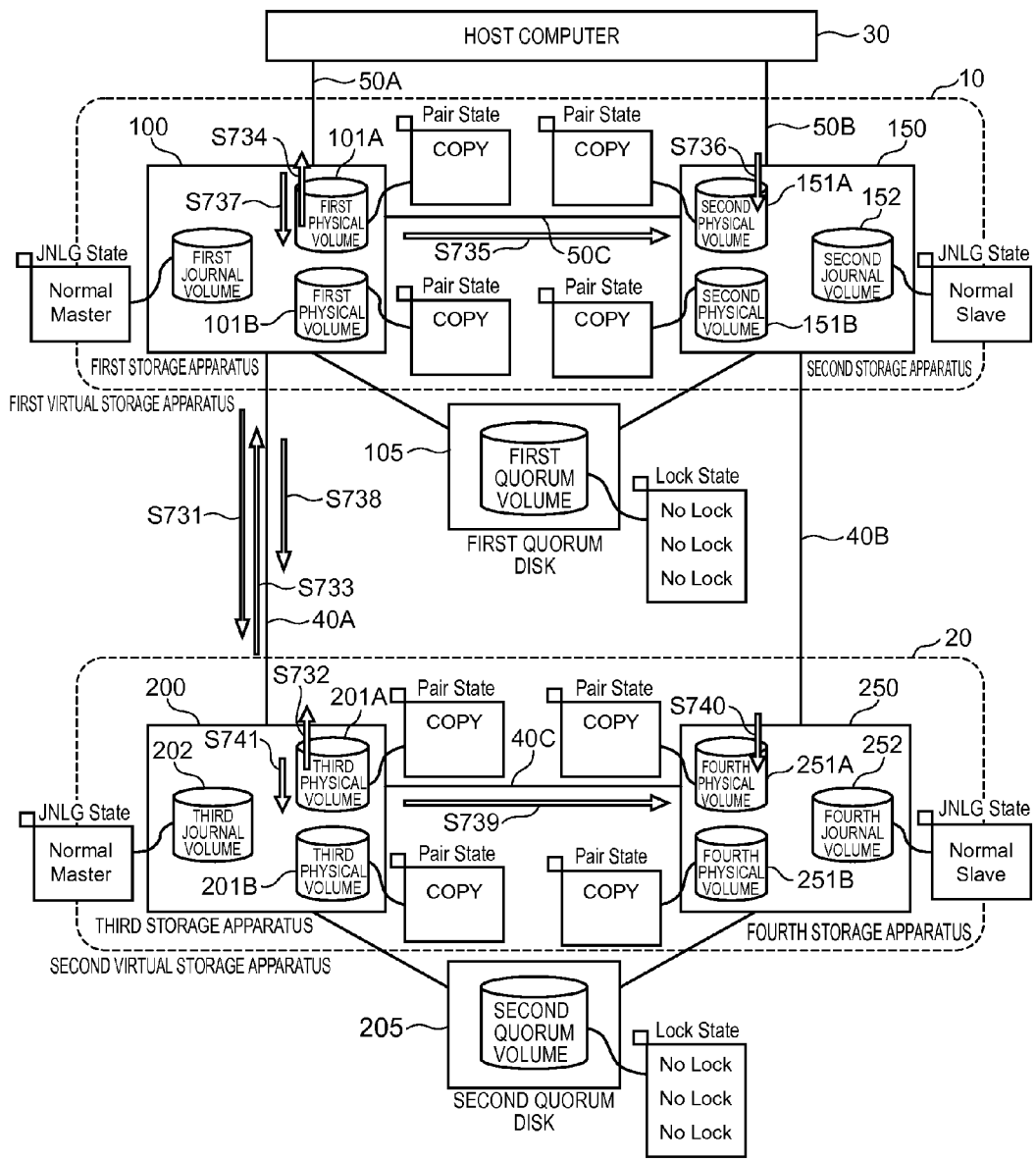
FIG. 45 is a conceptual diagram explaining the pair resumption operation according to the first embodiment.

FIG. 45 shows the merge processing of the difference bitmaps on the primary side and the secondary side of the RC configuration. Foremost, a difference bitmap acquisition command of the first physical volume 101A is sent from the first storage apparatus 100 to the third storage apparatus 200 (S731). The third storage apparatus 200 acquires a difference bitmap of the third physical volume 201A, which is a pair of the first physical volume 101A (S732), and transfers the acquired difference bitmap to the first storage apparatus 10 (S733).

The first storage apparatus 100 acquires the difference bitmap of the first physical volume 101A (S734). Moreover, the first storage apparatus 100 passes on, to the second storage apparatus 150, the difference bitmap of the third physical volume 201A that was transferred in step S733 (S735). The first storage apparatus 100 and the second storage apparatus 150 merge the difference bitmaps corresponding to the first physical volume 101A and the third physical volume 201A (S736, S737).

The first storage apparatus 100 commands the third storage apparatus 200 to clear the difference bitmaps of the third physical volume 201A (S738). The third storage apparatus 200 passes on, to the fourth storage apparatus, a clear command of the difference bitmaps of the third physical volume 201A (S739). The third storage apparatus 200 and the fourth storage apparatus 250 clears the difference bitmaps corresponding to the third physical volume 201A (S740, S741).

Figure 46:
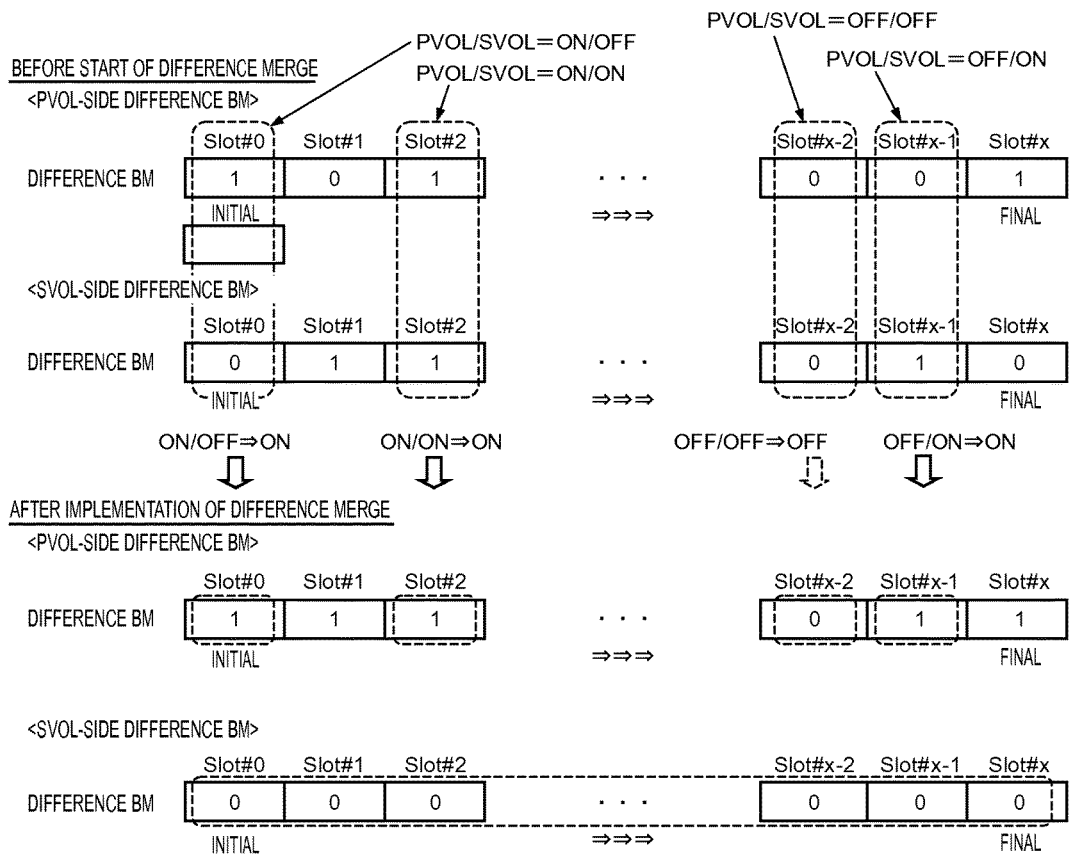
FIG. 46 is a conceptual diagram explaining the pair resumption operation according to the first embodiment.

FIG. 46 shows a state of the difference bitmap before the start of difference merging and after the performance of difference merging. AS shown in FIG. 46, before the start of difference merging, the PVOL-side difference bitmap is turned ON regarding the slots in which one of the primary side (PVOL-side) difference bitmaps of the RC configuration and the secondary side (SVOL) difference bitmaps of the RC configuration is ON. For example, when the PVOL-side difference bitmap is 1 and the SVOL-side difference bitmap is 0, the PVOL-side difference bitmap after the performance of difference merging becomes 1. Accordingly, after the difference bitmaps are merged on the PVOL side, all SVOL-side difference bitmaps are turned OFF.

Accordingly, after the difference bitmaps are merged on the PVOL side and the SVOL side, data is copied to the SVOL side only with regard to slots in which the PVOL-side difference bitmap is ON.

Figure 47:
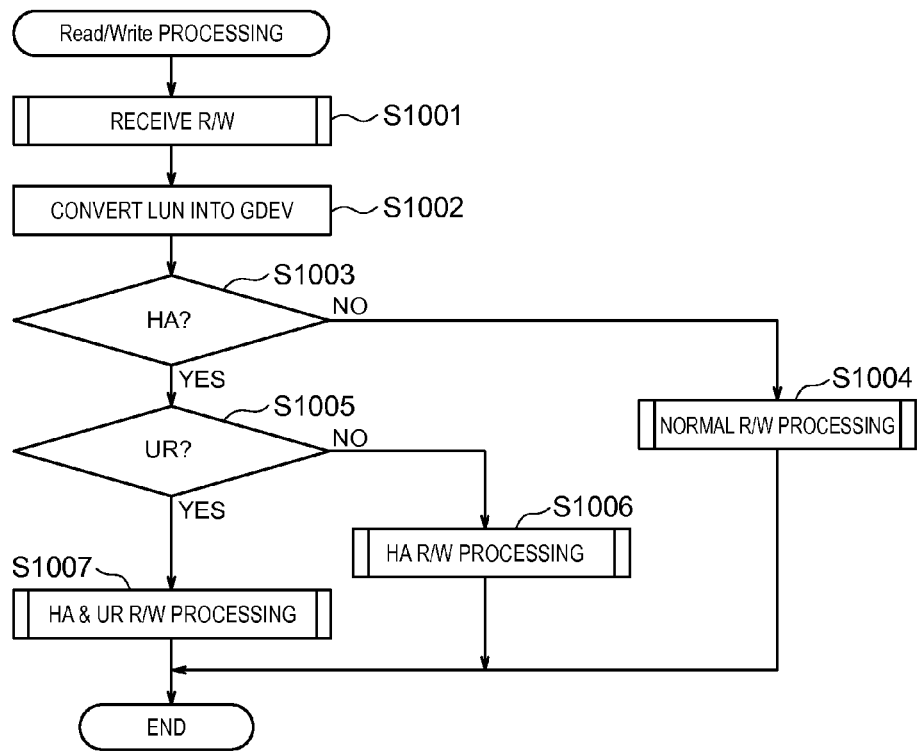
FIG. 47 is a flowchart showing the read/write processing according to the first embodiment.

(1-9) Operation of Storage System (1-9-1) Details of Storage System Operation During Normal Operation Details of the operation of the storage system are now explained. Foremost, the Read/Write processing is now explained with reference to FIG. 47. The host computer 30 issues a read/write request to the virtual volume (GDEV) of the virtual storage apparatus. The host computer 30 recognizes that a plurality of virtual ports exist in the virtual storage apparatus. When the host computer 30 issues a read/write request to one of the virtual ports, a read/write request is sent to the port of the physical storage apparatus associated with the respective virtual ports. In other words, the port of the first storage apparatus is associated with a certain virtual port, and the port of the second storage apparatus is associated with the other virtual ports. FIG. 47 shows a case where a read/write request is issued to the port of the virtual storage apparatus that is associated with the port of the first storage apparatus. As shown in FIG. 47, when the first storage apparatus 100 receives a read/write request from the host computer 30 (S1001), the first storage apparatus 100 converts the LUN (Logical Unit Number) designated in the host computer 30 into the GDEV ID which identifies the virtual volume (GDEV) in the first storage apparatus 100 (S1002).

Subsequently, the first storage apparatus 100 identifies the physical volume ID from the GDEV ID, and determines whether the physical volume corresponding to the GDEV is the HA configuration (S1003). In step S1003, when it is determined that the physical volume is not the HA configuration, the first storage apparatus 100 executes normal read/write processing (S1004). Meanwhile, in step S1003, when it is determined that the physical volume is the HA configuration, whether the physical volume is the RC configuration is determined (S1005). Here, whether the physical volume is the HA configuration or the RC configuration is managed in the configuration information (not shown) of the respective physical volumes included in the control information stored in a memory or the like.

In step S1005, when it is determined that the physical volume is not the RC configuration, the read/write processing is executed in the HA configuration (S1006). Meanwhile, in step S1005, when it is determined that the physical volume is the RC configuration, the read/write processing is executed to the physical volume of the HA configuration and the RC configuration (S1007).

Figure 48:
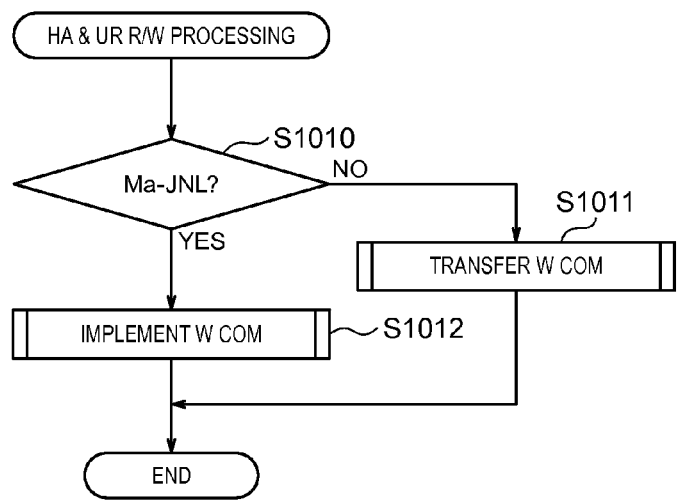
FIG. 48 is a flowchart showing the read/write processing according to the first embodiment.

In the ensuing explanation, the write processing performed to the physical volume of the HA configuration and the RC configuration is explained. As shown in FIG. 48, the first storage apparatus 100 determines whether the journal attribute is a master (S1010).

In step S1010, when it is determined that the journal attribute of the first storage apparatus 100 is a master, the write command received from the host computer 30 is executed (S1011). Meanwhile, in step 1011, when it is determined that the journal attribute of the first storage apparatus 100 is not a master; that is, when it is determined that the journal attribute of the first storage apparatus 100 is a slave, the write command is transferred (S1012).

As described above, in this embodiment, to which apparatus between the two storage apparatuses forming the HA configuration the write processing is performed first is predetermined. In this embodiment, the primary side of the HA configuration; that is, the apparatus in which the journal attribute is a master is first subject to the write processing. Accordingly, when the journal attribute is a slave, data is transferred to the master side to which the write processing is performed.

(Master-Side Write Processing)

The write processing of the first storage apparatus 100, in which the journal attribute is a master, is now explained with reference to FIGS. 49A and 49B.

Figure 49A:
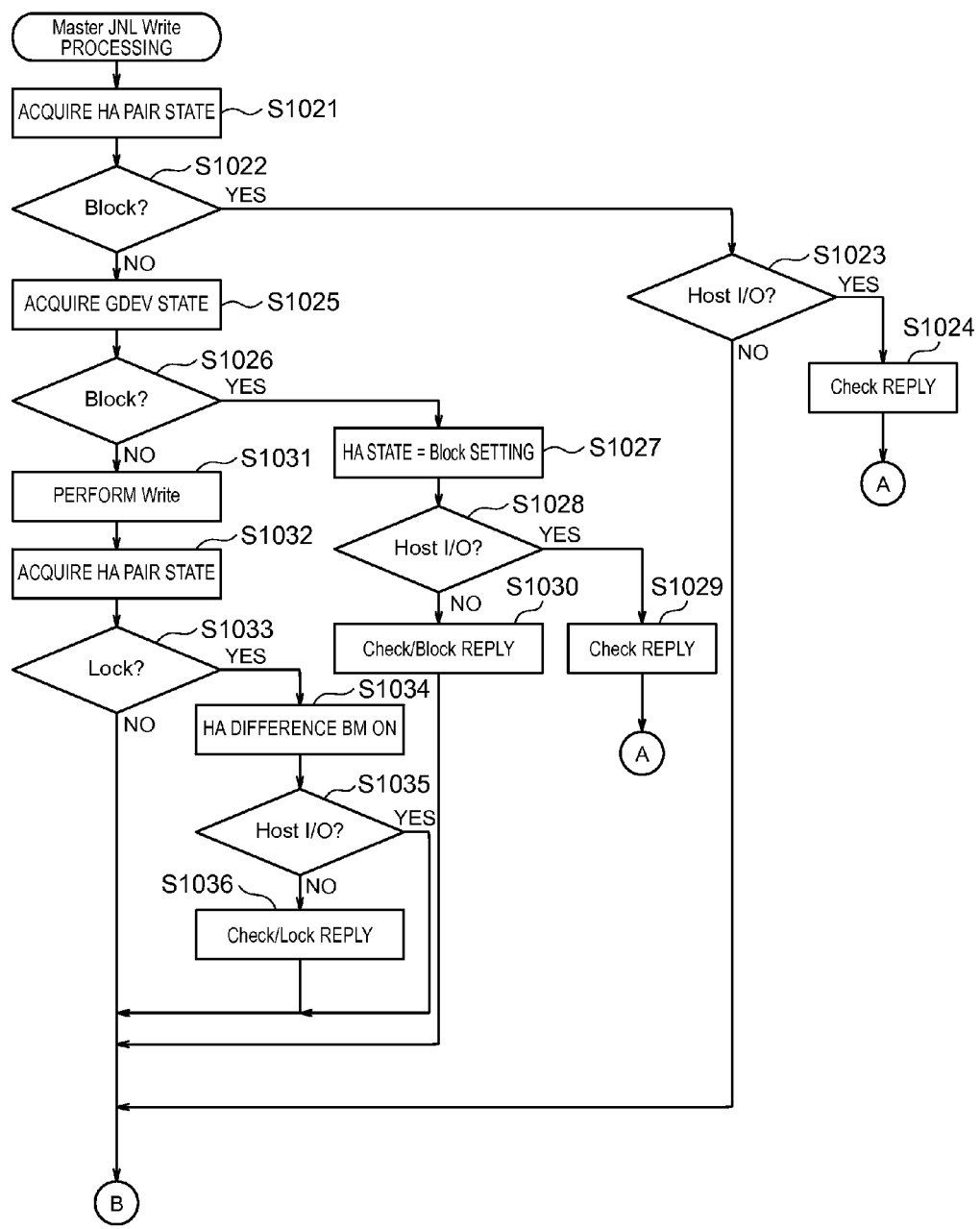
FIG. 49A is a flowchart showing the master-side write processing according to the first embodiment.
Figure 49B:
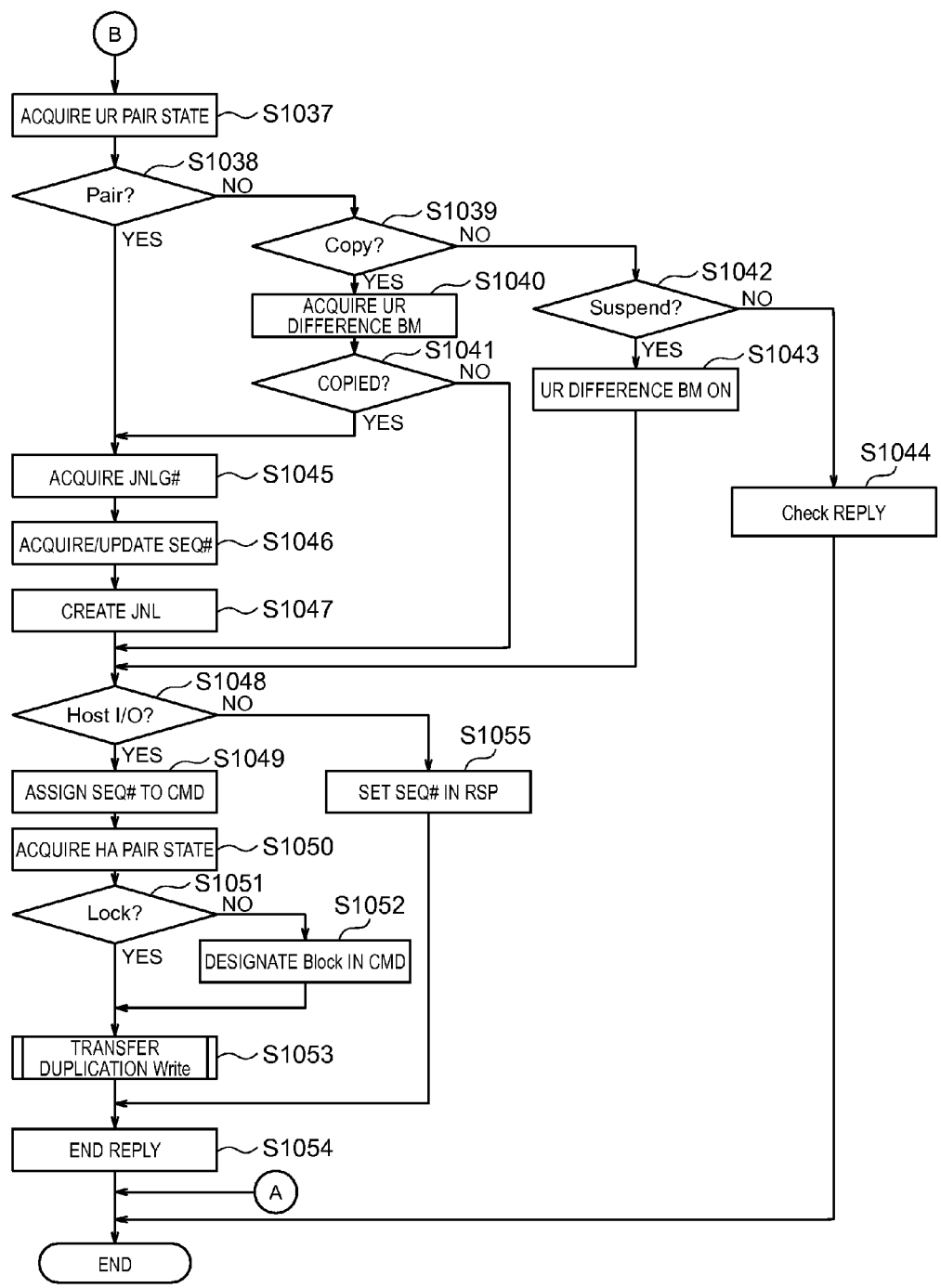
FIG. 49B is a flowchart showing the master-side write processing according to the first embodiment.

As shown in FIG. 49A, foremost, the first storage apparatus 100 acquires the pair state of the HA configuration (S1021), and determines whether the pair state of the HA configuration is a Block state (S1022). When a difference occurs in the data between the primary side and the secondary side of the HA configuration; that is, when the synchronization ends in a failure, it is necessary to guard the access to the old data. In this embodiment, the Lock information of the quorum disk 105 is used to guard the access to the old data at the time that the difference occurred.

In step S1022, when it is determined that the pair state of the HA configuration is a Block state, the first storage apparatus 100 determines whether it is an I/O from the host computer 30 (S1023). In step S1023, when it is determined that it is a response from the host computer 30, the first storage apparatus 100 returns a check response to the RSP (Response) (S1024). Meanwhile, in step S1023, when it is determined that it is not a response from the host computer 30, the storage apparatus 100 executes the processing of step S1037 onward.

Moreover, in step S1022, when it is determined that the pair state of the HA configuration is not a Block state, the first storage apparatus 100 acquires a GDEV state (S1025), and determines whether access to the physical volume of the access target is blocked (Block: State in which writing is not possible due to a hardware failure or the like) (S1026).

In step S1026, when it is determined that access to the physical volume of the access target is blocked, the first storage apparatus 100 sets the pair state of the HA configuration to a Block state (S1027). Subsequently, the first storage apparatus 100 determines whether it is an I/O from the host computer 30 (S1028), returns a check response to the RSP when it is an I/O from the host computer 30 (S1029), and ends the processing.

Meanwhile, in step S1028, when it is determined that it is not an I/O from the host computer 30, the first storage apparatus 100 sends a check response to the RSP and also sends a response to the effect that the HA primary side is of a Block state (S1030), and executes processing of step S1037 onward. Based on the response in step S1030, the fact that the first storage apparatus 100 as the HA primary side is a Block state is notified to the second storage apparatus 150 as the HA secondary side, and the second storage apparatus 150 is caused to acquired the Lock of the quorum disk 105.

In step S1026, when it is determined that access of the physical volume of the access target is not blocked, the first storage apparatus 100 performs write processing to the first physical volume 101 as the write target (S1031). Subsequently, the pair state of the HA configuration is acquired (S1032), and whether the Lock has been acquired on the HA primary side is determined (S1033).

In step S1033, when it is determined that the Lock has been acquired on the HA primary side, the first storage apparatus 100 turns ON the difference bitmap in the HA configuration (S1034). Subsequently, the first storage apparatus 100 determines whether it is an I/O from the host computer 30 (S1035) and, if it is an I/O from the host computer 30, it executes the processing of step S1037 onward, and, if it is not an I/O from the host computer 30, it sends a check response to the RSP and returns a Lock response (S1036).

In step S1033, when the HA primary side has acquired the Lock; that is, when a failure has occurred in the HA secondary side, the difference bitmap in the HA configuration is turned ON, and the difference data is copied after the HA secondary side is recovered. It is thereby possible to recover the HA configuration upon the recovery of the failure. Moreover, when the write processing is duplication write from the HA secondary side, a check response is sent to the RSP in order to change the HA state of the HA secondary side to a Block state, and the Lock state of the HA primary side is added to the check response and notified to the HA secondary side. It is thereby possible to change the HA state of the HA secondary side to a Block state.

Subsequently, the first storage apparatus 100 acquires the pair state of the RC configuration (S1037), and determines whether the pair state of the first storage apparatus 100 and the third storage apparatus 200 is "Pair" (S1038).

In step S1038, when it is determined that the pair state is not Pair, the first storage apparatus 100 determines whether the pair state is "Copy" (S1039). In step S1039, when it is determined that the pair state is Copy, the first storage apparatus 100 acquires the difference bitmap in the RC configuration (S1040). Subsequently, the first storage apparatus 100 determines whether the data corresponding to the difference bitmap acquired in step S1040 has been copied (S1041), executes the processing of step S1045 onward when the data has been copied, and executes the processing of step S1048 onward when the data has not been copied.

Meanwhile, in step S1039, when it is determined that the pair state is not Copy, the first storage apparatus 100 determines whether the pair state is "Suspend" (S1042). In step S1042, when it is determined that the pair state is Suspend, the first storage apparatus 100 turns ON the difference bitmap in the RC configuration (S1043). Meanwhile, in step S1042, when it is determined that the pair state is not Suspend, the first storage apparatus 100 returns a check response to the RSP (S1044).

In step S1038, when it is determined that the copy state is Pair, the first storage apparatus 100 acquires the journal group number of the first physical volume 101 as the access target (S1045), acquires a sequential number, performs an update (S1046), and creates a journal (S1047).

Subsequently, the first storage apparatus 100 determines whether it is an I/O from the host computer 30 (S1048), and sets the sequential number in the RSP when it is not an I/O from the host computer 30 (S1055).

Meanwhile, in step S1048, when it is determined that it is an I/O from the host computer 30, the first storage apparatus 100 assigns a sequential number to the command (CMD) (S1049). Subsequently, the first storage apparatus 100 acquires the pair state of the HA configuration (S1050), and determines whether the pair state is "Lock" (S1051).

In step S1051, when the pair state of the HA configuration is Lock, the first storage apparatus 100 designates Block in the command Block (S1052). In step S1052, the first storage apparatus 100 transfers the command to the second storage apparatus 150 as the HA secondary side, and changes the HA state of the second storage apparatus 150 to Block.

Subsequently, the first storage apparatus 100 executes the duplication write transfer (S1053), returns an end response (S1054), and ends the processing. The duplication write transfer processing in step S1053 will be explained in detail later.

(Duplication Write Processing)

Figure 50:
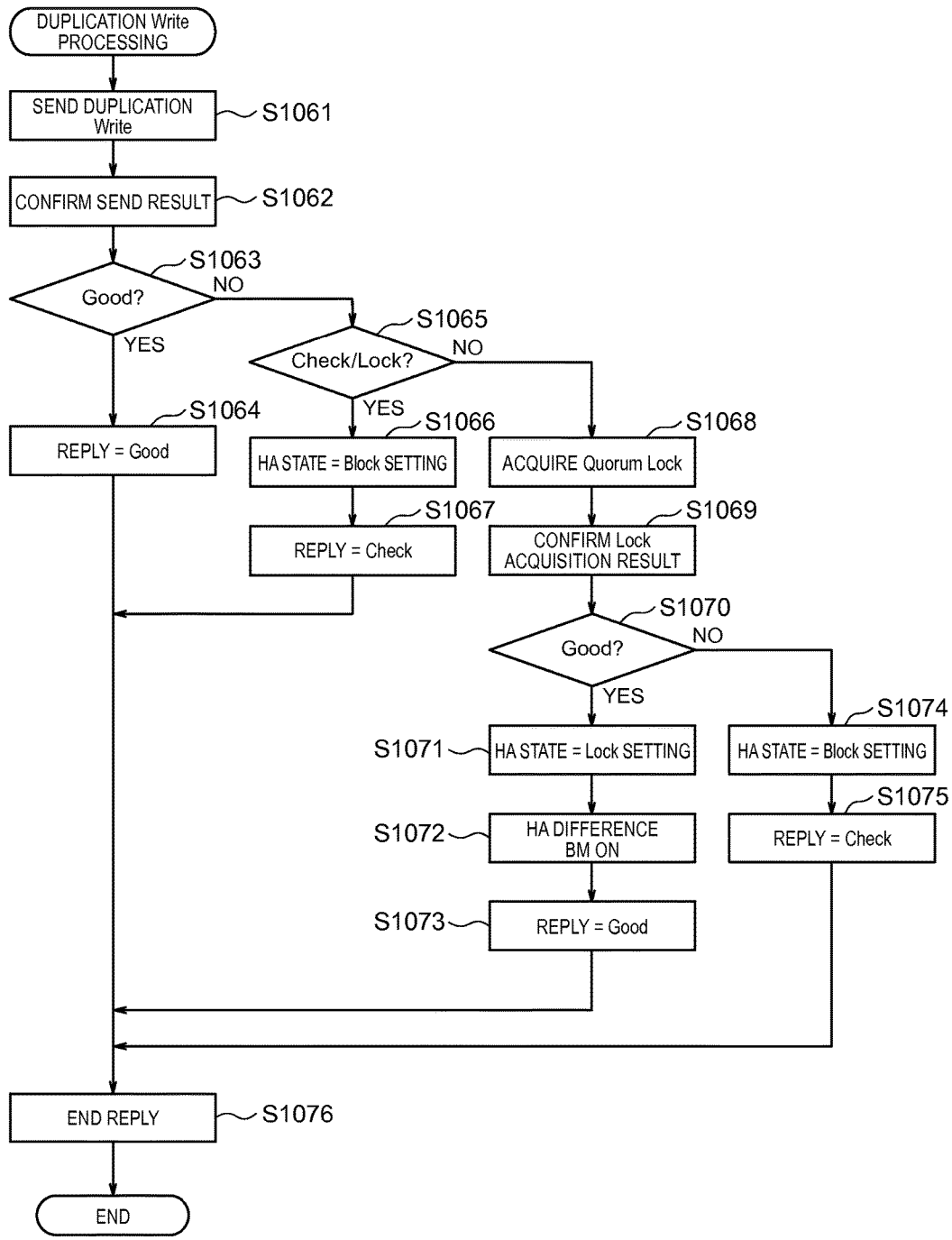
FIG. 50 is a flowchart showing the duplication write processing according to the first embodiment.

Details of the duplication write processing in step S1053 are now explained with reference to FIG. 50. As shown in FIG. 50, the first storage apparatus 100 sends write data to the second storage apparatus 150 for performing data duplication processing (S1061). Subsequently, the first storage apparatus 100 confirms the sending result (S1062).

Subsequently, the first storage apparatus 100 determines whether the sending result is Good (S1063) and, when the sending result is Good, sets Good in the response command (S1064), sends an end response (S1076), and ends the processing.

Meanwhile, in step S1063, when the sending result is not Good, the first storage apparatus 100 determines whether the sending result is a Check response and whether the HA secondary side has acquired the Lock (S1065). In step S1065, when the second storage apparatus 150 as the HA secondary side has acquired Lock, since the data of the HA secondary side will be the latest data and the data of the HA primary side will be the old data, the HA state is set to Block, and access to the old data of the HA primary side is guarded.

In step S1065, when it is determined that the sending result is a Check response and the HA secondary side has acquired Lock, the first storage apparatus 100 sets the HA state to Block (S1066), sets Check in the response command (S1076), sends an end response (S1076), and ends the processing.

Moreover, in step S1065, when it is determined that the sending result is a Check response and the HA secondary side has not acquired Lock, the first storage apparatus 100 acquires the Quorum Lock (S1068). When the sending result of the HA secondary side is not Good and the Lock acquisition has not been assigned to the Check response, since duplication write cannot be performed on the HA secondary side, it is necessary for the HA primary side to acquire the Lock and manage the difference data between the HA primary side and the HA secondary side.

The first storage apparatus 100 acquires the Quorum Lock in step S1068 and thereafter confirms the lock acquisition result (S1069), and determines whether the lock acquisition result is Good (S1070).

In step S1070, when the lock acquisition result is Good, the first storage apparatus 100 sets the Lock in the HA state (S1071), turns ON the difference bitmap of the HA configuration (S1072), sets Good in the response command (S1073), and sends an end response (S1076).

Meanwhile, in step S1070, when the lock acquisition result is not Good, the first storage apparatus 100 sets Block in the HA state (S1074), sets Check in the response command (S1074), sends an end response (S1075), and ends the processing.

(Slave-Side Write Processing)

Figure 51A:
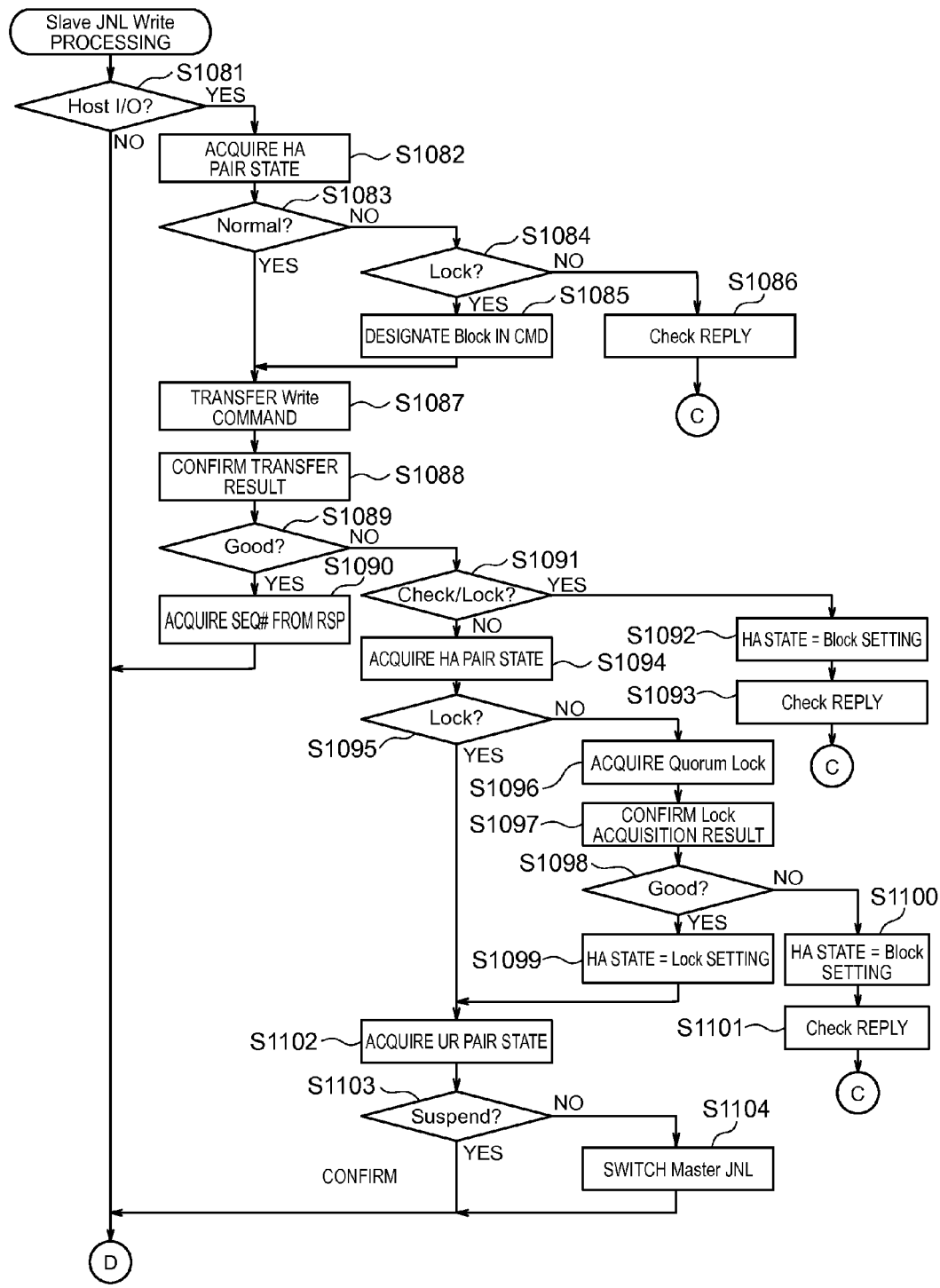
FIG. 51A is a flowchart showing the slave-side write processing according to the first embodiment.
Figure 51B:
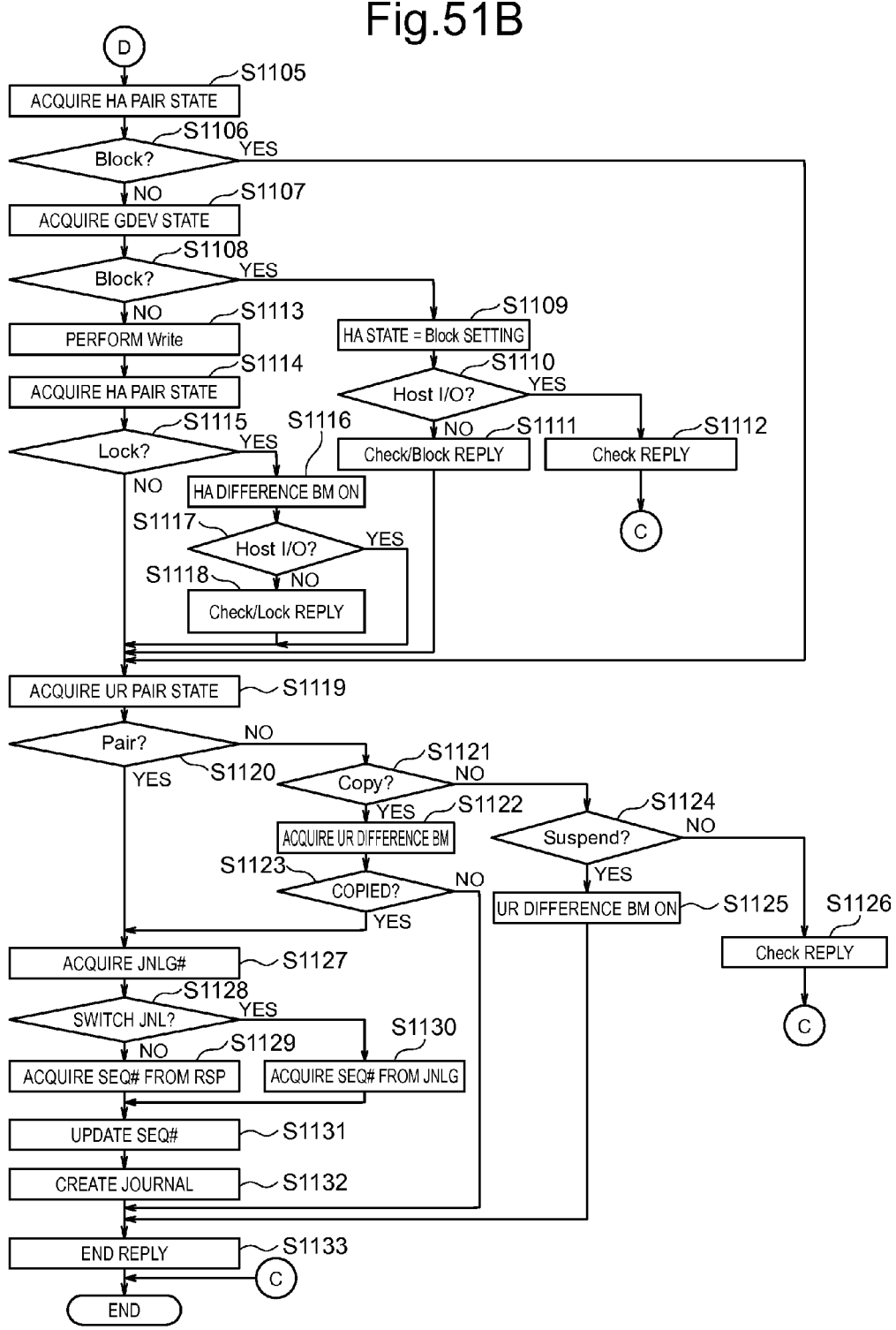
FIG. 51B is a flowchart showing the slave-side write processing according to the first embodiment.

The write processing of the second storage apparatus 150 in which the journal attribute is a slave is now explained with reference to FIG. 51A and FIG. 51B. Foremost, the second storage apparatus 150 determines whether it is an I/O from the host computer 30 (S1081). In step S1081, when it is determined that it is an I/O from the host computer 30, the second storage apparatus 150 acquires the pair state of the HA configuration (S1082), and determines whether the pair state is Normal (S1083). Meanwhile, in step S1083, when it is determined that it is not an I/O from the host computer 30, the second storage apparatus 150 executes the processing of step S1105 onward.

When the second storage apparatus 150 as the HA secondary side has acquired Lock, it is necessary to designate Block in the command and change the HA state of the HA primary side to Block. Moreover, when the second storage apparatus 150 has not acquired the Lock and the data of the HA primary side is the latest data and the data of the HA secondary side is the old data, access to the old data of the HA secondary side must be guarded.

In step S1083, when it is determined that the pair state of the HA configuration is Normal, the second storage apparatus 150 executes the processing of step S1087. Meanwhile, in step S1083, when it is determined that the pair state of the HA configuration is not Normal, the second storage apparatus 150 determines whether it has acquired the Lock (S1084).

In step S1084, when it is determined that it has acquired Lock, the second storage apparatus 150 designates Block in the command in order to change the HA state of the HA primary side to Block (S1085). Meanwhile, in step S1084, when it is determined that it has not acquired Lock, it sends a Check response (S1086), and ends the processing.

Subsequently, the second storage apparatus 150 transfers a write command to the first storage apparatus 100 (S1087). In this embodiment, as described above, the HA primary side is subject to the write processing first. Thus, even when a write request is received by the HA secondary side from the host computer 30, prior to writing data to the HA secondary side, data is transferred to the HA primary side and data is written to the HA primary side.

Subsequently, the second storage apparatus 150 confirms the transfer result (S1088), and determines whether the transfer result is Good (S1089). In step S1089, when it is determined that the transfer result is Good, the second storage apparatus 150 acquires a sequential number from the RSP (S1090). As described above, since the write processing is performed in the first storage apparatus 100 as the HA primary side and the sequential number is acquired, the HA secondary side receives, via the RSP, the sequential number acquired on the HA primary side.

In step S1089, when it is determined that the transfer result is not Good, the second storage apparatus 150 determines whether the transfer result is a Check response and whether the HA primary side has acquired the Lock (S1091). In step S1091, when it is determined that the transfer result is a Check response and the HA primary side has acquired Lock, the second storage apparatus 150 sets the HA state of the HA secondary side to Block (S1092), returns a Check response (S1093), and ends the processing.

In step S1091, when it is determined that the transfer result is a Check response and the HA primary side has acquired Lock, the pair state of the HA configuration is acquired (S1094), and whether the HA secondary side has acquired the Lock is determined (S1095). When the command transferred to the HA primary side becomes a Check response, since the writing processing to the HA primary side has ended in a failure, the HA secondary side acquires the Lock and continues the I/O processing.

In step S1095, when it is determined that the HA secondary side has acquired Lock, the second storage apparatus 150 executes the processing of step S1102 onward. Meanwhile, in step S1095, when it is determined that the HA secondary side has not acquired Lock, the second storage apparatus 150 acquires the Quorum Lock (S1096), and confirms the Lock acquisition result (S1097).

The second storage apparatus 150 determines whether the Lock acquisition result is Good (S1098) and, when the Lock acquisition result is Good, sets Lock to the HA state of the HA secondary side (S1099), and executes the processing of step S1102 onward. Meanwhile, in step S1098, when it is determined that the Lock acquisition result is not Good, Block is set to the HA state of the HA secondary side (S1100), a Check response is returned (S1101), and the processing is ended.

Subsequently, the second storage apparatus 150 acquires, in step S1102, the pair state of the RC configuration (S1102), and determines whether the pair state of the RC configuration is Suspend (S1103). Here, since the second storage apparatus 150 has not acquired the sequential number from the first storage apparatus 100 as the HA primary side, the journal attribute of the second storage apparatus 150 needs to be switched to a master in order to realize the pair state of the RC configuration and continue the I/O processing.

In step S1103, when it is determined that the pair state of the RC configuration is Suspend, the second storage apparatus 150 executes the processing of step S1105 onward. Meanwhile, in step S1103, when it is determined that the pair state of the RC configuration is not Suspend, the second storage apparatus 150 switches the journal attribute to a master (S1104).

Subsequently, in step S1105, the second storage apparatus 150 acquires the pair state of the HA configuration and determines whether the pair state of the HA configuration is Block (S1106). In step S1106, when it is determined that the pair state of the HA configuration is Block, the second storage apparatus 150 executes the processing of step S1119 onward.

Meanwhile, in step S1106, when it is determined that the pair state of the HA configuration is not Block, the second storage apparatus 150 acquires the GDEV state (S1107), and determines whether the access to the physical volumes of the access target is blocked (writing is not possible to due to a hardware failure or the like) (S1108).

In step S1108, when it is determined that access to the physical volumes of the access target has been blocked, the second storage apparatus 150 sets the pair state of the HA configuration to Block (S1109). Subsequently, the second storage apparatus 150 determines whether it is an I/O from the host computer 30 (S1110), returns a check response to the RSP when it is an I/O from the host computer 30 (S1112), and ends the processing.

Meanwhile, in step S1110, when it is determined that it is not an I/O from the host computer 30, the storage apparatus 100 sends a check response to the RSP and sends a response to the effect that the HA secondary side is in a Block state (S1111), and executes the processing of step S1119 onward. Based on the response of step S1111, the fact that the second storage apparatus 150 as the HA secondary side is in a Block state is notified to the first storage apparatus 100 as the HA primary side, and the first storage apparatus 100 is caused to acquire Lock of the quorum disk 105.

Moreover, in step S1108, when it is determined that access to the physical volumes of the access target is not blocked, the second storage apparatus 150 performs write processing to the second physical volume 151 as the write target (S1113). Subsequently, the pair state of the HA configuration is acquired (S1114), and whether the HA secondary side has acquired Lock is determined (S1115).

In step S1115, when it is determined that the HA secondary side has acquired Lock, the second storage apparatus 100 turns ON the difference bitmap in the HA configuration (S1116). Subsequently, the second storage apparatus 150 determines whether it is an I/O from the host computer 30 (S1117), and executes the processing of step S1119 onward when it is an I/O from the host computer 30, and returns a Lock response, together with the check response, to the RSP when it is not an I/O from the host computer 30 (S1118).

In step S1115, when the HA secondary side has acquired Lock; that is, when a failure has occurred in the HA primary side, the difference bitmap in the HA configuration is turned ON, and the difference data is copied after the HA primary side is recovered. It is thereby possible to recover the HA configuration after the failure of the HA primary side is recovered. Moreover, when the write processing is duplication write from the HA primary side, since the HA state of the HA primary side is changed to a Block state, a check response is sent to the RSP, and the Lock state of the HA secondary side is added to the disapproval information of the check response and notified to the HA primary side. It is thereby possible to change the HA state of the HA primary side to a Block state.

Subsequently, the second storage apparatus 100 acquires the pair state of the RC configuration (S1119), and determines whether the pair state of the second storage apparatus 150 and the fourth storage apparatus 250 is Pair (S1120).

In step S1120, when it is determined that the pair state is not Pair, the second storage apparatus 150 determines whether the pair state is Copy (S1121). In step S1121, when it is determined that the pair state is Copy, the second storage apparatus 150 acquires the difference bitmap in the RC configuration (S1122). Subsequently, the second storage apparatus 150 determines whether the data corresponding to the difference bitmap acquired in step S1122 has been copied (S1123), and executes the processing of step S1127 onward when the data has been copied, and executes the processing of step S1133 onward when the data has not been copied.

Meanwhile, in step S1121, when it is determined that the pair state is not Copy, the second storage apparatus 150 determines whether the pair state is Suspend (S1124). In step S1124, when it is determined that the pair state is Suspend, the second storage apparatus 150 turns ON the difference bitmap in the RC configuration (S1125). Meanwhile, in step S1124, when it is determined that the pair state is not Suspend, the second storage apparatus 150 returns a check response to the RSP (S1126), and ends the processing.

In step S1120, when it is determined that the copy state is Pair, the second storage apparatus 150 acquires the journal group number of the second physical volume 151 as the access target (S1127). Subsequently, the second storage apparatus 150 determines whether the switching of the journal attribute has occurred (S1128).

In step S1128, when it is determined that the journal attribute has occurred, the second storage apparatus 150 assigns the sequential number stored in the second journal volume 152 and creates journal data (S1130). Meanwhile, in step S1128, when it is determined that the switching of the journal attribute has not occurred, the second storage apparatus 150 acquires the sequential number from the RSP (S1129).

Subsequently, the second storage apparatus 150 updates the sequential number (S1131), creates a journal (S1132), returns an end response (S1133), and ends the processing.
(Master-Side Restoration Processing)

The restoration processing of the third storage apparatus 200, in which the SVOL-side (secondary side of RC configuration) journal attribute is a master, is now explained with reference to FIG. 52.

Figure 52:
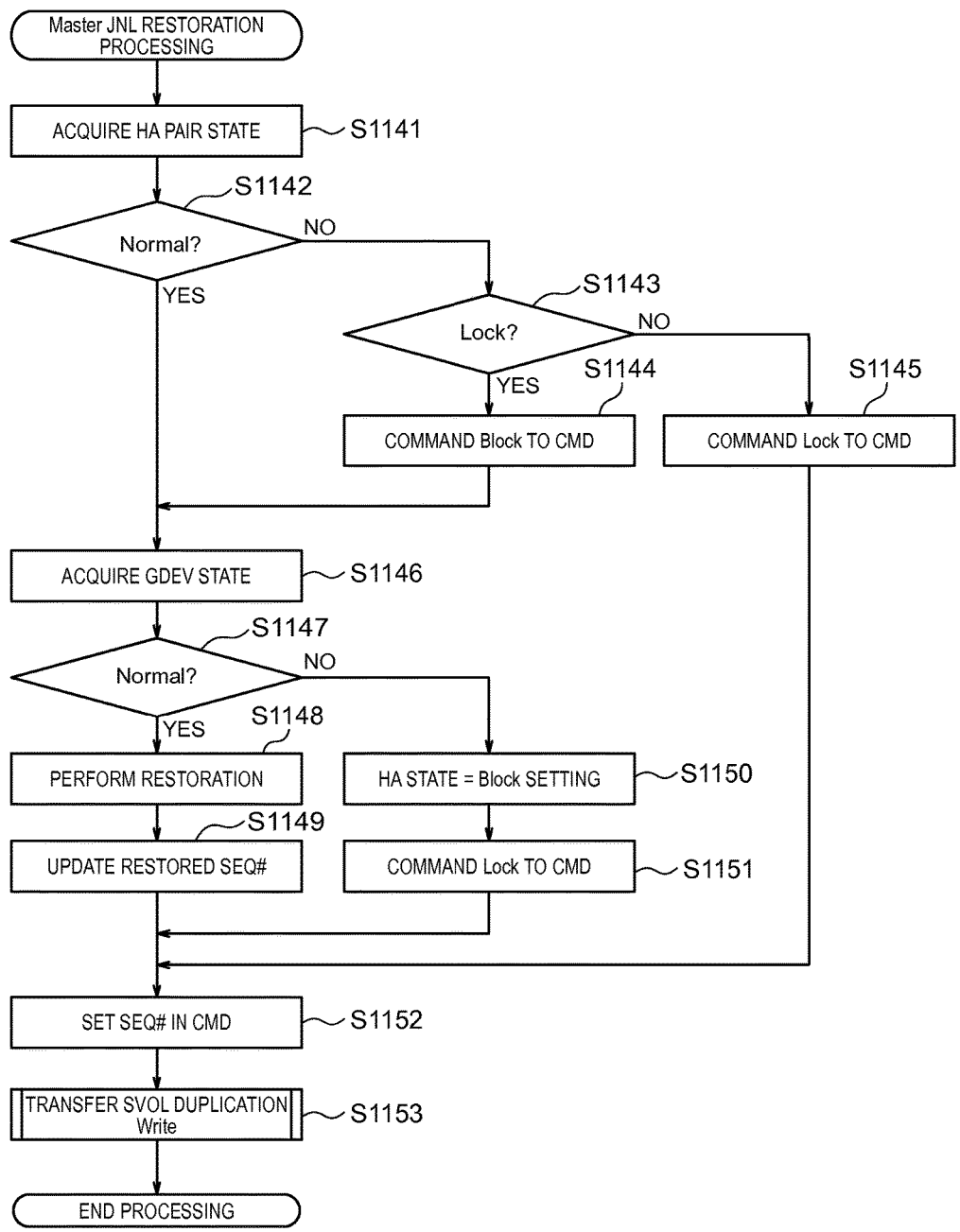
FIG. 52 is a flowchart showing the master-side restoration processing according to the first embodiment.

As shown in FIG. 52, foremost, the third storage apparatus 200 acquires the pair state of the HA configuration (S1141), and determines whether the pair state of the HA configuration is Normal (S1142). In step S1142, when it is determined that the pair state of the HA configuration is Normal, the processing of step S1146 onward is executed.

Meanwhile, in step S1142, when it is determined that the pair state of the HA configuration is Normal, the third storage apparatus 200 determines whether it has acquired Lock (S1143).

In step S1143, when it is determined that it has acquired Lock, the third storage apparatus 100 designates Block in the command by changing the HA state of the HA secondary side to Block (S1144). Meanwhile, in step S1143, when it is determined that it has not acquired Lock, the third storage apparatus 300 designates Lock in the command for causing the HA secondary side to acquire Lock (S1145).

Subsequently, in step S1146, the third storage apparatus 300 acquires the GDEV state (S1146), and determines whether the GDEV state is Normal (S1147).

In step S1147, when it is determined that the GDEV state is Normal, the third storage apparatus 200 performs restoration processing (S1148), and updates the restored sequential number (S1149).

Meanwhile, in step S1147, when it is determined that the GDEV state is not Normal, the third storage apparatus 200 designates Block in the HA state (S1150), and Lock is designated in the command for causing the fourth storage apparatus 250 as the HA secondary side to acquire Lock (S1151).

Subsequently, the third storage apparatus 200 sets the sequential number in the command, and transfers data for performing duplication write processing to the fourth storage apparatus 250 on the secondary side of the RC configuration (S1153), and ends the processing. The SVOL duplication write transfer processing in step S1153 will be explained in detail later.

In step S1153, when the HA state is Block and the GDEV state is Block; that is, since data is written to the HA secondary side even when the third storage apparatus 200 is blocked, write data for duplication is sent. Moreover, when the HA primary side has acquired Lock and writing to the HA secondary side is not possible; that is, even when the volumes of the slave-side HA secondary side are blocked, the sequential number is transferred to the HA secondary side. For example, subsequently, when the RDJNL path from the SVOL-side HA primary side on the secondary side to PVOL of the RC configuration is blocked, the HA secondary side can use the transferred sequential number to read the journal from the primary side (PVOL side) of the RC configuration and resume the restoration processing.

(SVOL-Side Duplication Write Transfer Processing)

The duplication write transfer processing of the third storage apparatus 200, which is the SVOL-side (secondary side of RC configuration) HA primary side, executed in foregoing step S1153 is now explained with reference to FIG. 53.

Figure 53:
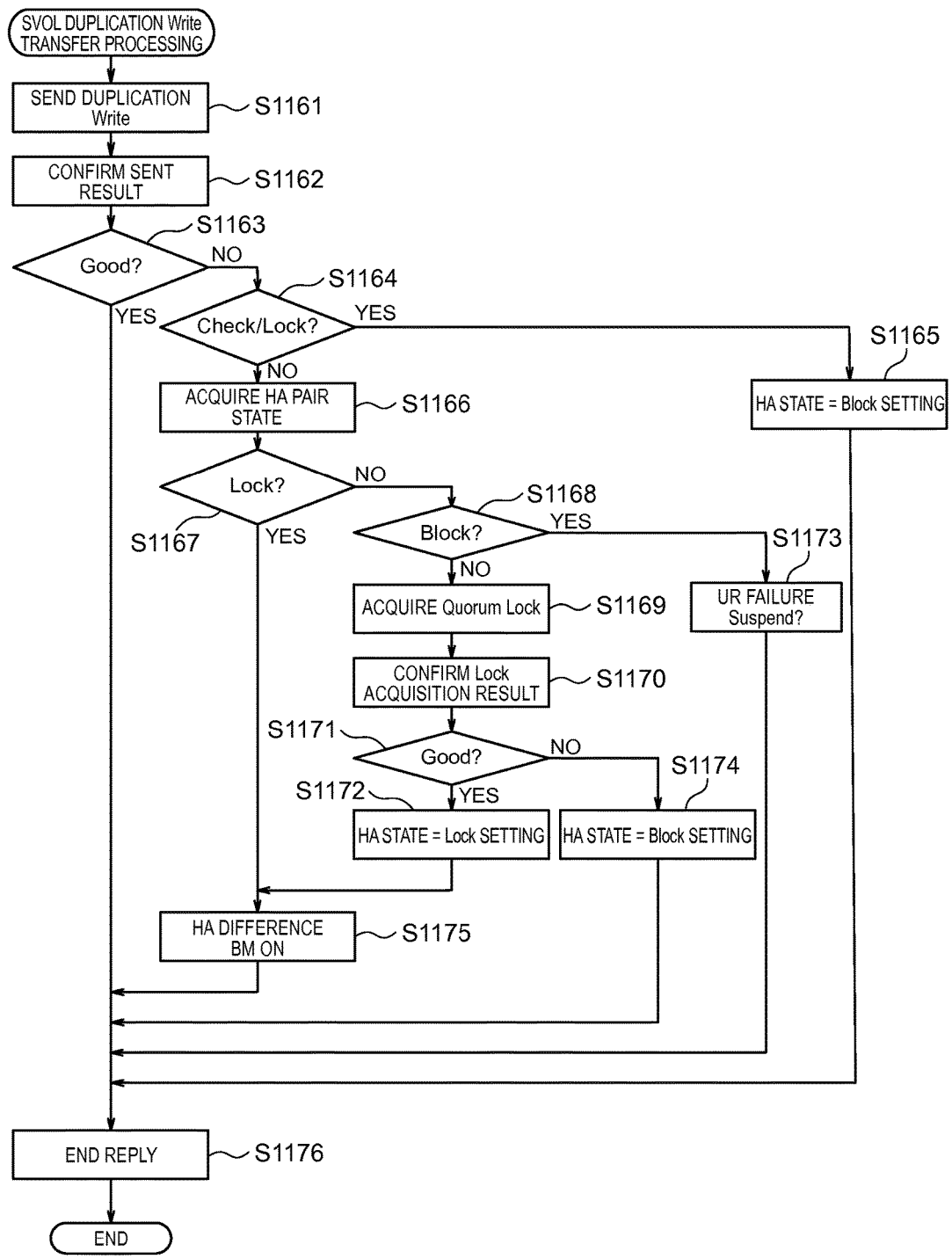
FIG. 53 is a flowchart showing the SVOL-side duplication write transfer processing according to the first embodiment.

As shown in FIG. 53, the third storage apparatus 200 sends, to the fourth storage apparatus 250, the write data for duplication (S1161). Subsequently, the third storage apparatus 200 confirms the sending result (S1162).

Subsequently, the third storage apparatus 200 determines whether the sending result is Good (S1163), and sends an end response when the sending result is Good (S1176). Meanwhile, in step S1163, when the sending result is not Good, the third storage apparatus 200 determines whether the transfer result is Check response and whether the HA secondary side has acquired Lock (S1164). In step S11164, when it is determined that the fourth storage apparatus 250 as the HA secondary side has acquired Lock, since the data of the HA secondary side will be the latest data and the data of the HA primary side will be the old data, the HA state is set to be a Block state, and access to the old data of the HA primary side is guarded.

In step S1164, when the sending result is a check response and the HA secondary side has acquired Lock, the third storage apparatus 200 sets the HA state to Block (S1165), sends an end response (S1176), and ends the processing.

Moreover, in step S1164, when it is determined that the sending result is a check response and the HA secondary side has not acquired Lock, the third storage apparatus 200 acquires the pair state of the HA configuration (S1166). Subsequently, the third storage apparatus 200 determines whether it can acquire Lock (S1167).

In step S1167, when it is determined that the third storage apparatus 200 has acquired Lock, the difference bitmap of the HA configuration is turned ON (S1175), an end response is sent (S1176), and the processing is ended.

Meanwhile, in step S1167, when it is determined that the third storage apparatus 200 has not acquired Lock, the third storage apparatus 200 determines whether the HA pair state is Block (S1168).

In step S1168, when it is determined that the pair state of the HA configuration is Block, the third storage apparatus 200 subjects the RC pair to failure Suspend since it is a state that writing cannot be performed to either the HA primary or the HA secondary on the secondary side of the RC configuration (S1173), sends an end response (S1176), and ends the processing.

Meanwhile, in step S1168, when it is determined that the pair state of the HA configuration is not Block, the third storage apparatus 200 acquires Quorum Lock of the second quorum disk 205 (S1169). Subsequently, the third storage apparatus 200 confirms the lock acquisition result (S1170), and determines whether the lock acquisition result is Good (S1171).

In step S1171, when the lock acquisition result is Good, the third storage apparatus 200 sets Lock to the HA state (S1172), turns ON the difference bitmap of the HA configuration (S1175), and sends an end response (S1176). Meanwhile, in step S1171, when the lock acquisition result is not Good, the third storage apparatus 200 sets Block to the HA state (S1174), turns ON the difference bitmap of the HA configuration (S1175), sends an end response (S1176), and ends the processing.

(SVOL-Side Duplication Write Reception Processing)

The duplication write reception processing of the fourth storage apparatus 250, which is the SVOL-side (secondary side of RC configuration) HA secondary side, is now explained with reference to FIG. 54.

Figure 54:
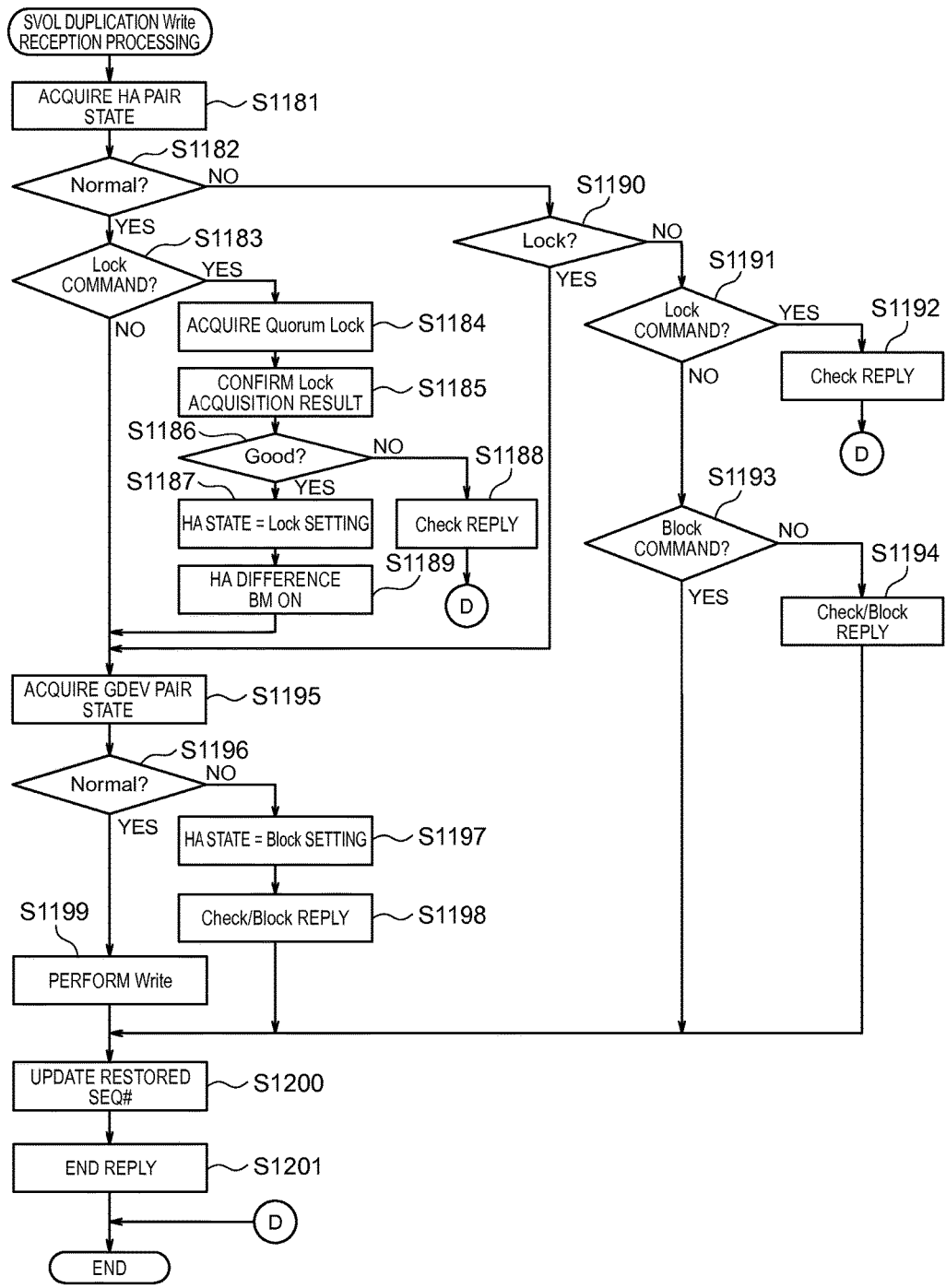
FIG. 54 is a flowchart showing the SVOL-side duplication write reception processing according to the first embodiment.

As shown in FIG. 54, the fourth storage apparatus 250 acquires the pair state of the HA configuration (S1181), and determines whether the pair state is Normal (S1182). In step S1182, when it is determined that the pair state is Normal, the fourth storage apparatus 250 determines that a Lock acquisition command has been sent to the fourth storage apparatus 250 as the HA secondary side (S1183). For example, when write processing cannot be performed on the HA primary side, the HA secondary side needs to acquire Lock since a Lock acquisition command was sent to the HA secondary side.

In step S1182, when it is determined that the pair state is not Normal, the fourth storage apparatus 250 determines whether it acquired Lock (S1190), and executes the processing of step S1195 onward when Lock has been acquired. Meanwhile, in step S1190, when it is determined that Lock has not been acquired, the fourth storage apparatus 250 determines whether a Lock acquisition command has been sent (S1191).

In step S1191, in a state where the pair state is not Normal, it has not acquired Lock, and a Lock acquisition command has been sent, write processing cannot be performed on either the HA primary side or the HA secondary side. In the foregoing case, a check response is returned to the HA primary side, and the RC pair is subject to failure Suspend on the HA primary side.

In step S1191, when it is determined that a Lock acquisition command has been sent, the fourth storage apparatus 250 returns a check response to the HA primary side (S1192), and ends the processing. Meanwhile, in step S1191, when it is determined that a Lock acquisition command has not been sent, the fourth storage apparatus 250 determines whether a Block command has been sent (S1193).

In step S1193, when it is determined that the Block command has been sent, since this is a state in which the HA primary side has acquired Lock, the fourth storage apparatus 250 updates the restored sequential number (S1200). Meanwhile, in step S1193, when it is determined that the Block command has not been issued, Block is set in the check response (S1194), and performs the processing of S1200 onward. When neither the Lock acquisition command nor the Block command has been sent from the HA primary side, since the HA primary side has not acquired Lock, it is necessary to cause the HA primary side to acquire Lock.

In step S1183, when a Lock acquisition command has been sent, the fourth storage apparatus 250 acquires Quorum Lock of the second quorum disk 205 (S1184), and confirms the Lock acquisition result (S1185).

The fourth storage apparatus 250 determines whether the Lock acquisition result is Good (S1186), and sets Lock to the HA state of the HA secondary side when the Lock acquisition result is Good (S1187). Subsequently, the fourth storage apparatus 250 turns ON the difference bitmap of the HA configuration (S1189), and executes the processing of step S1195 onward. Meanwhile, in step S109, when it is determined that the Lock acquisition result is not Good, a Check response is returned (S1188), and the processing is ended.

In step S1183, when a Lock acquisition command has not been sent, the processing of step S1195 onward is executed.

In step S1195, the fourth storage apparatus 250 acquires the GDEV pair state and determines whether the GDEV pair state is Normal (S1196). In step S1196, when it is determined that the GDEV pair state is Normal, the fourth storage apparatus 250 performs write processing to the fourth physical volume 251 as the write target (S1199).

Meanwhile, in step S1196, when it is determined that the GDEV pair state is not Normal, the fourth storage apparatus 250 sets the HA pair state to Block, returns a check response (S1198), and performs the processing of S1200 onward.

Subsequently, in step S1200, the fourth storage apparatus 250 updates the restored sequential number, sends an end response (1201), and ends the processing.

(SVOL-Side Purge Processing)

The SVOL-side (secondary side of RC configuration) purge processing is now explained with reference to FIG. 55.

Figure 55:
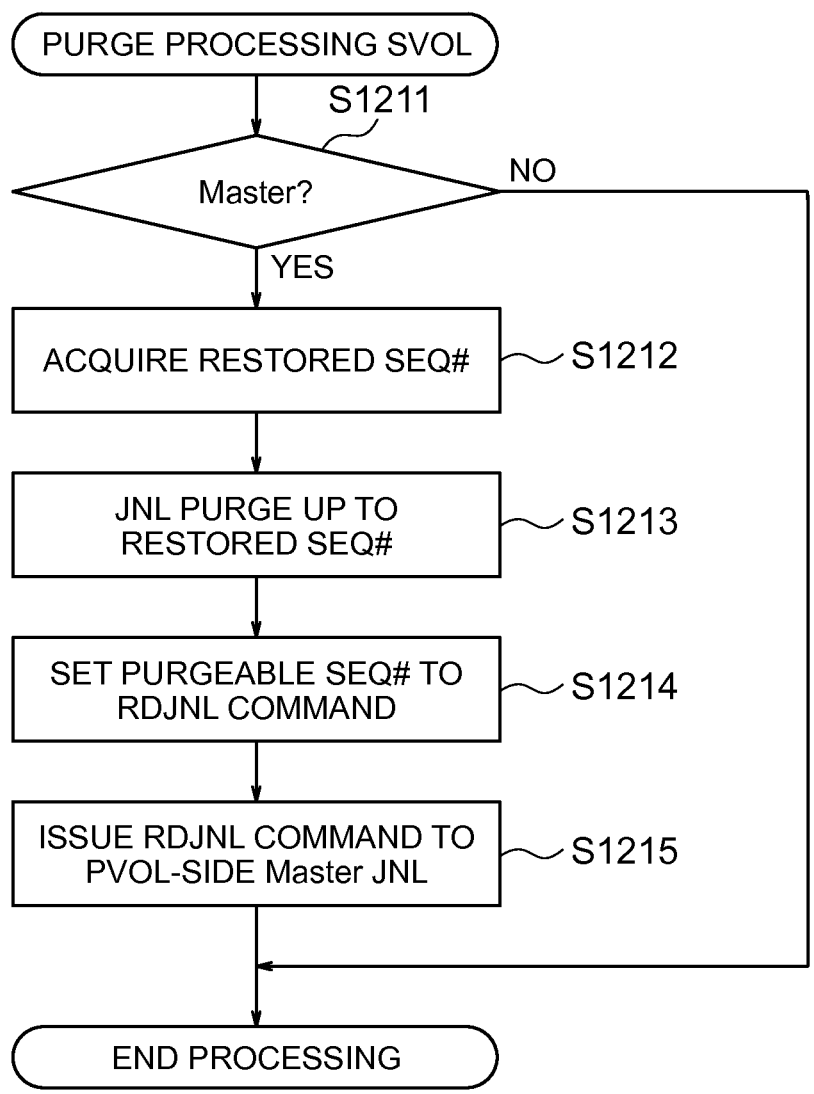
FIG. 55 is a flowchart showing the SVOL-side purge processing according to the first embodiment.

As shown in FIG. 55, whether its own journal attribute is a master is determined (S1211). In step S1211, when it is determined that the journal attribute is not a master, the third storage apparatus 200 ends the processing. In the ensuing explanation, the third storage apparatus 200 is explained as the SVOL-side master.

In step S1211, when it is determined that the journal attribute is a master, the third storage apparatus 200 acquires the restored sequential number (S1212). Subsequently, the third storage apparatus 200 purges the journals up to the restored sequential number (S1213).

Subsequently, the third storage apparatus 200 sets the purge able sequential number in the RDJNL command (S1241). Subsequently, the third storage apparatus 200 issues the RDJNL command to the first storage apparatus 100 in which the PVOL-side journal attribute is a master (S1215).

(PVOL-Side Master Purge Processing)

Figure 56:
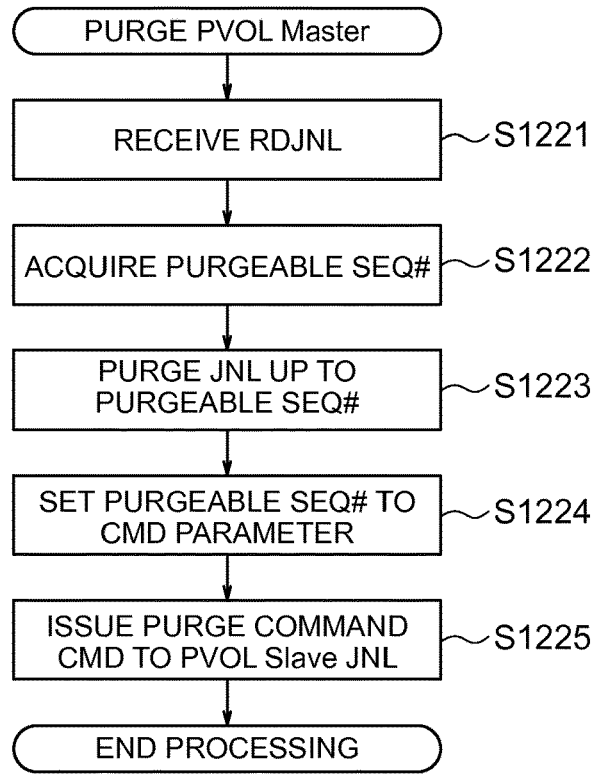
FIG. 56 is a flowchart showing the PVOL-side master purge processing according to the first embodiment.

The purge processing in which the PVOL-side (primary side of RC configuration) journal attribute is a master is now explained with reference to FIG. 56. In the ensuing explanation, the apparatus in which the PVOL-side (primary side of RC configuration) journal attribute is a master is explained as the first storage apparatus 100.

The first storage apparatus 100 receives the RDJNL command (S1221), and acquires the purge able sequential number (SEQ#) (S1222). Subsequently, the journals up to the purge able sequential number are purged (S1223).

Subsequently, the purge able sequential number is set to the command parameter (S1224), a purge command is issued to the second storage apparatus 150 in which the PVOL-side journal attribute is a slave (S1225).

(PVOL-Side Slave Purge Processing)

Figure 57:
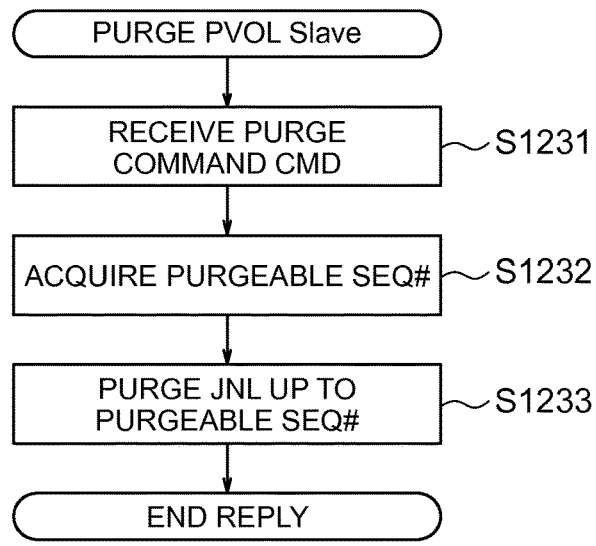
FIG. 57 is a flowchart showing the PVOL-side slave purge processing according to the first embodiment.

The purge processing in which the PVOL-side (primary side of RC configuration) journal attribute is a slave is now explained with reference to FIG. 57. In the ensuing explanation, the apparatus in which the PVOL-side (primary side of RC configuration) journal attribute is a master is explained as the second storage apparatus 150.

The second storage apparatus 150 receives a purge command from the first storage apparatus 100 (S1231). Subsequently, the second storage apparatus 150 acquires the purge able sequential number (S1232), and purges the journals up to the purge able sequential number (S1233).

(1-9-2) Details of Storage System Operation During Failure

Details of the operation of the storage system during a failure are now explained with reference to FIG. 58 to FIG. 64.

(Journal Attribute Switching Part 1 Based on PVOL-Side Master Failure)

Figure 58:
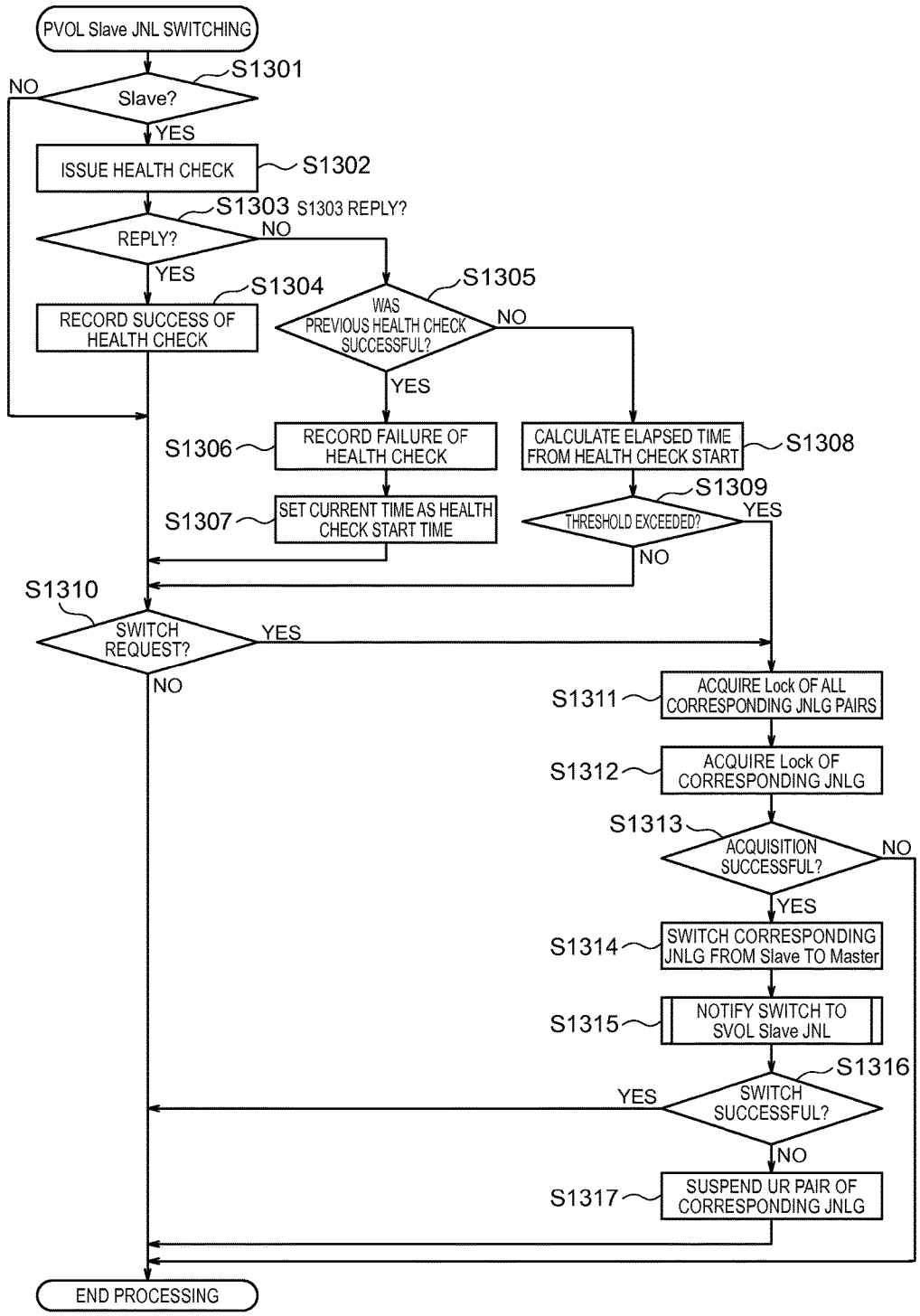
FIG. 58 is a flowchart showing the journal attribute switch processing based on a PVOL-side master failure according to the first embodiment.

Foremost, the journal attribute switch processing based on a failure of the PVOL-side (primary side of RC configuration) master is now explained with reference to FIG. 58. In the ensuing explanation, the apparatus in which the PVOL-side (primary side of RC configuration) journal attribute is a master is explained as the first storage apparatus 100, the apparatus in which the journal attribute is a slave is explained as the second storage apparatus 150, and the second storage apparatus 150 switches the journal attribute from a slave to a master.

Foremost, the second storage apparatus 150 determines whether the journal attribute is a slave (S1301), and issues a health check when the journal attribute is a slave (S1302). The second storage apparatus 150 detects, based on a health check, a failure of the first storage apparatus 100 in which the journal attribute is a master.

Subsequently, the second storage apparatus 150 determines whether there was a response to the health check issued in step S1302 (S1303). In step S1303, when there is a response to the health check, the second storage apparatus 150 records that the health check was successful (S1304).

Meanwhile, in step S1303, when there was no response to the health check, the second storage apparatus 150 determines whether the previous health check was successful (S1305). In step S1305, when it is determined that the previous health check was successful, a failure of the health check is recorded (S1306). Subsequently, the second storage apparatus 150 sets the current time as the health check start time (S1307), and executes the processing of step S1310 onward.

Meanwhile, in step S1305, when it is determined that the previous health check was not successful, the second storage apparatus 150 calculates the elapsed time from the start of the health check (S1308). Subsequently, the second storage apparatus 150 determines whether the elapsed time calculated in step S1308 has elapsed the predetermined threshold (S1309).

In step S1309, when it is determined that the calculated elapsed time has elapsed the predetermined threshold, the second storage apparatus 150 executes the processing of step S1311 onward. Meanwhile, in step S1309, when it is determined that the calculated elapsed time has not elapsed the predetermined threshold, the second storage apparatus 150 executes the processing of step S1310 onward.

In step S1310, the second storage apparatus 150 determines whether a journal attribute switching request has been sent (S1310). The switching request in step S1310 is not related to the switching that is performed based on the foregoing health check, and is related to the switching of the journal attribute that is performed when the journal volume 102 of the first storage apparatus 100, in which the journal attribute is a master, is blocked.

In step S1310, when it is determined that a switching request has been sent, the second storage apparatus 150 executes the processing of step S1311 onward. Meanwhile, in step S1310, when it is determined that a switching request has not been sent, the second storage apparatus 150 ends the processing.

In step S1311, the second storage apparatus 150 acquires, in the first quorum disk 105, Lock of all pairs of the journal group belonging to the apparatus (S1311), and additionally acquires Lock of that journal group (S1312).

Subsequently, the second storage apparatus 150 determines that the acquisition of Lock was successful in step S1311 and step S1312 (S1313). In step S1313, when it is determined that the acquisition of Lock was successful, the second storage apparatus 150 switches the journal attribute from a slave to a master (S1314). Subsequently, the second storage apparatus 150 notifies the SVOL side of the switching of the journal attribute from a slave to a master (S1315).

Meanwhile, in step S1313, when it is determined that the Lock acquisition ended in a failure, the second storage apparatus 150 ends the processing.

Subsequently, the second storage apparatus 150 determines whether the switching of the SVOL-side journal attribute was successful (S1316). In step S1316, when it is determined that was switching of the SVOL-side journal attribute was successful, the second storage apparatus 150 ends the processing. Meanwhile, in step S1316, when it is determined that the switching of the SVOL-side journal attribute ended in a failure, the second storage apparatus 150 suspends the RC pair state of the journal attribute (S1317).

(Journal Attribute Switching Part 2 Based on PVOL-Side Master Failure)

The switch processing of the SVOL-side journal attribute in foregoing step S1315 is now explained with reference to FIG. 59. In the ensuing explanation, the apparatus in which the SVOL-side (secondary side of RC configuration) journal attribute is a master is explained as the third storage apparatus 200, and the apparatus in which the journal attribute is a slave is explained as the fourth storage apparatus 250, and the fourth storage apparatus 250 switches the journal attribute from a slave to a master.

The fourth storage apparatus 250 notifies the switching of the journal attribute from a master to a slave to the third storage apparatus 200 in which the SVOL-side (secondary side of RC configuration) journal attribute is a master (S1321).

When the fourth storage apparatus 250 receives a journal attribute switching notice from the second storage apparatus 150 in foregoing step S1315, it is necessary to switch the master-side journal attribute before switching its own journal attribute from a slave to a master.

The fourth storage apparatus 250 determines whether the switching of the master-side journal attribute was successful (S1322).

In step S1322, when it is determined that the switching of the master-side journal attribute is successful, the fourth storage apparatus 250 acquires the restorable sequential number from the third storage apparatus (S1323), and stores the restorable sequential number (S1324). Subsequently, 1 is added to the restorable sequential number and used as the restoration start sequential number (S1325), and the processing of step S1334 onward is executed.

Note that, if the fourth storage apparatus 250 is communicable with the third storage apparatus 200, the third storage apparatus 200 is caused to perform restoration processing up to the sequential number that is restorable in the third storage apparatus 200. Subsequently, the fourth storage apparatus 250 adds 1 to the restorable sequential number, issues the RDJNL command and starts the restoration processing.

Meanwhile, in step S1322, when it is determined that the switching of the master-side journal attribute ended in a failure, the fourth storage apparatus 250 determines whether it is a switching command based on a failure of the first storage apparatus 100 in which the PVOL-side (primary side of RC configuration) journal attribute is a master (S1326). In step S1326, when it is determined that it is a switching command based on a failure of the first storage apparatus 100, the fourth storage apparatus 250 sends a response of switching failure to the PVOL side (S1327).

Meanwhile, in step S1326, when it is determined that it is not a switching command based on a failure of the first storage apparatus 100, the fourth storage apparatus 250 acquires the restored sequential number (S1328). Subsequently, the fourth storage apparatus 250 adds 1 to the restored sequential number (S1329).

In step S1326, when it is determined that it is not a switching command based on a failure of the first storage apparatus 100, a case where a failure occurred in the third storage apparatus 200, which is the SVOL-side master, and communication with the SVOL-side master ends in a failure can also be assumed. In the foregoing case, the restored sequential number stored in the fourth journal volume 252 of the fourth storage apparatus 250, which is the SVOL-side slave, 1 is added to that number, the RDJNL command is issued and the restoration processing is started.

Subsequently, the fourth storage apparatus 250 acquires, in the second quorum disk 205, Lock of all pairs of the journal group belonging to that apparatus (S1330), and acquires Lock of that journal group (S1331).

Subsequently, the fourth storage apparatus 250 determines whether the Lock acquisition in step S1330 and step S1331 was successful (S1332). In step S1332, when it is determined that the Lock acquisition ended in a failure, the fourth storage apparatus 250 sends a response of switching failure to the PVOL side (S1333).

Meanwhile, in step S1332, when it is determined that the Lock acquisition was successful, the fourth storage apparatus 250 determines whether it is a switching command based on a failure of the first storage apparatus 100 in which the PVOL-side (primary side of RC configuration) journal attribute is a master (S1334).

As patterns for switching the SVOL-side journal attribute from a slave to a master, considered may be the two patterns of switching based on a PVOL-side master failure and switching based on an SVOL-side master failure. In the case of a PVOL-side master failure, it is necessary to cause the SVOL-side master to restore the data for which the RDJNL command was issued by the SVOL-side master. Thus, a master transient state is set from a slave state, restoration of the data for which the RDJNL command was issued is awaited. Moreover, in the case of a SVOL-side master failure, a slave is switched to a master without going through a transient state.

In step S1334, when it is determined that it is a switching command based on the failure of the first storage apparatus 100, the fourth storage apparatus 250 switches the journal attribute from a slave to a master transient state (S1335). Meanwhile, in step S1334, when it is determined that it is not a switching command based on the failure of the first storage apparatus 100, the fourth storage apparatus 250 switches the journal attribute from a slave to a master (S1336).

Subsequently, the fourth storage apparatus 250 starts the issue of the RDJNL command from the restoration start sequential number (S1337), and the processing is ended.

(Journal Attribute Switching Part 3 Based on PVOL-Side Master Failure)

The switch processing of switching the journal attribute from a master transient state to a master in the fourth storage apparatus 250, in which the SVOL-side (secondary side of RC configuration) journal attribute is a slave, is now explained with reference to FIG. 60.

Figure 60:
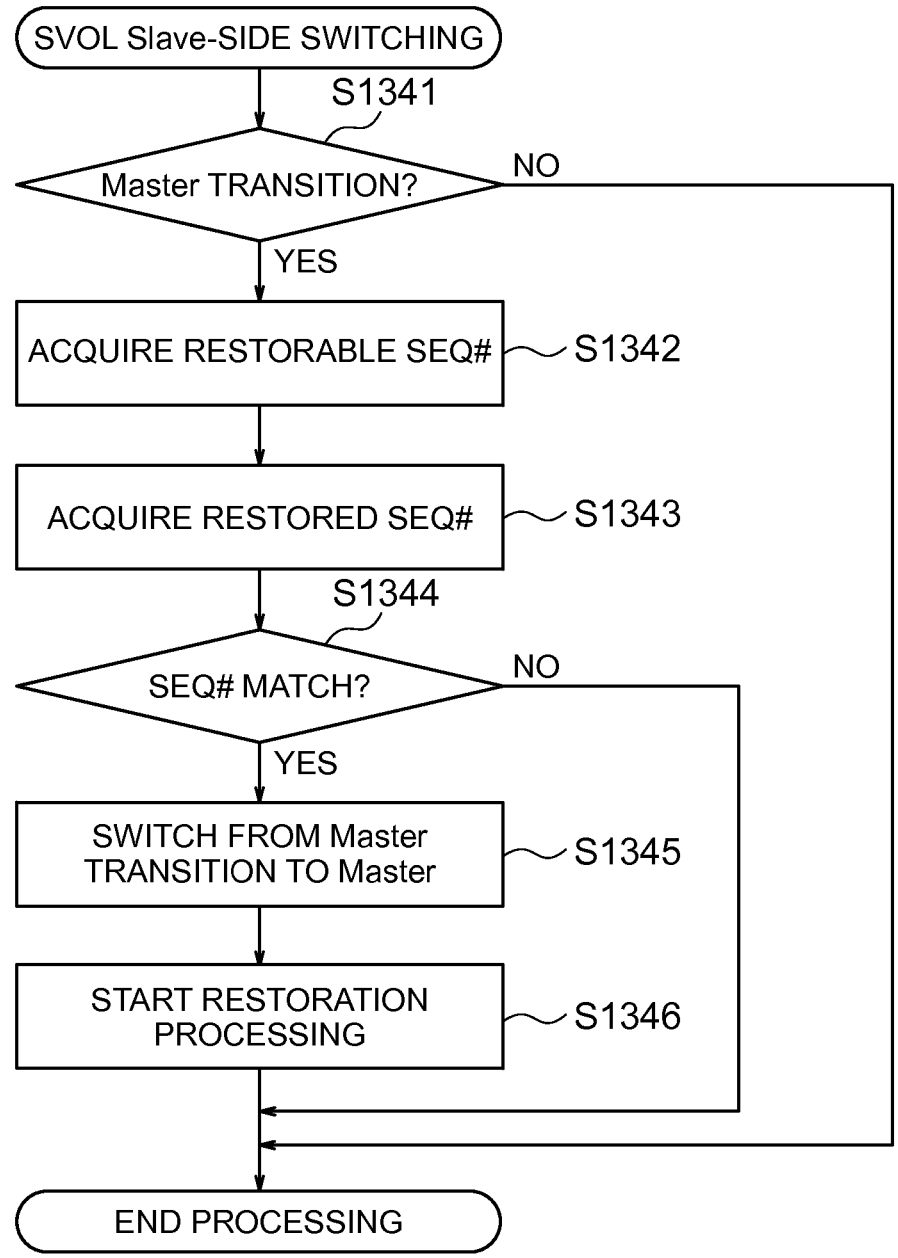
FIG. 60 is a flowchart showing the journal attribute switching based on a PVOL-side master failure according to the first embodiment.

As shown in FIG. 60, the fourth storage apparatus 250 determines whether the journal attribute is a master transient state (S1341), and, when the journal attribute is not in a master transient state, the fourth storage apparatus 250 ends the processing.

In step S1341, when it is determined that the journal attribute is a master transient state, the fourth storage apparatus 250 acquires the restorable sequential number (S1342), and acquires the restored sequential number (S1343).

The SVOL-side slave is once set to a master transient state upon switching the journal attribute from a slave to a master, and acquires the restored sequential number from the master side. Subsequently, through comparison with the previously notified restorable sequential number, it is possible to comprehend the remaining data of the restoration processing on the master side, and monitor the restoration state.

Subsequently, the fourth storage apparatus 250 determines whether the sequential numbers acquired in step S1342 and step S1343 coincide (S1344). In step S1344, when it is determined that the sequential numbers coincide, the fourth storage apparatus 250 switches the journal attribute from a master transient state to a master (S1345), and starts the restoration processing (S1346).

The fourth storage apparatus 250 as the SVOL-side slave determines that the restoration processing of the remaining data in the SVOL-side master is complete as a result of the restorable sequential number and the restored sequential number coinciding in step S1344, defines the journal attribute from a master transient state to a master state, and starts the restoration processing.

Meanwhile, in step S1344, when it is determined that the sequential numbers do not coincide, the fourth storage apparatus 250 ends the processing.

(Journal Attribute Switching Part 4 Based on PVOL-Side Master Failure)

The switch processing of switching the journal attribute from a master to a slave in the third storage apparatus 200, in which the SVOL-side (secondary side of RC configuration) journal attribute is a master, is now explained with reference to FIG. 61.

Figure 61:
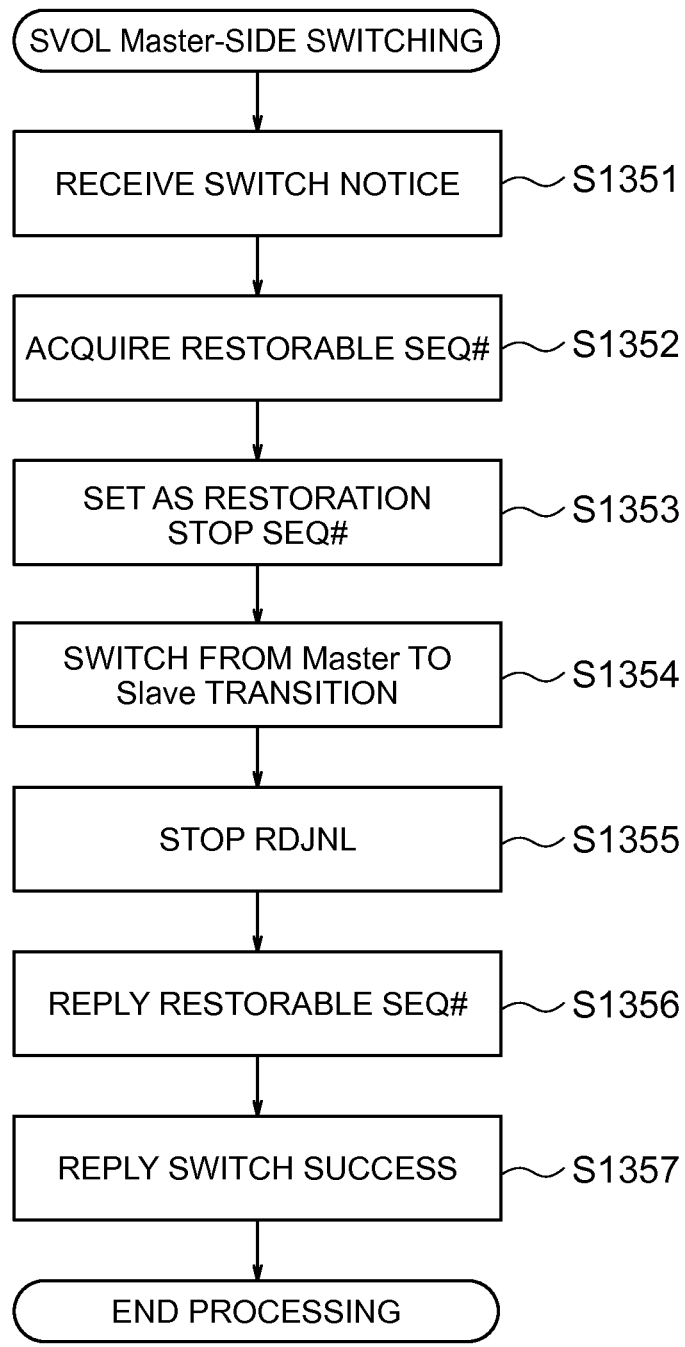
FIG. 61 is a flowchart showing the journal attribute switching based on a PVOL-side master failure according to the first embodiment.

As shown in FIG. 61, the third storage apparatus 200 receives the switching notice of the journal attribute (S1351).

The third storage apparatus 200 acquires the restorable sequential number (S1352), and sets the sequential number as the restoration stop sequential number (S1353).

Subsequently, the third storage apparatus 200 switches the journal attribute from a master to a slave (S1354), and stops the issue of the RDJNL command (S1355).

Subsequently, the third storage apparatus 200 responds to the restorable sequential number (S1356), and responds that the switching of the journal attribute was successful (S1357).

When the SVOL-side journal attribute is switched from a master to a slave, the RDJNL command is stopped. However, data in which the RDJNL command has already been issued exists as data that has not yet been subject to restoration processing. The restorable sequential number is the number that is assigned to this data. Thus, data that has not been subject to restoration processing is restored, and then switched from a master to a slave. Accordingly, the state in which the issue of the RDJNL command is stopped and the remaining data is restored is the slave transient state.

Moreover, as described above, the SVOL-side slave is notified of the restorable sequential number from the master, and monitors the completion of restoration up to the restorable sequential number on the SVOL master side. Subsequently, when the SVOL-side slave completes the restoration up to the restorable sequential number, it adds 1 to the previously notified restorable sequential number, and resumes the restoration processing.

(Journal Attribute Switching Part 5 Based on PVOL-Side Master Failure)

The switch processing of switching the journal attribute from the slave transient state to the slave state in the third storage apparatus 200, in which the SVOL-side (secondary side of RC configuration) journal attribute is a master, is now explained with reference to FIG. 62.

The third storage apparatus 200 determines whether the journal attribute is a slave transient state (S1361). In step S1361, when the journal attribute is not a slave transient state; that is, when it is determined that it is a normal state, the third storage apparatus 200 performs restoration processing (S1369), updates the restored sequential number (S1370), and ends the processing.

Meanwhile, in step S1361, when it is determined that the journal attribute is a slave transient state, the third storage apparatus 200 acquires the restored sequential number (S1362), and acquires the restoration stop sequential number (S1363).

Subsequently, the third storage apparatus 200 determines whether the sequential number acquired in step S1362 and the sequential number acquired in step S1363 coincide (S1364).

As described above, when the journal attribute is a slave transient state, the remaining data is restored in the order of the sequential numbers, the restoration processing is stopped at the point in time that the restoration up to the restoration stop sequential number is complete, and defines the journal attribute from a slave transient state to a slave. Moreover, the original slave side, which was the slave side before switching, completes the restoration of the remaining data on the original master side, and, at the point in time that the restoration is stopped, adds 1 to the acquired sequential number, and resumes the restoration processing.

In step S1364, when it is determined that the sequential numbers coincide, the third storage apparatus 200 switches the journal attribute from a slave transient state to a slave (S1365), the restoration processing is stopped (S1366), and the processing is ended.

Meanwhile, in step S1364, when it is determined that the sequential numbers do not coincide, the third storage apparatus 200 performs restoration processing of the remaining data (S1367), updates the restored sequential number (S1368), and ends the processing.

(Journal Attribute Switching Part 1 Based on SVOL-Side Master Failure)

Figure 63:
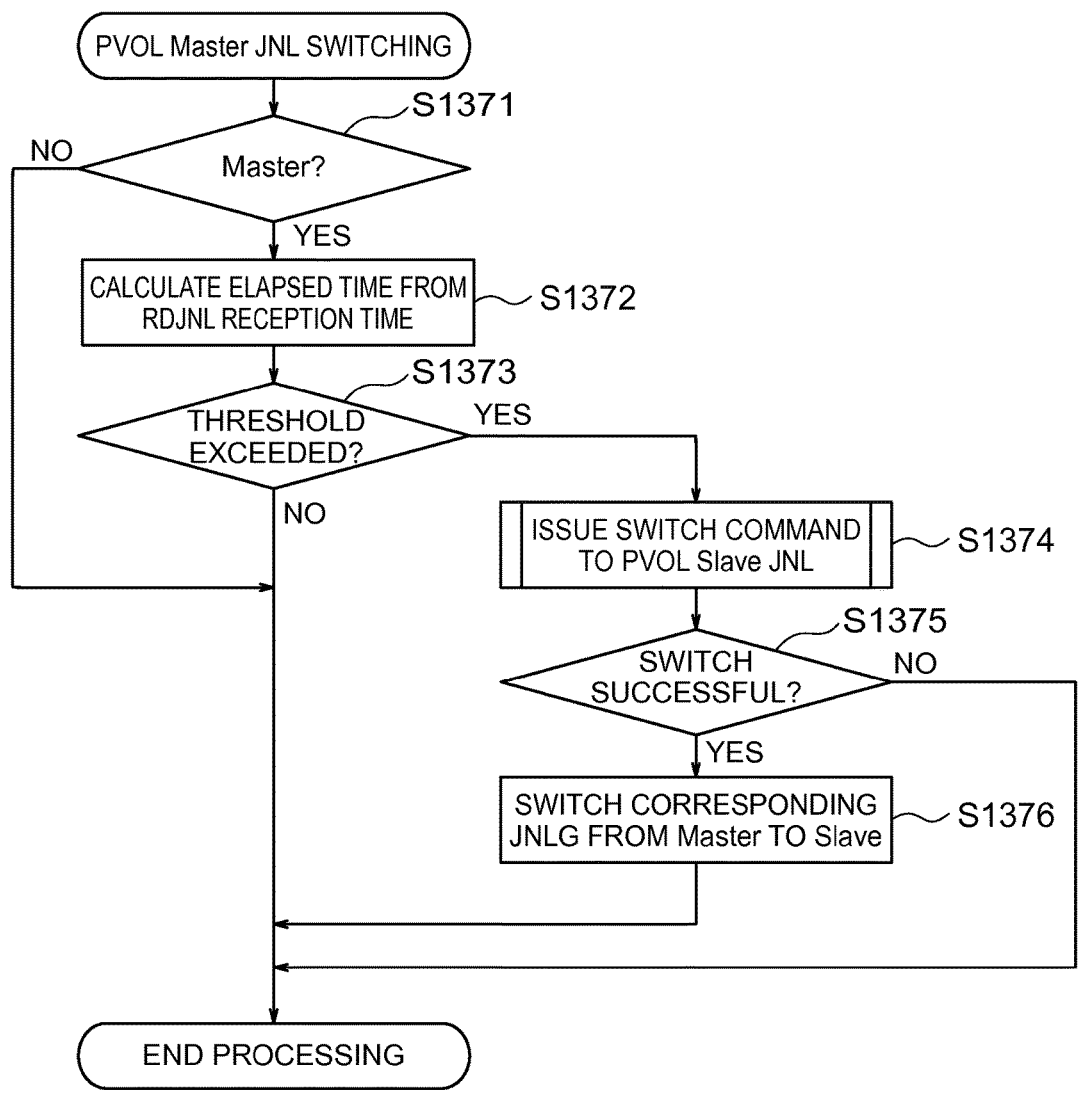
FIG. 63 is a flowchart showing the journal attribute switching based on an SVOL-side master failure according to the first embodiment.

The journal attribute switch processing based on a failure in the SVOL-side (secondary side of RC configuration) master is now explained with reference to FIG. 63.

In the ensuing explanation, explained is a case of referring to an apparatus in which the PVOL-side (primary side of RC configuration) journal attribute is a master as the first storage apparatus 100, the apparatus in which the journal attribute is a slave as the second storage apparatus 150, and switching the journal attribute of the first storage apparatus 100 from a master to a slave.

Foremost, the first storage apparatus 100 determines whether the journal attribute is a master (S1371). In step S1371, when the journal attribute is not a master, the first storage apparatus 100 ends the processing.

Meanwhile, in step S1371, when it is determined that the journal attribute is a master, the first storage apparatus 100 calculates the elapsed time from the RDJNL command reception time (S1372), and determines whether the elapsed time has elapsed the threshold (S1373).

In step S1373, when it is determined that the elapsed time has not exceeded the threshold, the first storage apparatus 100 ends the processing.

Meanwhile, in step S1373, when it is determined that the elapsed time has exceeded the threshold, the first storage apparatus 100 commands the second storage apparatus 150, which is the PVOL-side slave, to switch the journal attribute (S1374).

Subsequently, the first storage apparatus 1374 determines whether the switching of the slave-side journal attribute was successful (S1375). In step S1375, when it is determined that the switching of the slave-side journal attribute was successful, the first storage apparatus 100 switches its own journal attribute from a master to a slave (S1376). Meanwhile, in step S1375, when it is determined that the switching of the slave-side journal attribute ended in a failure, the first storage apparatus 100 ends the processing.

(Journal Attribute Switching Part 2 Based on SVOL-Side Master Failure)

The processing of commanding the second storage apparatus 150, which is the PVOL-side slave, to switch the journal attribute to be executed in foregoing step S1373 is now explained with reference to FIG. 64.

Figure 64:
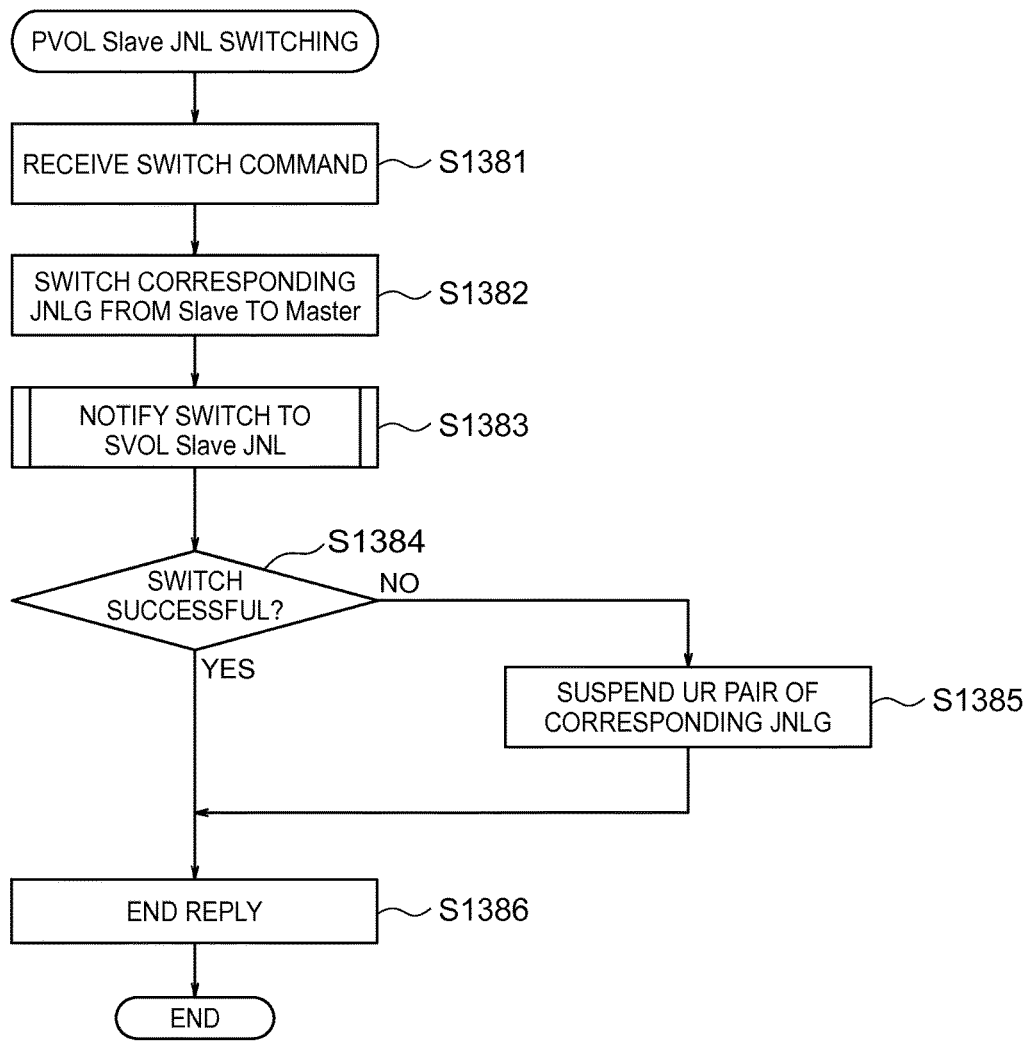
FIG. 64 is a flowchart showing the journal attribute switching based on an SVOL-side master failure according to the first embodiment.

As shown in FIG. 64, the second storage apparatus 150 receives the switching notice of the journal attribute (S1381). The second storage apparatus 150 switches the journal attribute from a slave to a master (S1382).

Subsequently, switching of the journal attribute is notified to the SVOL-side slave (S1383).

Subsequently, in step S1383, whether the switching of the journal attribute of the SVOL-side slave has succeeded is determined (S1384), an end response is sent when the switching is successful (S1386), and the processing is ended.

Meanwhile, in step S1383, when it is determined that the switching of the journal attribute of the SVOL-side slave ended in a failure, the RC pair of the journal group is suspended (S1385), an end response is sent (S1386), and the processing is ended.

(Journal Attribute Switching Part 3 Based on SVOL-Side Master Failure)

Figure 59:
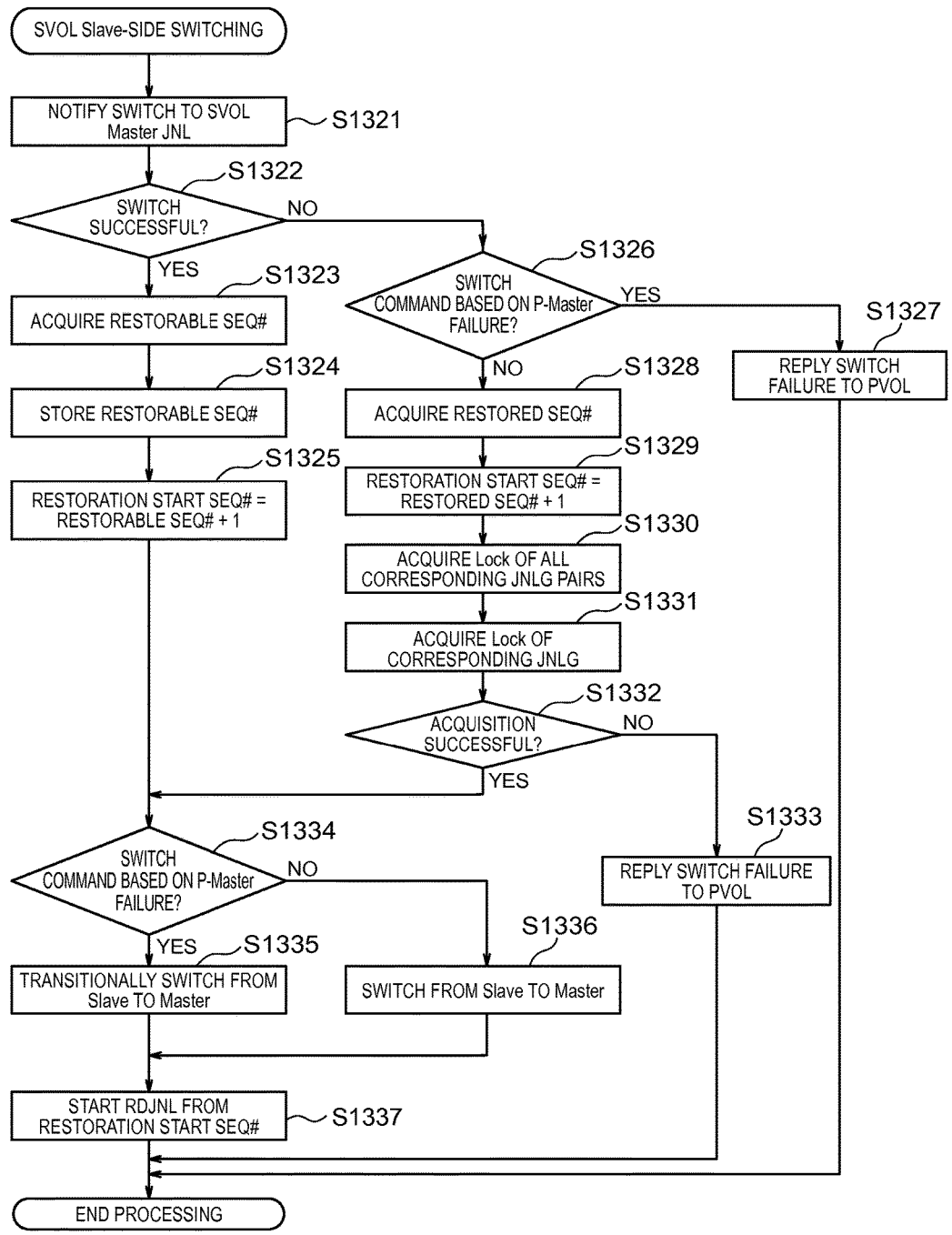
FIG. 59 is a flowchart showing the journal attribute switch processing based on a PVOL-side master failure according to the first embodiment.

Since the journal attribute switch processing in foregoing step S1383 of the fourth storage apparatus 250 in which the SVOL-side (RC secondary side) journal attribute is a slave is similar to the processing of FIG. 59, the detailed explanation is omitted.

(Journal Attribute Switching Part 4 Based on SVOL-Side Master Failure)

Moreover, since the switch processing of switching from the master transient state to the master state of the journal attribute in the fourth storage apparatus 250 is also similar to the processing of FIG. 60, the detailed explanation is omitted.

(Journal Attribute Switching Part 5 Based on SVOL-Side Master Failure)

Moreover, since the switch processing of switching the journal attribute from a master to a slave in the third storage apparatus 200 that is executed in the journal attribute switch processing of the fourth storage apparatus 250 is similar to the processing of FIG. 61, the detailed explanation is omitted.

(Journal Attribute Switching Part 6 Based on SVOL-Side Master Failure)

Figure 62:
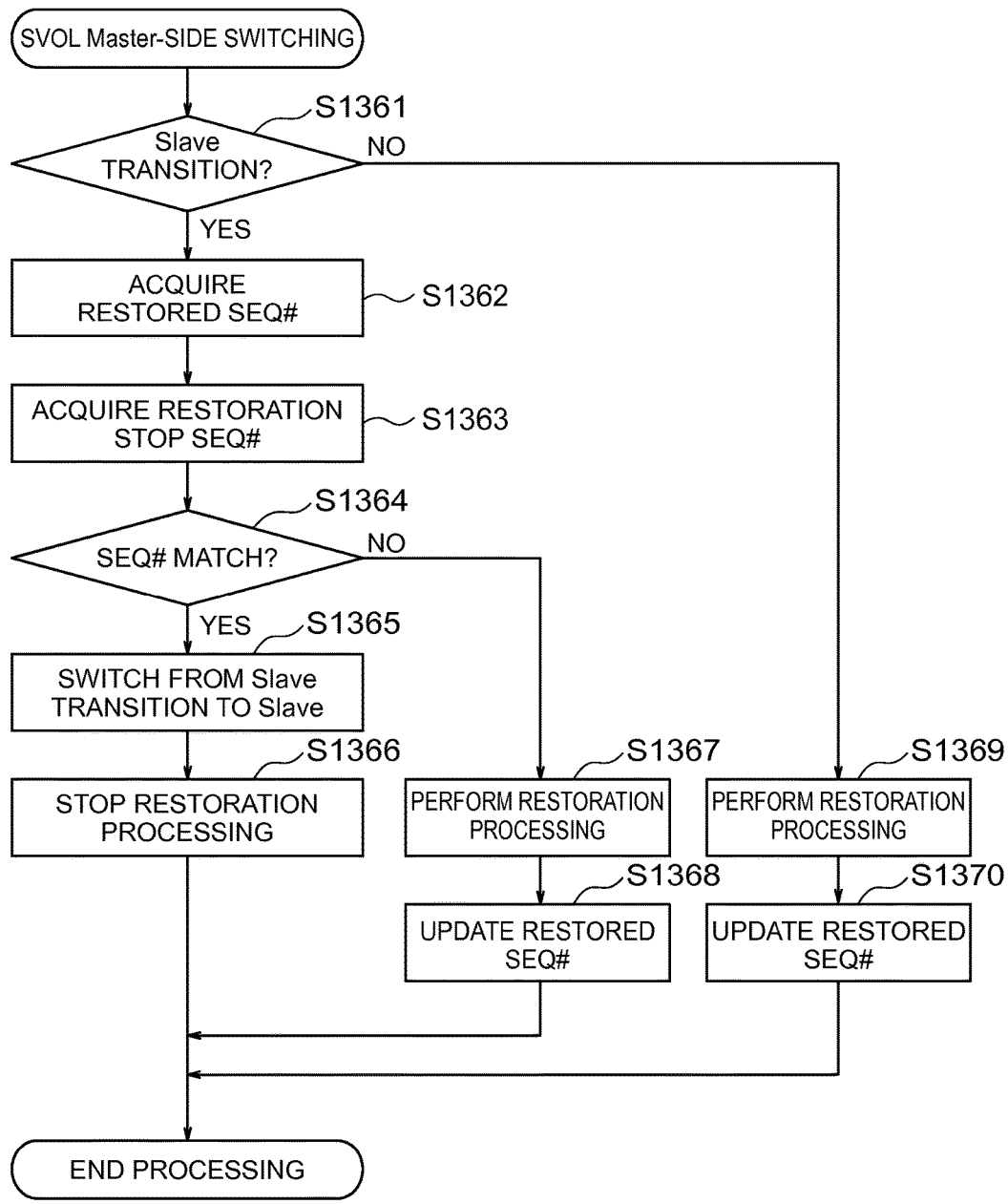
FIG. 62 is a flowchart showing the journal attribute switching based on a PVOL-side master failure according to the first embodiment.

Moreover, since the switch processing of switching from the slave transient state to the slave state of the journal attribute in the third storage apparatus 200 is similar to the processing of FIG. 62, the detailed explanation is omitted.

(1-10) Effect of this Embodiment

As described above, according to this embodiment, the sequential number of the journal acquired by the first storage apparatus 100 is transferred to the second storage apparatus 150, the data and the sequential number are stored in the second journal volume 152 of the second storage apparatus 150, and the sequence of the sequential numbers of the journals in the first virtual storage apparatus 10 is guaranteed. Moreover, as a result of the third storage apparatus 200 issuing a read journal command to the first storage apparatus 100 and receiving the journals stored in the first journal volume 102, remote copy is performed asynchronously from the write request to the first storage apparatus 100. Moreover, the data and the sequential number are also transferred from the third storage apparatus 200 to the fourth storage apparatus 250, and the fourth storage apparatus 250 stores the received data in the fourth physical volume 251A or 251B. Consequently, it is possible to improve the availability of the system by backing up data in a storage apparatus located at a long distance via asynchronous remote copy while effectively utilizing the resources of the storage apparatus located at a short distance.

(2) Second Embodiment (2-1) Outline of this Embodiment

In the first embodiment, the configuration is such that, during normal operation, either the third storage apparatus 200 or the fourth storage apparatus 250 included in the second virtual storage apparatus 20 issues an RDJNL command to either the first storage apparatus 100 or the second storage apparatus 150 included in the first virtual storage apparatus 10, and the asynchronous remote copy is consequently performed. In the foregoing case, the apparatus for acquiring the sequential number of the journal was fixed as the first storage apparatus 100 or the second storage apparatus 150 in order to guarantee the sequence of the sequential numbers.

In this embodiment, the configuration is such that both the third storage apparatus 200 and the fourth storage apparatus 250 respectively issue the RDJNL command to either the first storage apparatus or the second storage apparatus 150, and the asynchronous remote copy is consequently performed. In the foregoing case, since the sequential number is acquired in both apparatuses; namely, the first storage apparatus 100 and the second storage apparatus 200, the sequential numbers are not synchronized between the first storage apparatus 100 and the second storage apparatus 200. Nevertheless, by using a restoration permission marker which indicates to what extent the data can be restored and performing restoration processing in the third storage apparatus 200 and the fourth storage apparatus 250, data is synchronized between the first virtual storage apparatus 10 as the primary side and the second virtual storage apparatus 20 as the secondary side of the RC configuration.

(2-2) Configuration of Computer System

Since the computer system according to this embodiment is similar to the configuration of the computer system according to the first embodiment, only the different configuration is explained in detail below.

This embodiment differs from the first embodiment in that Freeze and marker are periodically issued from the control application 31 of the host computer 30, and the data write processing and the restoration processing are controlled by Freeze and marker. Freeze issued from the control application 31 is a command for causing the write command to stand by. When Freeze is issued, the first storage apparatus 100 and the second storage apparatus 150 become a standby state (Freeze state) without performing the data write processing.

The marker that is issued after Freeze is issued is information indicating at which point in time the data was frozen. While the first storage apparatus 100 and the second storage apparatus 150 each acquire the sequential number independently, they create a journal having a common marker. The third storage apparatus 200 or the fourth storage apparatus 250 performs restoration by using this marker-added journal. The third storage apparatus 200 or the fourth storage apparatus 250 can synchronize the data for restoring both apparatuses by restoring the data in the range indicated in the marker.

(2-3) Configuration of Storage Apparatus

Since the configuration of the first storage apparatus 100, the second storage apparatus 150, the third storage apparatus 200 and the fourth storage apparatus 250 is the same as the first embodiment, the detailed explanation is omitted.

(2-4) Coordination with HA Configuration and RC Configuration Using Marker

The coordination of the first virtual storage apparatus 10 including the first storage apparatus 100 and the second storage apparatus 200 forming the HA configuration using the foregoing marker and the second virtual storage apparatus 20 including the third storage apparatus 200 and the fourth storage apparatus 250 forming the RC configuration with the first virtual storage apparatus 10 is now explained with reference to FIG. 65 to FIG. 69.

(Write Processing)

Figure 65:
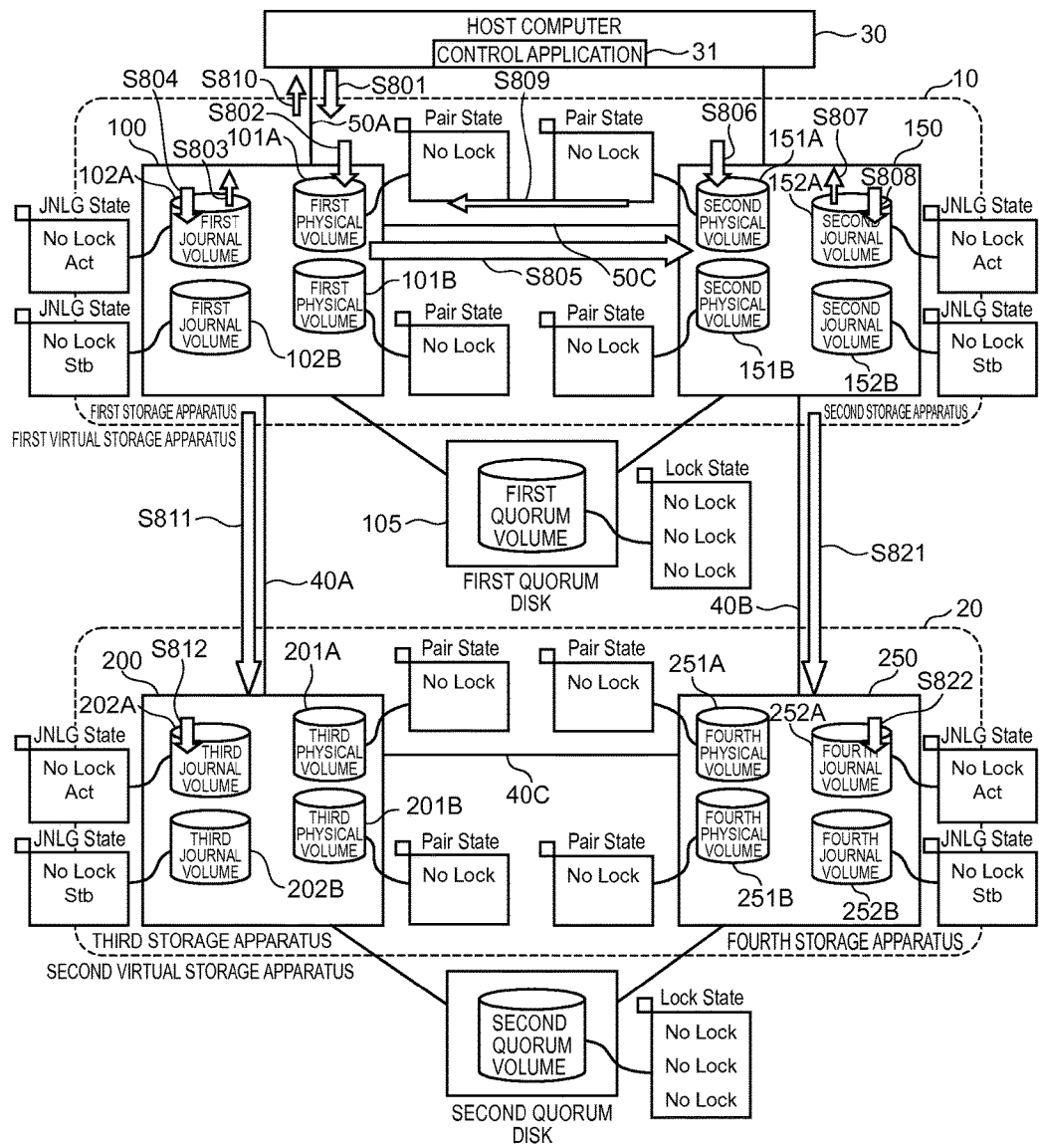
FIG. 65 is a conceptual diagram explaining the data write processing using a marker according to the second embodiment of the present invention.

The data write processing is foremost explained with reference to FIG. 65. As shown in FIG. 65, when a write request is sent from the host computer 30 to the first storage apparatus 100 (S801), the first storage apparatus 100 writes the data into the first physical volume 101A (S802). Subsequently, the first storage apparatus 100 acquires the sequential number of the data (S803), and creates a journal in the first journal volume 102A (S804). Subsequently, the first storage apparatus 100 transfers the data to the second storage apparatus 200, and performs data duplication processing (S805).

The second storage apparatus 150 writes the data into the second physical volume 151A (S806), acquires the sequential number of the data (S807), and creates a journal in the second journal volume 152A (S808). Subsequently, the second storage apparatus 150 sends an end response to the first storage apparatus 100 (S809), and the first storage apparatus 100 sends an end response to the host computer 30 (S810). Accordingly, the first storage apparatus 100 and the second storage apparatus on the primary side of the UA configuration can each independently acquire the sequential number.

The restoration processing on the secondary side of the RC configuration is now explained. The third storage apparatus 200 asynchronously issues the RDJNL command, and acquires the journal stored in the first journal volume 102 of the first storage apparatus 100 (S811). The third storage apparatus 200 stores the journal data in the third journal volume 202 (S812).

Moreover, the fourth storage apparatus 250 asynchronously issues the RDJNL command, and acquires the journal stored in the second journal volume 152 of the second storage apparatus 150 (S821). The fourth storage apparatus 250 stores the journal data in the fourth journal volume 252 (S822).

(Freeze and Marker Issue)

The Freeze setting processing and the marker-added journal creation processing based on the issue of the Freeze and marker are now explained with reference to FIG. 66.

Figure 66:
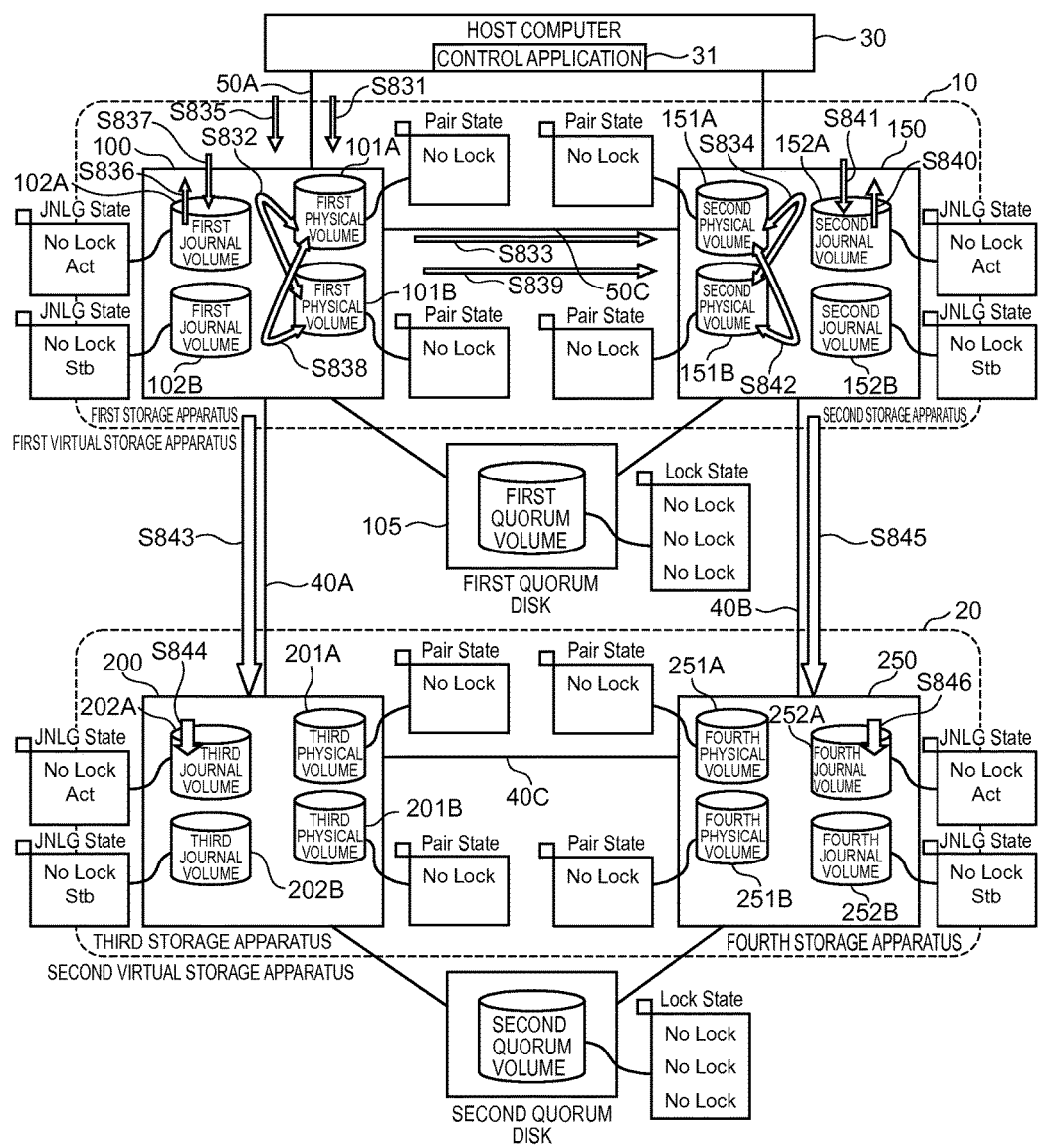
FIG. 66 is a conceptual diagram explaining the freeze and marker issue processing according to the second embodiment.

As shown in FIG. 66, when Freeze is issued from the control application 31 of the host computer 30 (S831), the first storage apparatus 100 sets Freeze in the first physical volumes 101A and 101B for causing the write command to stand by (S832). Subsequently, the fact that Freeze was issued is passed on to the second storage apparatus 150 (S833). The second storage apparatus 150 also sets Freeze in the first physical volumes 101A and 101B for causing the write command to stand by (S834).

When a marker is issued after Freeze is issued from the control application 31 of the host computer 30 (S835), the first storage apparatus 100 acquires the sequential number (S836), and creates a marker-added journal (S837). Subsequently, the first storage apparatus 100 cancels the Freeze state of the first physical volumes 101A and 101B (S838), and passes on the marker to the second storage apparatus 150 (S839).

The second storage apparatus 150 acquires the sequential number (S840), and creates a marker-added journal (S841). Subsequently, the first storage apparatus 100 cancels the Freeze state of the first physical volumes 101A and 101B (S842).

Moreover, the third storage apparatus 200 acquires, from the first storage apparatus 100, the marker-added journal based on the RDJNL command (S843), and stores the marker-added journal in the third journal volume 202 (S844). Moreover, the fourth storage apparatus 250 acquires, from the second storage apparatus 150, the marker-added journal based on the RDJNL command (S845), and stores the marker-added journal in the third journal volume 202 (S846).

(Restoration Processing)

Figure 67:
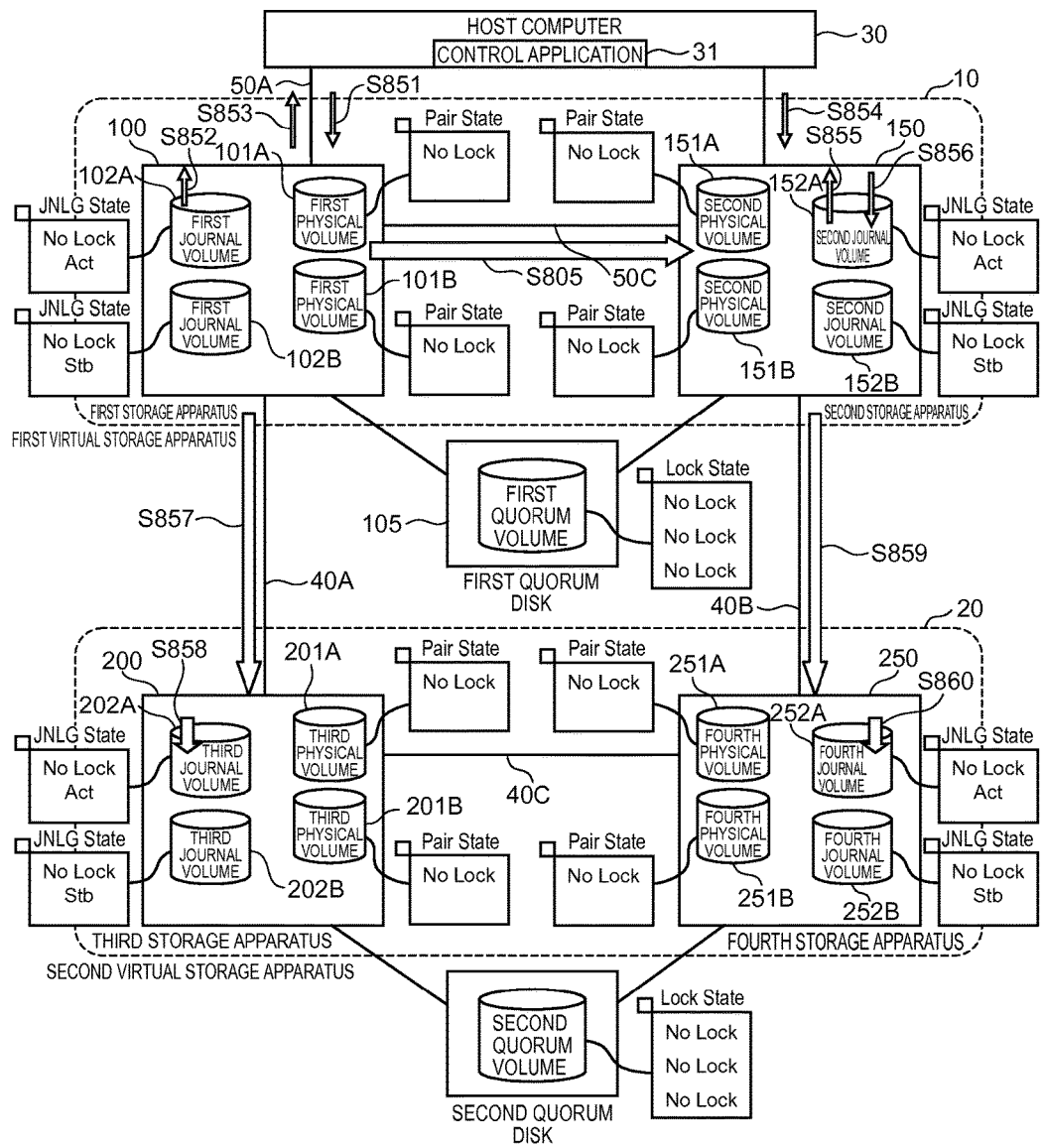
FIG. 67 is a conceptual diagram explaining the restoration processing using a marker according to the second embodiment.

The restoration processing using the marker is now explained with reference to FIG. 67 and FIG. 68. As shown in FIG. 67, when a restorable marker number acquisition command is issued from the control application 31 of the host computer 30 (S851), the first storage apparatus 100 acquires the restorable marker number from the first journal volume 102 (S852). Subsequently, the first storage apparatus 100 reports the restorable marker number to the host computer 30 (S853). Moreover, the control application 31 of the host computer 30 similarly issues a restorable marker number acquisition command also to the second storage apparatus 150, and the restorable marker number is also acquired by the second storage apparatus 150.

Once the restorable marker numbers of the first storage apparatus 100 and the second storage apparatus 150 are prepared, the host computer 30 notifies the restorable marker number, as the restoration command marker number, to the first storage apparatus 100 and the second storage apparatus 150 (S854).

When the second storage apparatus 150 is notified of the restoration command marker number from the host computer 30, the second storage apparatus 150 acquires the sequential number from the second journal volume 152 (S855), and creates a restoration command journal including the restoration command marker number (S856). The first storage apparatus 100 similarly creates a restoration command journal including the restoration command marker number by using the restoration command marker number.

Subsequently, the third storage apparatus 200 acquires the restoration command journal from the first storage apparatus 100 based on the RDJNL command (S857), and stores the restoration command journal including the restoration command marker number is stored in the third journal volume 202 (S858). Moreover, the fourth storage apparatus 250 also acquires the restoration command journal from the first storage apparatus 100 based on the RDJNL command (S857), and stores the restoration command journal including the restoration command marker number in the third journal volume 202 (S860).

Figure 68:
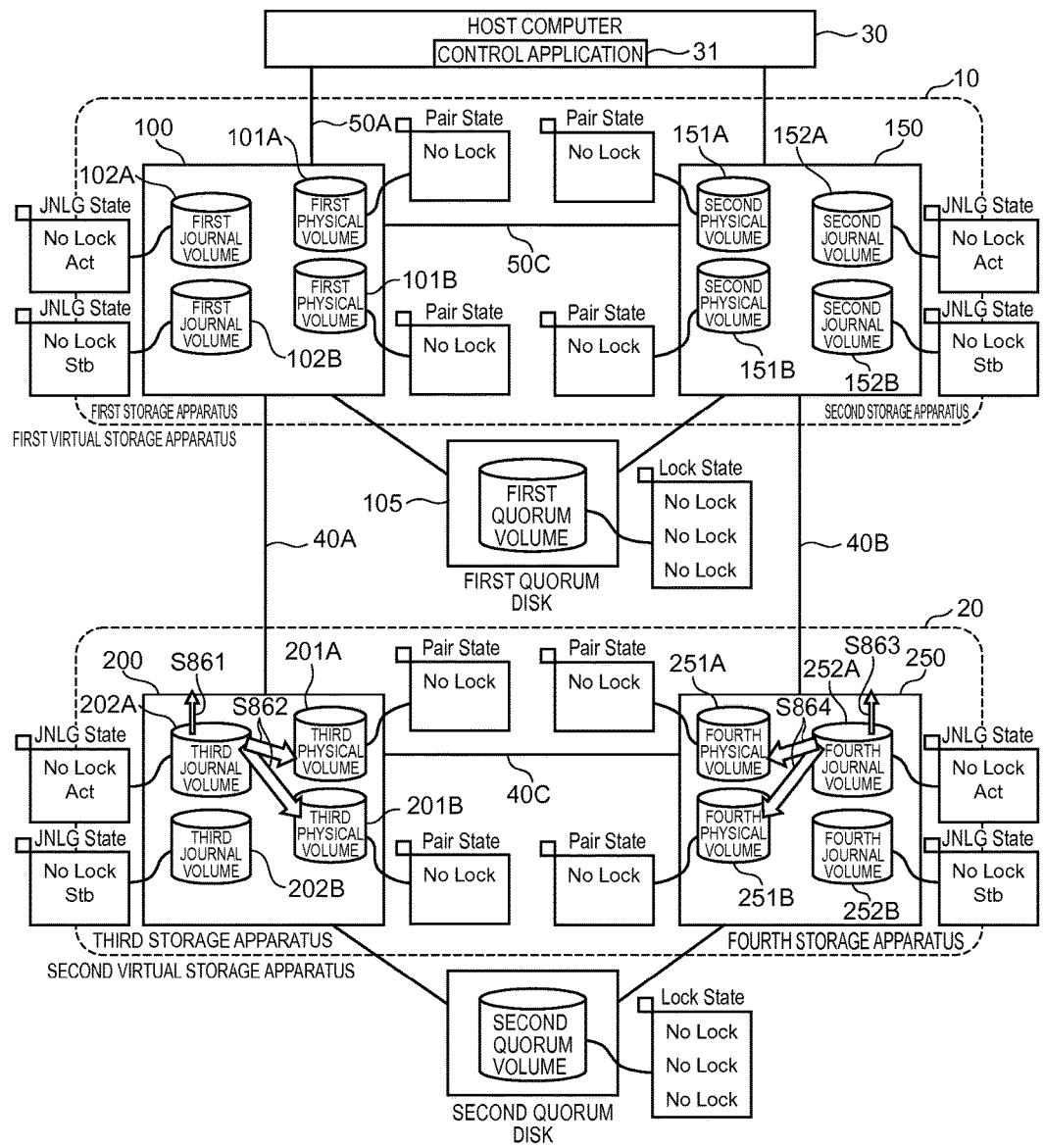
FIG. 68 is a conceptual diagram explaining the restoration processing using a marker according to the second embodiment.

Subsequently, as shown in FIG. 68, when the third storage apparatus 200 detects a restoration command journal in the third journal volume 202 (S861), the journal up to the restoration command marker number included in the restoration command journal is restored in the third physical volumes 201A and 201B (S862). When the fourth storage apparatus 250 similarly detects a restoration command journal in the fourth journal volume 252 (S863), the journal up to the restoration command marker number included in the restoration command journal is restored in the fourth physical volumes 251A and 251B (S864).

While the sequential numbers of the journal data are not synchronized between the third storage apparatus 200 and the fourth storage apparatus 250, as described above, the data to be restored can be synchronized by restoring the journal up to the restoration command marker number.

(Purge Processing)

Figure 69:
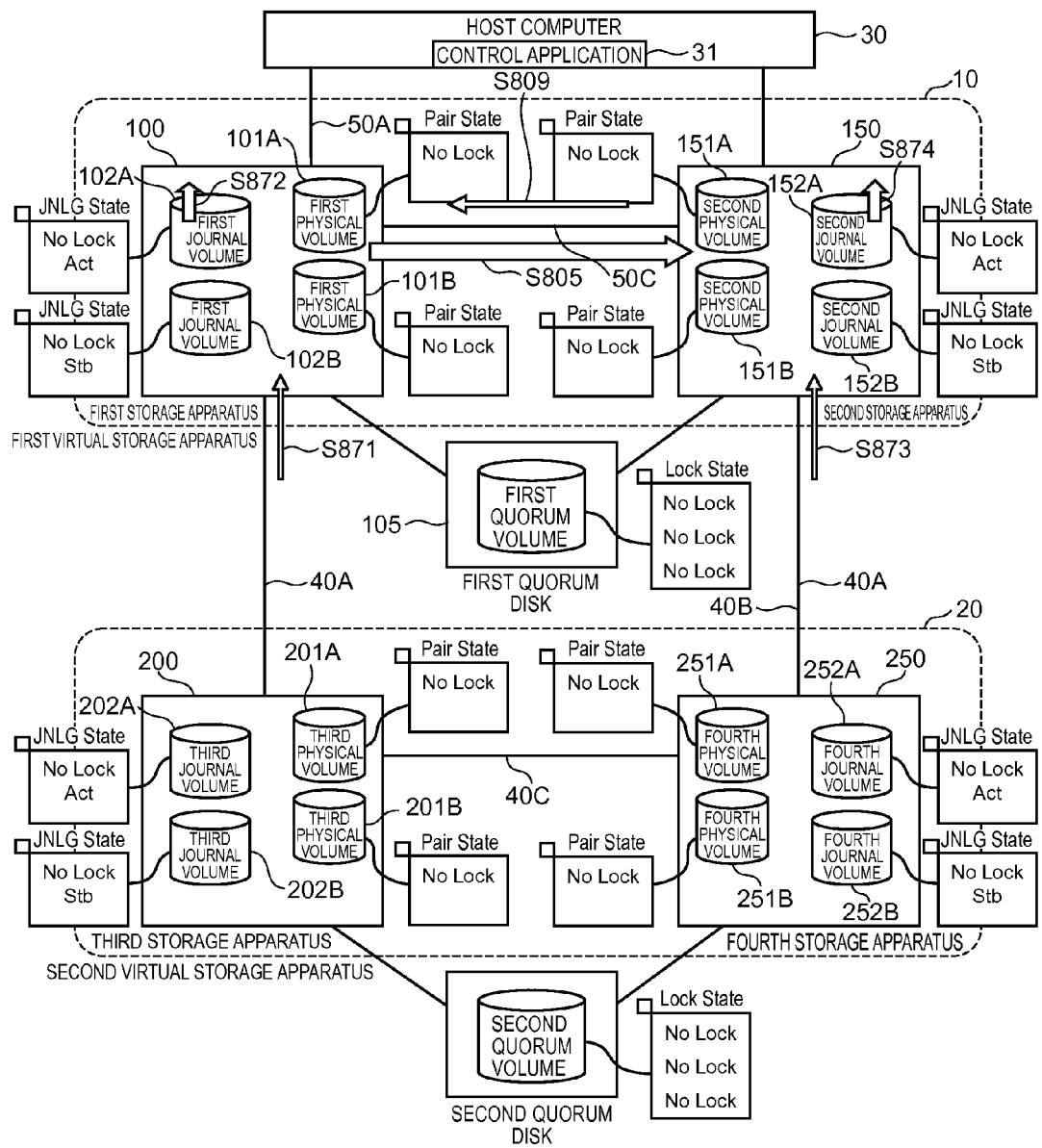
FIG. 69 is a conceptual diagram explaining the purge processing using a marker according to the second embodiment.

The purge processing is now explained with reference to FIG. 69. A restored marker number is included in the RDJNL command that is issued from the third storage apparatus 200 or the fourth storage apparatus 250. When the first storage apparatus 100 is notified of the restored marker number from the third storage apparatus 200 (S871), it purges the data from the first journal volume 102 to the restored marker number (S872). Moreover, when the second storage apparatus 150 is similarly notified of the restored marker number from the fourth storage apparatus 250 (S873), it purges the data from the second journal volume 152 up to the restored marker number (S874).

As described above, in the third storage apparatus 200 and the fourth storage apparatus 250, the journal up to the restoration command marker number is guaranteed to be restored in the physical volumes of the respective apparatuses unless restoration is sequentially performed according to the restoration command marker number. Accordingly, it is possible to determine that the restoration is complete and purge is possible up to the restored marker number notified from the third storage apparatus 200 or the fourth storage apparatus 250.

(2-5) Effect of this Embodiment

As described above, according to this embodiment, in the third storage apparatus 200 and the fourth storage apparatus 250, by performing restoration by using a restoration permission marker which indicates to what extent the data can be restored, data can be synchronized between the first virtual storage apparatus 10 as the primary side and the second virtual storage apparatus 20 as the secondary side of the RC configuration. Consequently, it is possible to improve the availability of the system by backing up data in a storage apparatus located at a long distance via remote copy while effectively utilizing the resources of the storage apparatus located at a short distance.

REFERENCE SIGNS LIST

10 First virtual storage apparatus
20 Second virtual storage apparatus
30 Host computer
100 First storage apparatus
101 First physical volume
102 First journal volume
110 Controller
112 Memory
118 Cache memory
120 Hard disk drive
150 Second storage apparatus
151 Second physical volume
152 Second journal volume
200 Third storage apparatus
201 Third physical volume
202 Third journal volume
250 Fourth storage apparatus
251 Fourth physical volume
252 Fourth journal volume

The invention claimed is:

1. A storage system, comprising:
a first storage apparatus that is connected to a host computer, and includes a plurality of first data volumes for storing data, and a first journal volume for storing journal data including data to be written into the plurality of first data volumes and an update number indicating an order in which the data was written;
a second storage apparatus that is connected to the host computer and the first storage apparatus, and includes a plurality of second data volumes for storing duplicated data of each of the plurality of first data volumes, and a second journal volume for storing the duplicated data of the first journal volume;

a third storage apparatus that is connected to the first storage apparatus, and includes a plurality of third data volumes that are configured as a remote copy pair with the plurality of first data volumes by using journal data received from the first storage apparatus; and a fourth storage apparatus that is connected to the third storage apparatus, and includes a plurality of fourth data volumes for storing duplicated data of each of the plurality of third data volumes, wherein the first storage apparatus assigns a virtual volume identifier to each of the plurality of first data volumes and provides a plurality of virtual volumes to the host computer, wherein the second storage apparatus assigns a same virtual volume identifier to one of the plurality of second data volumes storing one duplicated data of the plurality of first data volumes and provides a virtual volume to the host computer, wherein when a failure occurs in any one of the plurality of first data volumes of the first storage apparatus or in any one of the plurality of second data volumes of the second storage apparatus, the update information is subject to duplicate management in a continuous manner in the first journal volume of the first storage apparatus and the second journal volume of the second storage apparatus, and wherein when a write request of first data is sent to the second storage apparatus from the host computer, the second storage apparatus sends the first data to the first storage apparatus, the first storage apparatus writes the first data in one first data volume among the plurality of first data volumes, assigns a first unique update number to the first data, stores first update information including the first update number in the first journal volume, and sends the first update information and the first data to the second storage apparatus.

2. The storage system according to claim 1, wherein when a write request of second data is sent to the first storage apparatus from the host computer, the first storage apparatus writes the second data in one first data volume among the plurality of first data volumes, assigns a second unique update number to the second data, stores second update information including the second update number in the first journal volume, and sends the second data and the second update information to the second storage apparatus, and the second storage apparatus writes the second data in a second data volume corresponding to the first data volume among the plurality of second data volumes, and stores the second update information in the second journal volume, and wherein the second storage apparatus receives and writes the first data in a second data volume corresponding to the first data volume among the plurality of second data volumes, and stores the first update information in the second journal volume.

3. The storage system according to claim 2, wherein the third storage apparatus includes a plurality of third data volumes and a third journal volume corresponding to either the plurality of first data volumes and the first journal volume of the first storage apparatus, or the plurality of second data volumes and the second journal volume of the second storage apparatus, the fourth storage apparatus includes a plurality of fourth data volumes and a fourth journal volume corresponding to the plurality of third data volumes and the third journal volume of the third storage apparatus, the first storage apparatus sends, to the third storage apparatus, the first update information stored in the first journal volume according to a request from the third storage apparatus, the third storage apparatus stores the first update information in the third journal volume, writes first restored data that was restored using the first update information in the third data volume, and sends the first update information to the fourth storage apparatus, and the fourth storage apparatus writes second restored data that was restored using the first update information in the fourth data volume.

4. The storage system according to claim 3, wherein the first storage apparatus sets the plurality of third data volumes of the third storage apparatus as a copy pair for remote-copying data of the plurality of first data volumes using the first update information, and the second storage apparatus sets the plurality of fourth data volumes of the fourth storage apparatus in a copy pair for remote-copying data of the plurality of second data volumes using the first update information.

5. The storage system according to claim 4, wherein when a failure occurs in the first storage apparatus, the host computer sends a write request of third data to the second storage apparatus, the second storage apparatus assigns a third unique update number to writing of the third data in one second data volume among the plurality of second data volumes, and stores third update information including the third update number in the second journal volume of the second storage apparatus, and the third storage apparatus or the fourth storage apparatus executes, based on the third update information, a remote copy to a third data volume or a fourth data volume of the third storage apparatus and the fourth storage apparatus that corresponds to the second data volume.

6. The storage system according to claim 4, wherein when a failure occurs in the third storage apparatus, the fourth storage apparatus stores the first update information sent from the third storage apparatus or the second storage apparatus in the fourth journal volume, and writes restored data that was restored using first the update information in the fourth data volume.

7. The storage system according to claim 4, wherein when a connection of the first storage apparatus and the third storage apparatus is disconnected, the fourth storage apparatus stores the first update information sent from the first storage apparatus in the fourth journal volume, writes restored data that was restored using the first update information in the fourth data volume, and sends the first update information to the third storage apparatus, and the third storage apparatus writes restored data that was restored using the first update information in the third data volume.

8. The storage system according to claim 4, wherein when a failure occurs in any one of the plurality of third data volumes of the third storage apparatus or in any one of the plurality of fourth data volumes of the fourth storage apparatus, the first update information is subject to duplicate management in a continuous manner in the third journal volume of the third storage apparatus and the fourth journal volume of the fourth storage apparatus.

9. The storage system according to claim 4, wherein
when a failure occurs in the first storage apparatus and the second storage apparatus,
the host computer sends a write request of fourth data to the third storage apparatus or the fourth storage apparatus,
the third storage apparatus assigns a unique fourth update number upon writing of the fourth data in one third data volume among the plurality of third data volumes, and performs duplicate management of fourth update information including the fourth update number in the third journal volume of the third storage apparatus and the fourth journal volume of the fourth storage apparatus.

10. The storage system according to claim 4, wherein
when remote copy cannot be executed in the third storage apparatus and the fourth storage apparatus,
the first storage apparatus and the second storage apparatus manage difference information of the first data in response to writing of the first data in one first data volume among the plurality of first data volumes or one second data volume among the plurality of second data volumes.

11. The storage system according to claim 4, wherein
when a failure occurs in the first journal volume of the first storage apparatus or the second journal volume of the second storage apparatus,
the first storage apparatus and the second storage apparatus manage difference information of the first data in response to writing of the first data in one first data volume among the plurality of first data volumes or one second data volume among the plurality of second data volumes.

12. A data management method in a storage system comprising a first storage apparatus that is connected to a host computer and a second storage apparatus that is connected to the host computer and the first storage apparatus, and a third storage apparatus connected to the first storage apparatus and a fourth storage apparatus connected to the third storage apparatus, wherein
the first storage apparatus includes a plurality of first data volumes and a first journal volume corresponding to a plurality of virtual volumes, the second storage apparatus includes a plurality of second data volumes and a second journal volume corresponding to a plurality of virtual volumes, the first storage apparatus and the second storage apparatus assign same identifying information to one first data volume of the first storage apparatus and one second data volume of the second storage apparatus, and data is subject to duplicate management as a result of virtual volumes corresponding to the identifying information being provided to the host computer,
the data management method comprising:
a step of the first storage apparatus and the second storage apparatus performing duplicate management of update information including data and the update number in the first journal volume of the first storage apparatus and the second journal volume of the second storage apparatus when a write request of data is sent to the first storage apparatus or the second storage apparatus from the host computer, the first storage apparatus assigns a unique update number to a writing of data in one first data volume among the plurality of first data volumes;
a step of the third storage apparatus or the fourth storage apparatus executing a remote copy to the data volume corresponding to the first data volume of third storage apparatus and the fourth storage apparatus based on the update information; and
a step of the first storage apparatus and the second storage apparatus continuously performing duplicate management of the update information in the first journal volume of the first storage apparatus and the second journal volume of the second storage apparatus when a failure occurs in any one of the plurality of first data volumes of the first storage apparatus or any one of the plurality of second data volumes of the second storage apparatus,
wherein when a write request of first data is sent to the second storage apparatus from the host computer,
the second storage apparatus sends the first data to the first storage apparatus; and
the first storage apparatus writes the first data in one first data volume among the plurality of first data volumes, assigns a first unique update number to the first data, stores update information including the first unique update number in the first journal volume, and sends the first data and the first update information to the second storage apparatus.

13. The data management method according to claim 12, when a write request of second data is sent to the first storage apparatus from the host computer,
the first storage apparatus writes the second data in one first data volume among the plurality of first data volumes, assigns a second unique update number to the second data, stores second update information including the second unique update number in the first journal volume, and sends the second data and the second update information to the second storage apparatus; and
wherein the second storage apparatus receives and writes the first data in a second data volume corresponding to the first data volume among the plurality of second data volumes, and stores the first update information in the second journal volume.

14. The data management method according to claim 12, wherein the third storage apparatus includes a plurality of third data volumes and a third journal volume corresponding to either the plurality of first data volumes and the first journal volume of the first storage apparatus, or the plurality of second data volumes and the second journal volume of the second storage apparatus, and the fourth storage apparatus includes a plurality of fourth data volumes and a fourth journal volume corresponding to the plurality of third data volumes and the third journal volume of the third storage apparatus,
wherein the first storage apparatus sends, to the third storage apparatus, the first update information stored in the first journal volume according to a request from the third storage apparatus;
the third storage apparatus stores the first update information in the third journal volume, writes restored data that was restored using the first update information in the third data volume, and sends the first update information to the fourth storage apparatus; and
the fourth storage apparatus writes data that was restored using the first update information in the fourth data volume.

* * * * *